United States Patent
Wadsworth

(10) Patent No.: US 11,254,410 B2
(45) Date of Patent: Feb. 22, 2022

(54) METHOD AND APPARATUS FOR FABRICATING REFORMABLE STIFFENING ELEMENTS

(71) Applicant: SPIRIT AEROSYSTEMS, INC., Wichita, KS (US)

(72) Inventor: Mark Anthony Wadsworth, Sedan, KS (US)

(73) Assignee: Spirit AeroSystems, Inc., Wichita, KS (US)

( * ) Notice: Subject to any disclaimer, the term of this patent is extended or adjusted under 35 U.S.C. 154(b) by 220 days.

(21) Appl. No.: 16/720,491

(22) Filed: Dec. 19, 2019

(65) Prior Publication Data

US 2021/0188416 A1   Jun. 24, 2021

(51) Int. Cl.
| | | |
|---|---|---|
| B64C 1/00 | (2006.01) | |
| B64F 5/00 | (2017.01) | |
| B29B 11/00 | (2006.01) | |
| B64C 1/06 | (2006.01) | |
| B64F 5/10 | (2017.01) | |
| B29B 11/06 | (2006.01) | |
| B29C 70/44 | (2006.01) | |
| B29L 31/30 | (2006.01) | |

(52) U.S. Cl.
CPC .............. *B64C 1/064* (2013.01); *B29B 11/06* (2013.01); *B29C 70/44* (2013.01); *B64F 5/10* (2017.01); *B29L 2031/3082* (2013.01)

(58) Field of Classification Search
CPC ... B64C 1/00; B64C 1/06; B64C 1/064; B64F 5/00; B64F 5/10; B29B 11/00; B29B 11/06; B29B 70/00; B29B 70/40; B29B 70/44
See application file for complete search history.

(56) References Cited

U.S. PATENT DOCUMENTS

| | | | | |
|---|---|---|---|---|
| 3,995,080 A | * | 11/1976 | Cogburn | B64C 1/064 428/34.5 |
| 3,995,081 A | * | 11/1976 | Fant | B29D 24/001 428/119 |
| 2019/0161156 A1 | * | 5/2019 | Batalla | B64C 3/187 |

* cited by examiner

*Primary Examiner* — Jacob T Minskey
*Assistant Examiner* — Matthew Hoover
(74) *Attorney, Agent, or Firm* — Hovey Williams LLP

(57) ABSTRACT

A stiffening element comprises a tension and compression member, a shear member, an attachment member, and a plurality of beads. The tension and compression member is positioned spaced apart from the skin and configured to bear tension or compression forces that stiffen the skin and prevent the skin from buckling or bending. The shear member is connected to the tension and compression member and configured to bear shear forces between the skin and the tension and compression member. The attachment member is connected to the shear member and is configured to connect to the skin. The beads each create out-of-plane feature that is positioned in at least one of the shear member and the attachment member. The beads permit the stiffening element be reshaped to adjust a longitudinal curvature of the stiffening element.

7 Claims, 60 Drawing Sheets

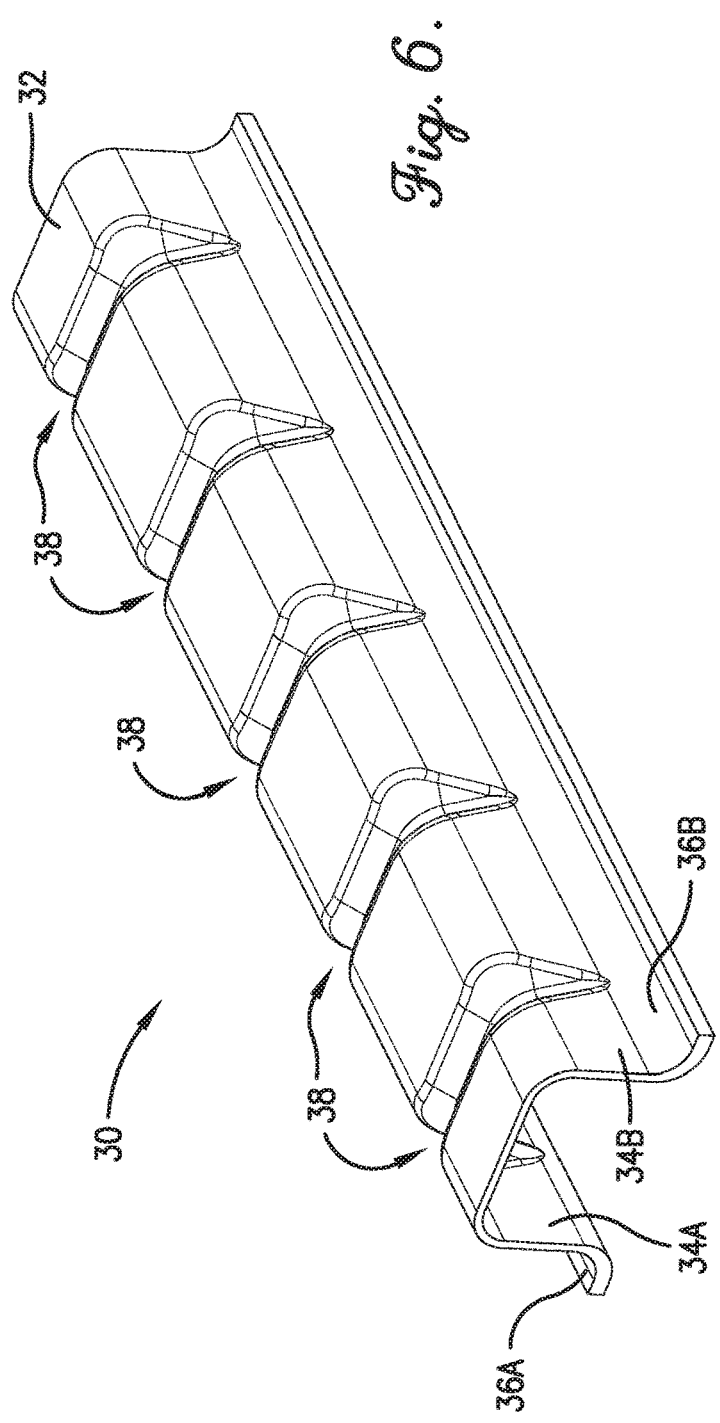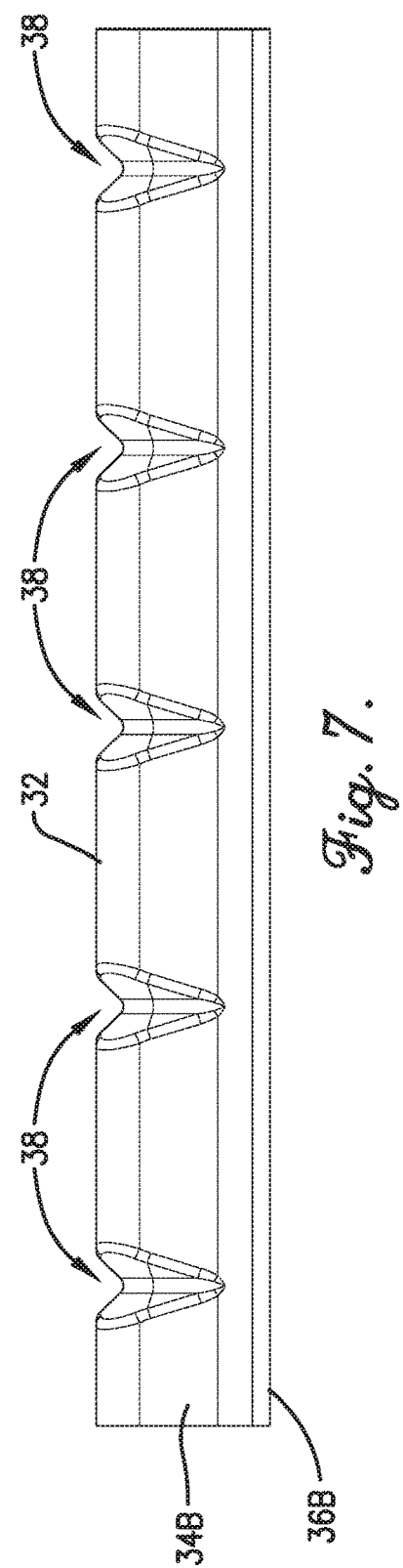

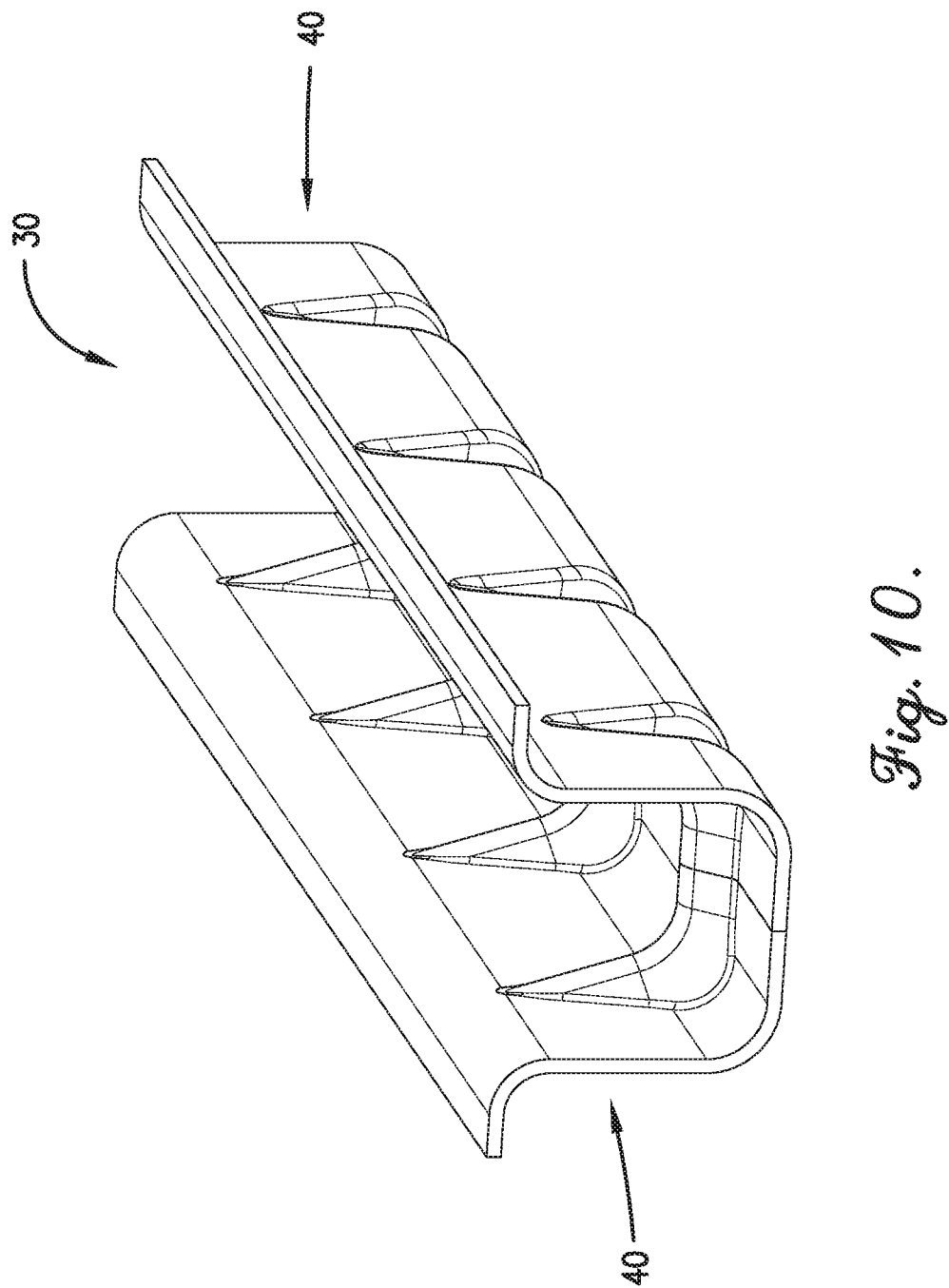

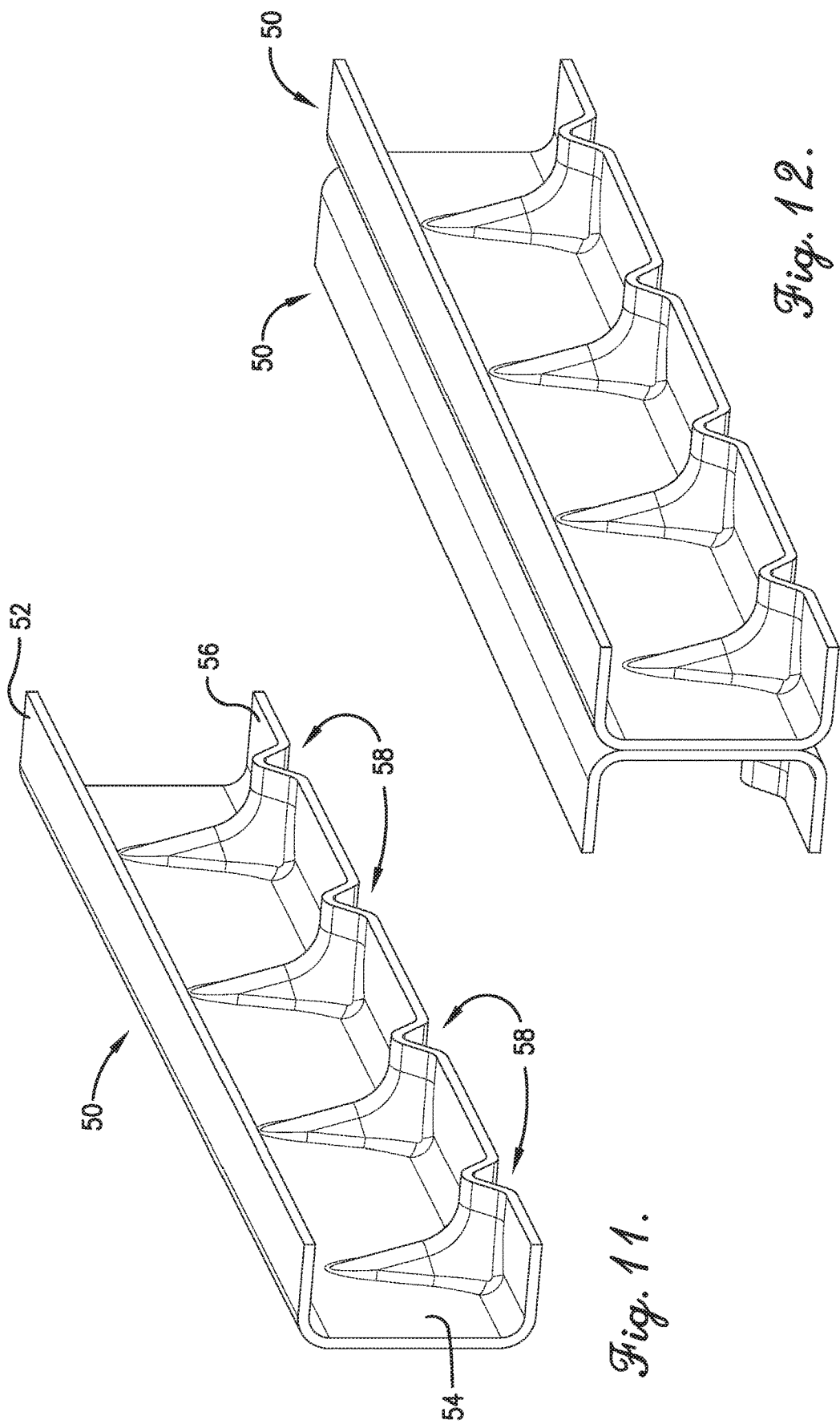

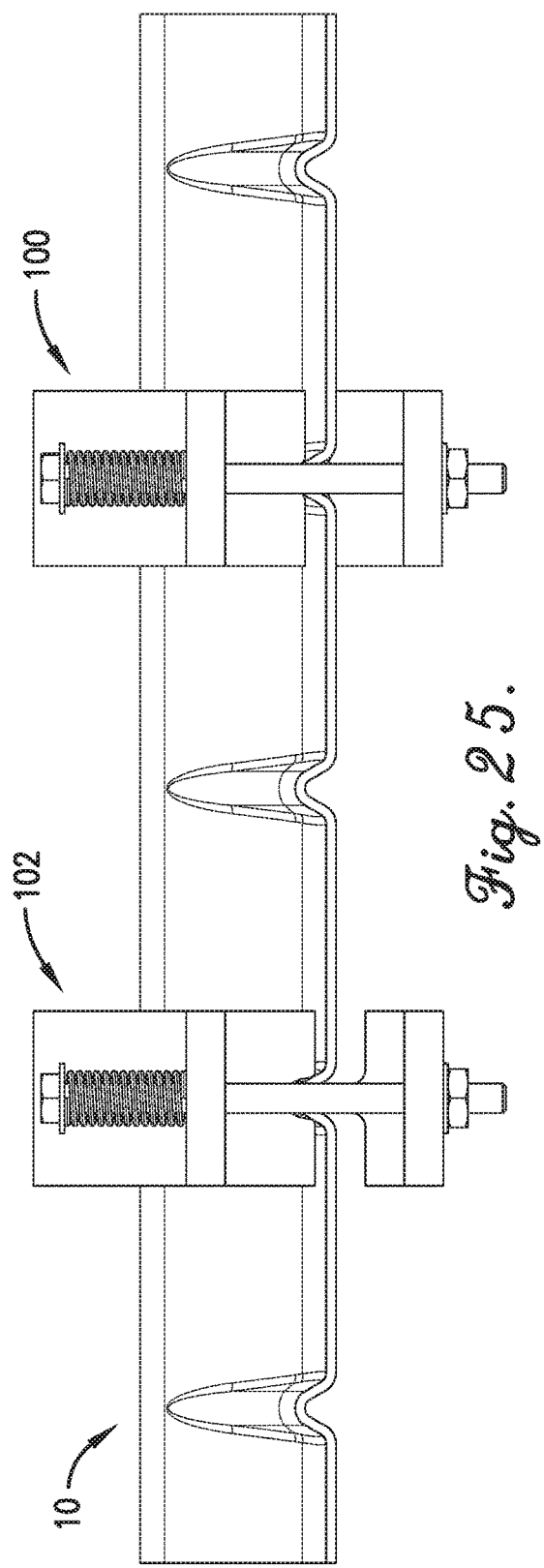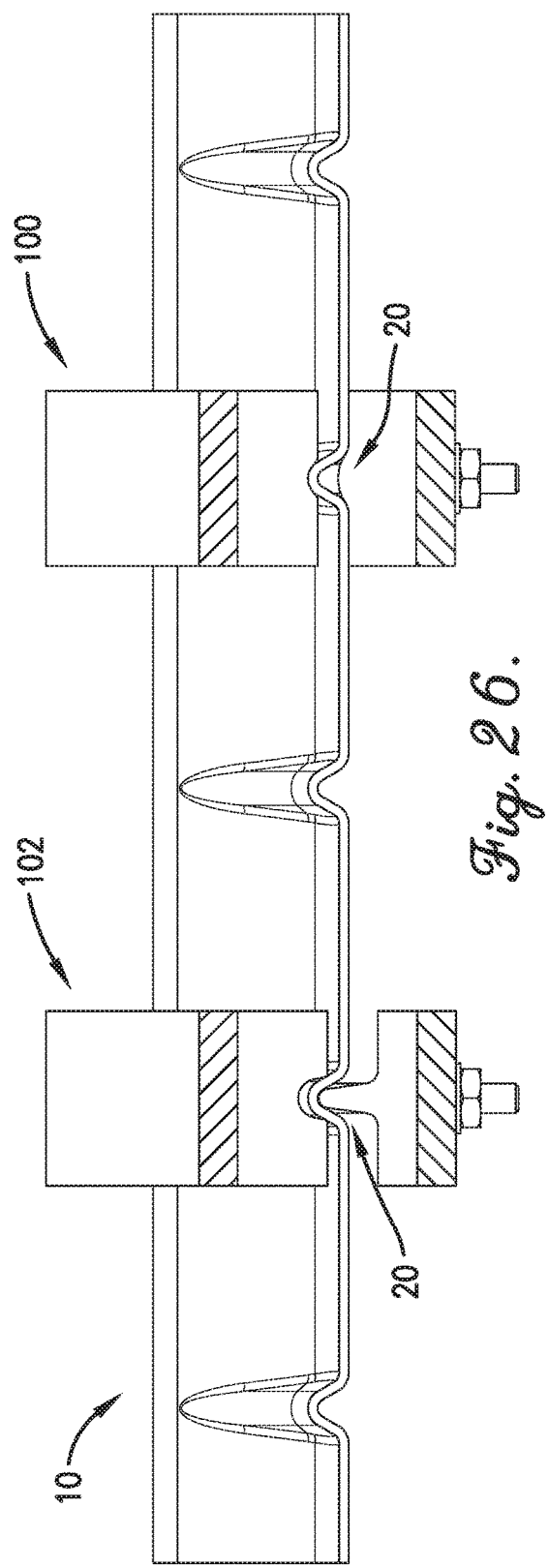

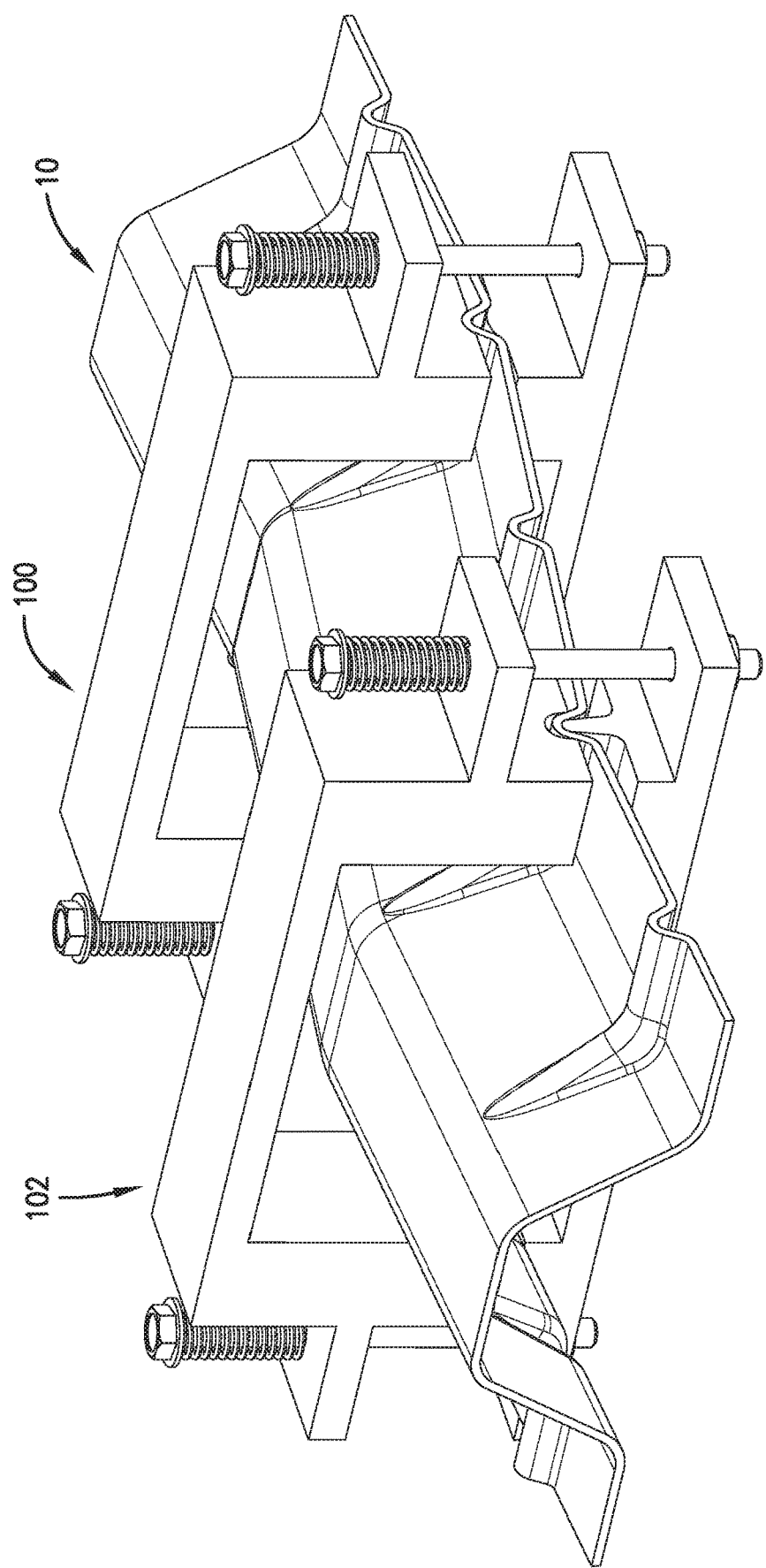

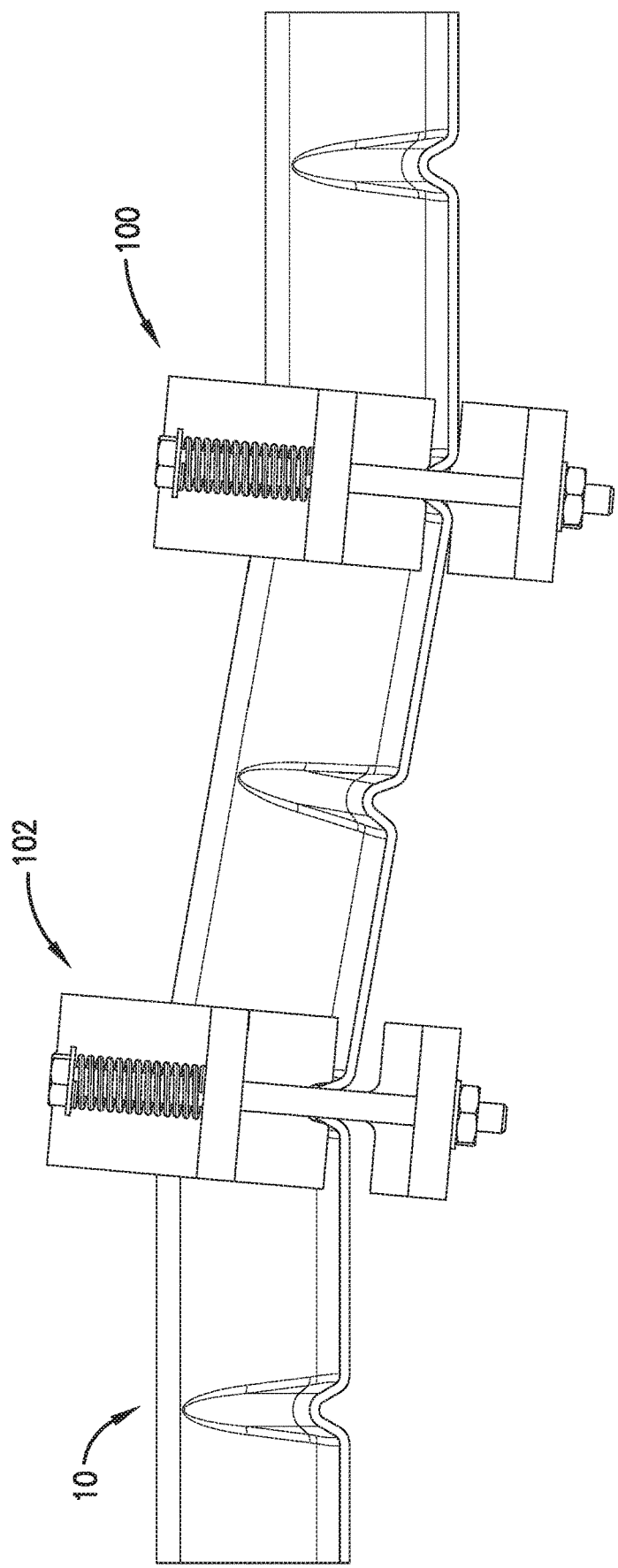

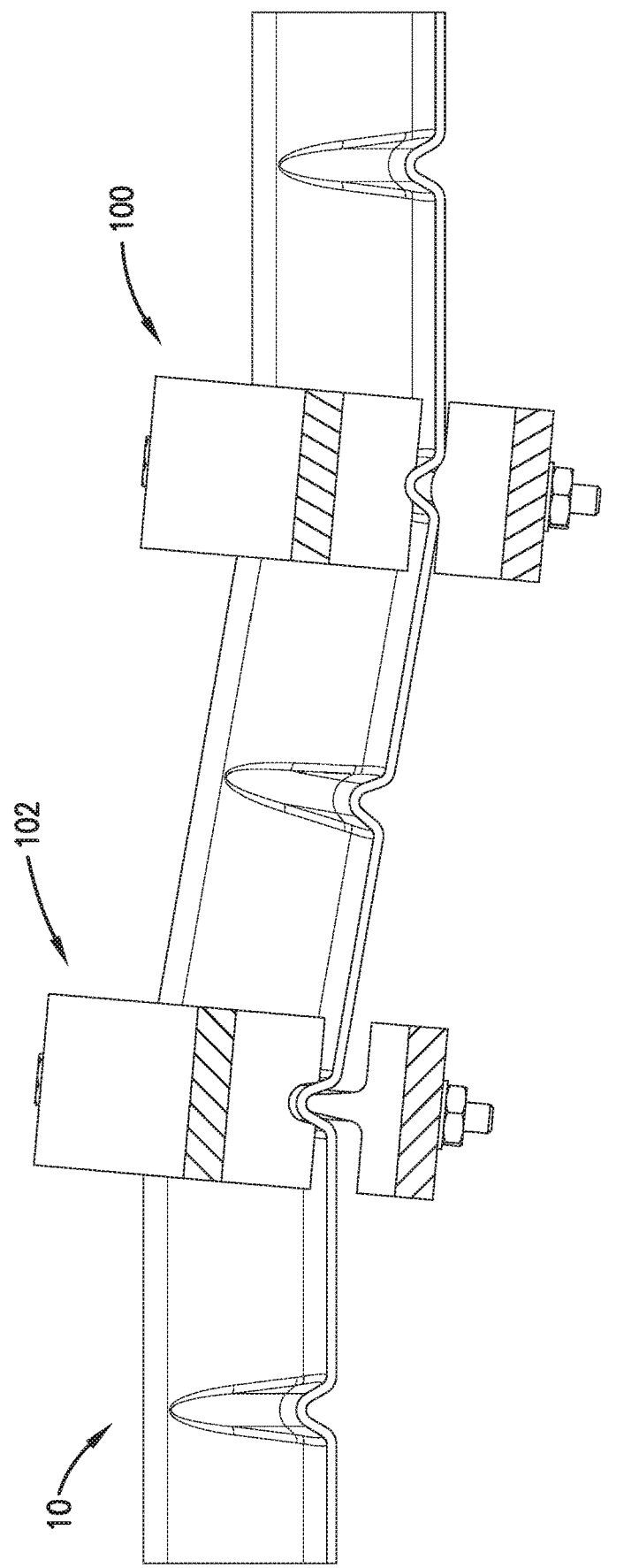

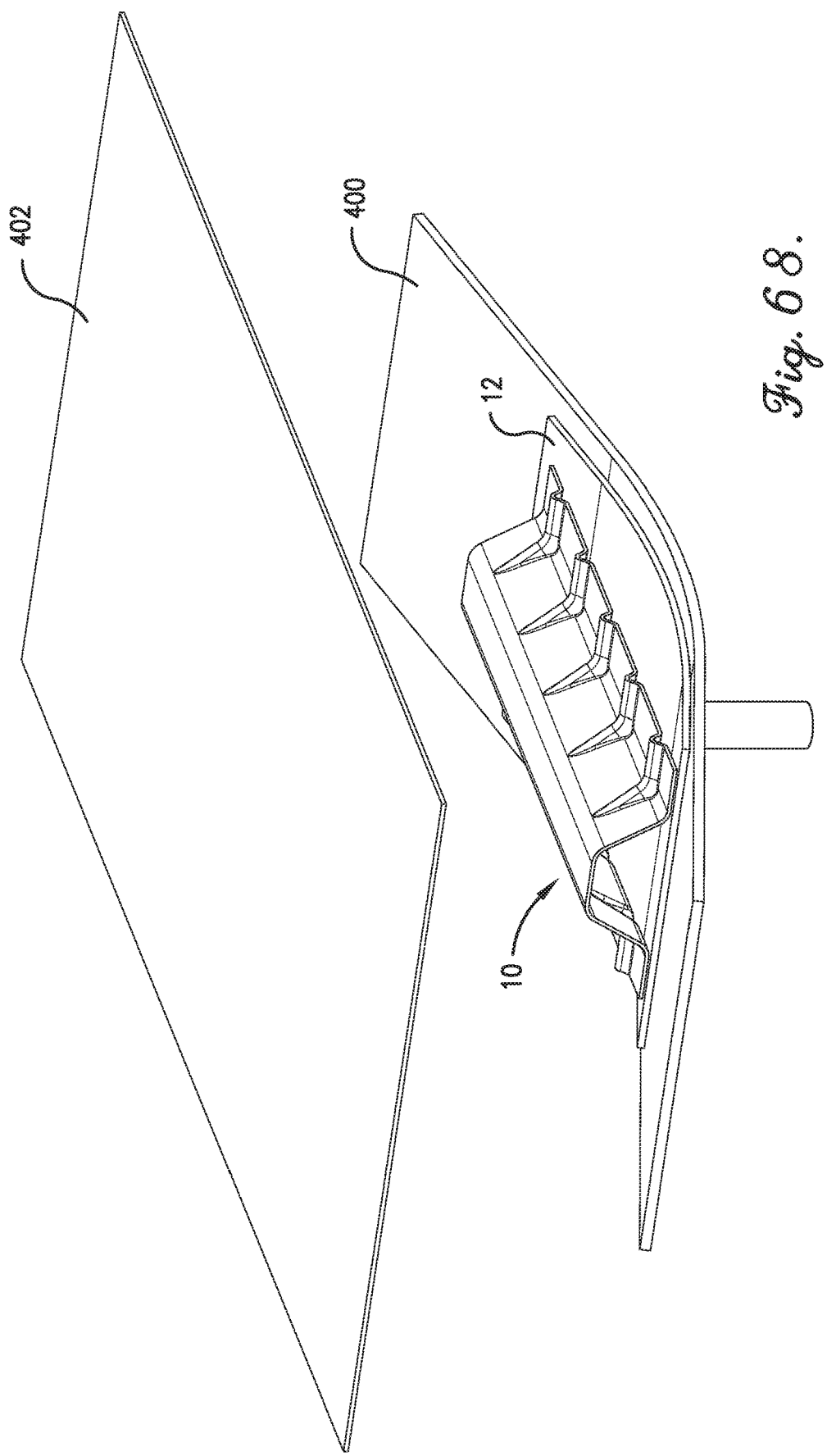

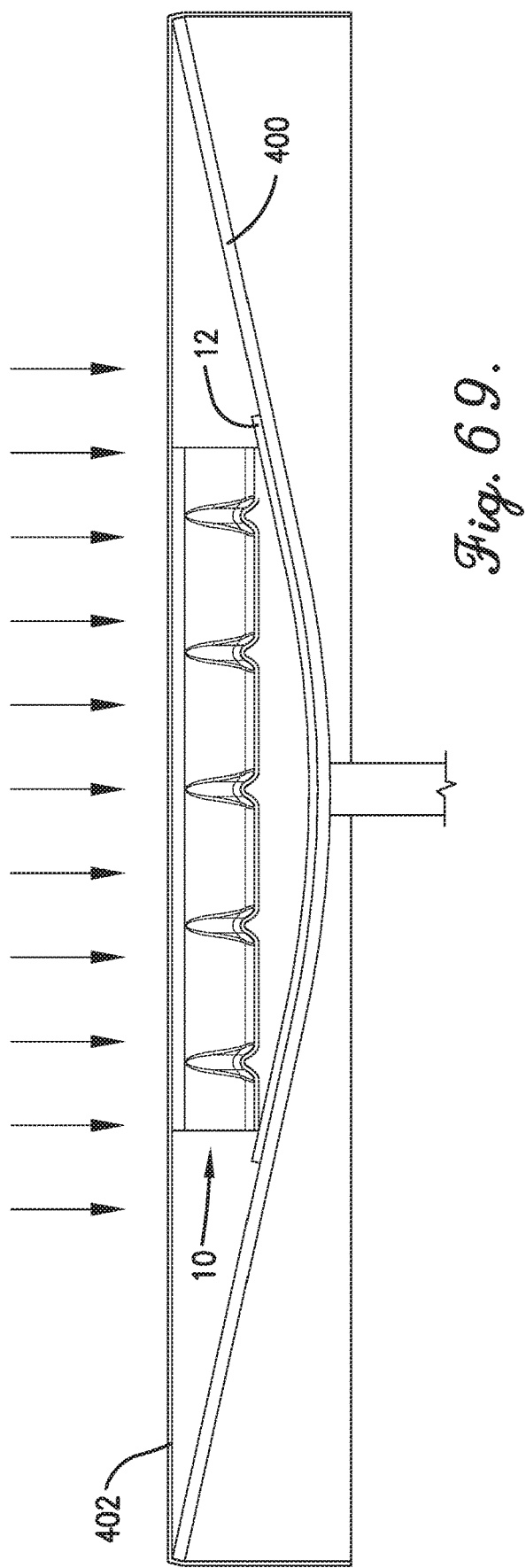
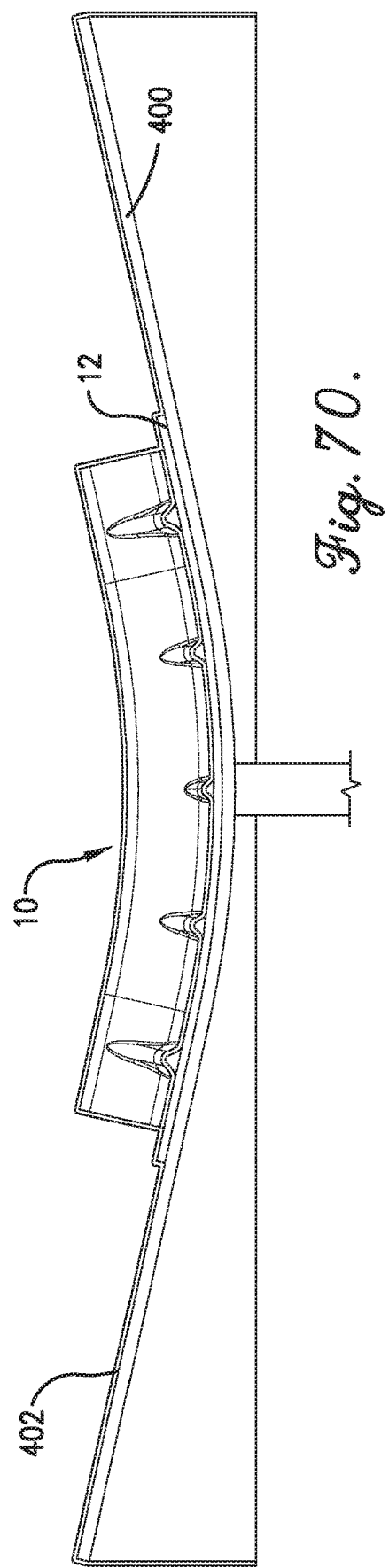

METHOD AND APPARATUS FOR FABRICATING REFORMABLE STIFFENING ELEMENTS

FIELD OF THE INVENTION

Embodiments of the current invention relate to components, apparatuses, and methods for fabricating reformable stiffening elements, such as aircraft stringers.

DESCRIPTION OF THE RELATED ART

A stiffening element, such as a stringer, is a structure that is attached or bonded to a skin, i.e., the outer layer, of a fuselage or a wing of an aircraft, and provides structural reinforcement and prevents buckling of the skin. Common stringer types of stiffening elements include hat or omega stringers and U stringers. The omega stringer, as shown in FIG. 1, includes a cap, a pair of webs, and a pair of flanges. The cap is a planar elongated rail that is horizontally oriented in the figure. The webs are planar elongated rails that are oriented at an offset, diagonal angle and connected to opposing edges of the cap. The flanges are also planar elongated rails that are horizontally oriented with each flange being connected to a free edge of a successive one of the webs. The flanges, also known as the "attachment members", provide a surface that attaches to the skin, through bolting, riveting, bonding, welding, or the like. The webs, also known as the "shear members", provide resistance to shear forces. The cap, also known as the "tension and compression member", provides stiffness. The U stringer, as shown in FIG. 2, includes the same components as the omega stringer: a cap, a pair of webs, and a pair of flanges. In contrast to the omega stringer, the cap of the U stringer is the attachment member and attaches to the skin, while the flanges are the tension and compression members and provide stiffness.

A fuselage may be divided into lengthwise sections, wherein each section includes a plurality of stringer type stiffening elements distributed along a circumference of the fuselage and oriented such that a longitudinal axis of each stiffening element aligns with a longitudinal axis of the fuselage. A portion of a fuselage with a section of the skin removed is shown in FIG. 3 to reveal the stringers. Since the fuselage has a curvature along its length that varies according to the longitudinal position, the stiffening elements for each section have a different lengthwise shape. For example, the stiffening elements positioned near the center of the fuselage may have a small curvature, while the stiffening elements positioned near either end of the fuselage may have a much greater curvature.

Each stiffening element is typically formed using a die or tool that has a curvature which matches the curvature of the fuselage for a given section. Thus, to construct a fuselage, a plurality of custom shaped stiffening elements must be formed and a plurality of custom shaped dies are required to form them. For a typical fuselage, up to a hundred custom shaped stiffening elements and accordingly, up to a hundred custom shaped dies may be required. Any changes to the shape or dimensions of the fuselage, such as for a larger or smaller aircraft, requires different custom shaped dies to form different custom shaped stiffening elements. This customized approach to fuselage construction leads to costly formation of custom shaped dies and stockpiling of custom shaped parts.

Another problem with prior art stiffening elements is they are typically very rigid and have structural failure mechanisms that present a drawback. For example, if an incident occurred which led to a separation of just a portion of the stiffening element from the skin, then relatively very little energy is required to propagate the separation along the joint of the stiffening element and the skin as a result of the rigidity of the stiffening element. This could lead to the stiffening element completely separating from the skin.

SUMMARY OF THE INVENTION

Embodiments of the current invention solve the above-mentioned problems and provide a distinct advantage over prior art stringers. In one embodiment, stiffening elements are formed from composite material and created to be initially straight—which means the stiffening elements are formed on a relatively inexpensive straight tool. The stiffening elements include a plurality of longitudinally-spaced beads that allow for each stiffening element to be reshaped in order for the stiffening element to acquire a longitudinal curvature that matches a curvature of the fuselage skin to which the stiffening element will be attached. The current invention further provides methods of reshaping the stiffening elements, such as by reshaping the beads, that eliminate the need for custom shaped dies or forming tools. There is also no need to stockpile custom shaped parts for each section of the fuselage that has a different curvature since a stiffening element with the appropriate curvature can be formed using the reshaping methods as needed. In addition, the inclusion of the beads makes the stiffening element more flexible so that in the event of a separation of a portion of the stiffening element from the skin, the stiffening element may simply flex at one of the locations of the beads rather than continuing to separate.

A basic embodiment of the stiffening element comprises a tension and compression member, an attachment member, a shear member extending between the attachment member and the tension and compression member, and a plurality of beads formed in the attachment member and at least part of the shear member. The tension and compression member is positioned spaced apart from the skin and configured to bear tension or compression forces that stiffen the skin and prevent the skin from buckling or bending. The shear member is connected to the tension and compression member and configured to bear shear forces between the skin and the tension and compression member. The attachment member is connected to the shear member and is configured to connect to the skin. The beads create out-of-plane features that are positioned, or formed, in the attachment member and at least part of the shear member. At least one bead is configured to be reshaped to adjust a longitudinal curvature of the stiffening element.

Another embodiment of the stiffening element comprises a tension and compression member, first and second shear members, first and second attachment members, and a plurality of beads. The tension and compression member is spaced apart from the skin and is configured to bear tension or compression forces that stiffen the skin and prevent the skin from buckling or bending. The first and second shear members each are configured to bear shear forces between the skin and the tension and compression member. The first shear member is connected to a first side of the tension and compression member. The second shear member is connected to a second side of the tension and compression member. The first and second attachment members are configured to connect to the skin. The first attachment member is connected to the first shear member and the second attachment member is connected to the second shear member. Each bead creates an out-of-plane feature that is positioned, or formed, in at least part of the shear members and in the attachment member. At least one bead is configured to be reshaped to adjust a longitudinal curvature of the stiffening element.

Yet another embodiment of the stiffening element comprises first and second tension and compression members, first and second shear members, an attachment member, and a plurality of beads. The first and second tension and compression members are configured to bear tension or compression forces that stiffen the skin and prevent the skin from buckling or bending. The tension and compression members are positioned spaced apart from the skin. The first and second shear members are configured to bear shear forces between the skin and the first and second tension and compression members. The first shear member is connected to the first tension and compression member. The second shear member is connected to the second tension and compression member. The attachment member is configured to connect to the skin and is connected on one side to the first shear member and on the other side to the second shear member. Each bead creates an out-of-plane feature that is positioned in the shear members and the attachment member. At least one bead is configured to be reshaped to adjust a longitudinal curvature of the stiffening element.

One method of reshaping a bead of a stiffening element to be attached to a skin of aircraft components comprises the steps of: attaching a clamp to the bead, wherein the clamp includes an upper clamp member contacting at least a portion of a first surface of the bead, a lower clamp member contacting at least a portion of a second, opposing surface of the bead, and a plurality of resilient members which urge the upper clamp member to apply pressure on the stiffening element toward the lower clamp member; heating the stiffening element to a temperature above the glass transition temperature for the stiffening element material; and reducing or removing the heat after a time period.

Another method of reshaping a bead of a stiffening element to be attached to a skin of aircraft components comprises the steps of: attaching a first clamp to the stiffening element adjacent to a first side of the bead; attaching a second clamp to the stiffening element adjacent to a second side of the bead; connecting a resilient member from the first clamp to the second clamp; heating the stiffening element to a temperature above the glass transition temperature for the stiffening element material; and reducing or removing the heat after a time period.

Another embodiment of the current invention provides a method of attaching a stiffening element to a skin of aircraft components for providing structural reinforcement comprising the steps of: placing an outer surface of the skin in contact with an upper surface of a tool; placing an attachment member of the stiffening element in contact with an inner surface of the skin; applying a force to the stiffening element that presses the attachment member against the skin; and attaching the stiffening element to the skin.

Yet another embodiment of the current invention provides a method of attaching a stiffening element to a skin of aircraft components for providing structural reinforcement comprising the steps of: placing an outer surface of the skin in contact with an upper surface of a tool; placing an attachment member of the stiffening element in contact with an inner surface of the skin; placing a vacuum bag over the stiffening element and the skin; sealing the vacuum bag against the upper surface of the tool; and applying a vacuum between the vacuum bag and the tool.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the current invention will be apparent from the following detailed description of the embodiments and the accompanying drawing figures.

BRIEF DESCRIPTION OF THE DRAWING FIGURES

Embodiments of the current invention are described in detail below with reference to the attached drawing figures, wherein:

FIG. 6 is a perspective view of a stiffening element including a tension and compression member, first and second shear members, an attachment member, and a plurality of beads;

FIG. 7 is a side view of the stiffening element;

FIG. 10 is a perspective view of the stiffening element of FIGS. 6 and 7 formed by joining two of the stiffening elements of FIG. 8;

FIG. 11 is a perspective view of a stiffening element, constructed in accordance with other embodiments of the current invention, the stiffening element including a tension and compression member, a shear member, an attachment member, and a plurality of beads;

FIG. 12 is a perspective view of an "I-beam" formed by joining two of the stiffening elements of FIG. 11;

FIG. 25 is a side view of the stiffening element with the first clamp and the second clamp;

FIG. 26 is a side sectional view of the stiffening element with the first clamp and the second clamp cut along the line 21-21 in FIG. 19;

FIG. 27 is an upper perspective view of the stiffening element with the first clamp and the second clamp after heat has been applied to the stiffening element and the first and second beads have been reshaped;

FIG. 28 is a side view of the stiffening element with the first clamp and the second clamp after heat has been applied to the stiffening element and the first and second beads have been reshaped;

FIG. 29 is a side sectional view of the stiffening element with the first clamp and the second clamp after heat has been applied to the stiffening element and the first and second beads have been reshaped;

FIG. 68 is an upper perspective view of the stiffening element placed on the skin which is placed on an upper surface of a tool, all of which is to be covered by a vacuum bag;

FIG. 69 is a side view of the stiffening element receiving a force or pressure applied from the vacuum bag to attach the stiffening element to the skin; and FIG. 70 is a side view of the stiffening element after it has been attached to the skin and a plurality of beads have been at least partially flattened.

Figure 1:
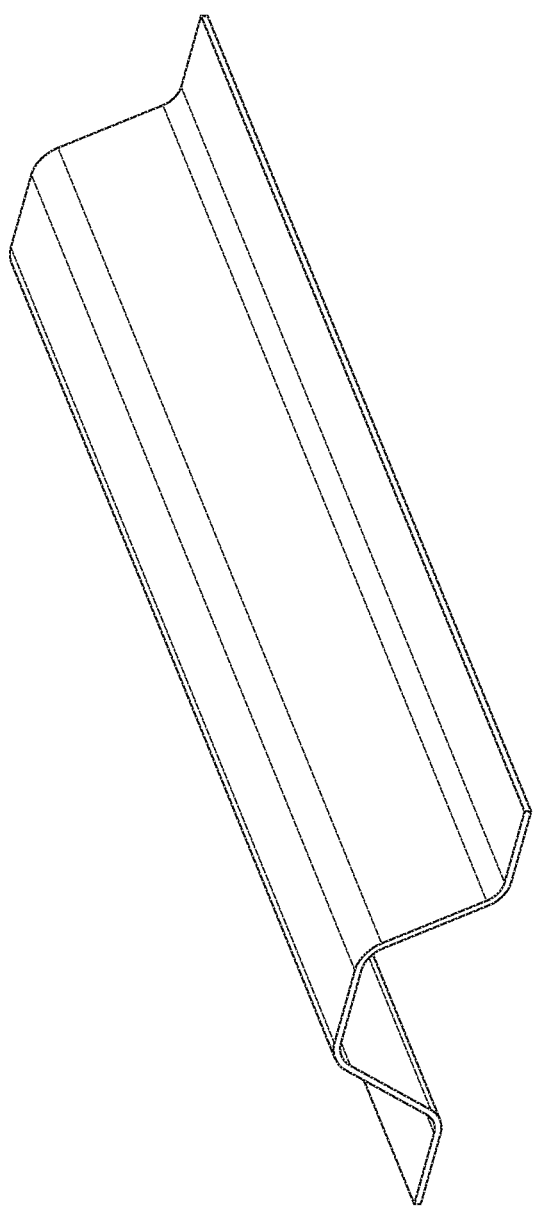
FIG. 1 is a perspective view of a first type of prior art stiffening element.
Figure 2:
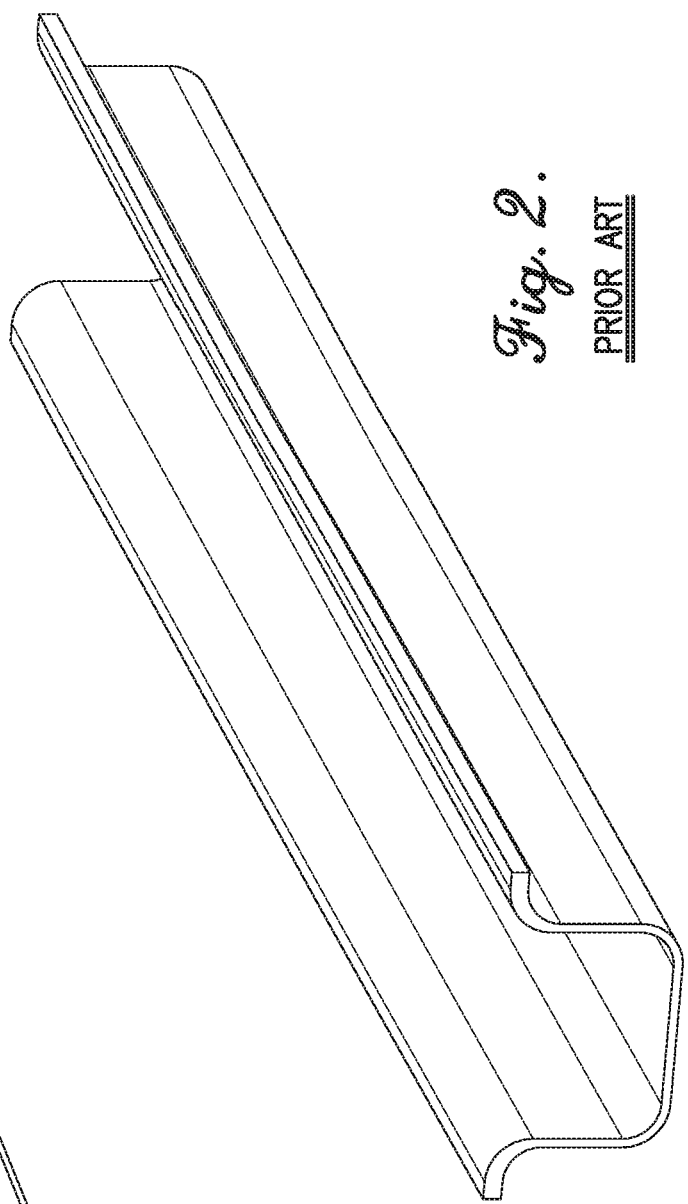
FIG. 2 is a perspective view of a second type of prior art stiffening element.

The drawing figures do not limit the current invention to the specific embodiments disclosed and described herein. The drawings are not necessarily to scale, emphasis instead being placed upon clearly illustrating the principles of the invention.

DETAILED DESCRIPTION OF THE EMBODIMENTS

The following detailed description of the technology references the accompanying drawings that illustrate specific embodiments in which the technology can be practiced. The embodiments are intended to describe aspects of the technology in sufficient detail to enable those skilled in the art to practice the technology. Other embodiments can be utilized and changes can be made without departing from the scope of the current invention. The following detailed description is, therefore, not to be taken in a limiting sense. The scope of the current invention is defined only by the appended claims, along with the full scope of equivalents to which such claims are entitled.

Figure 3:
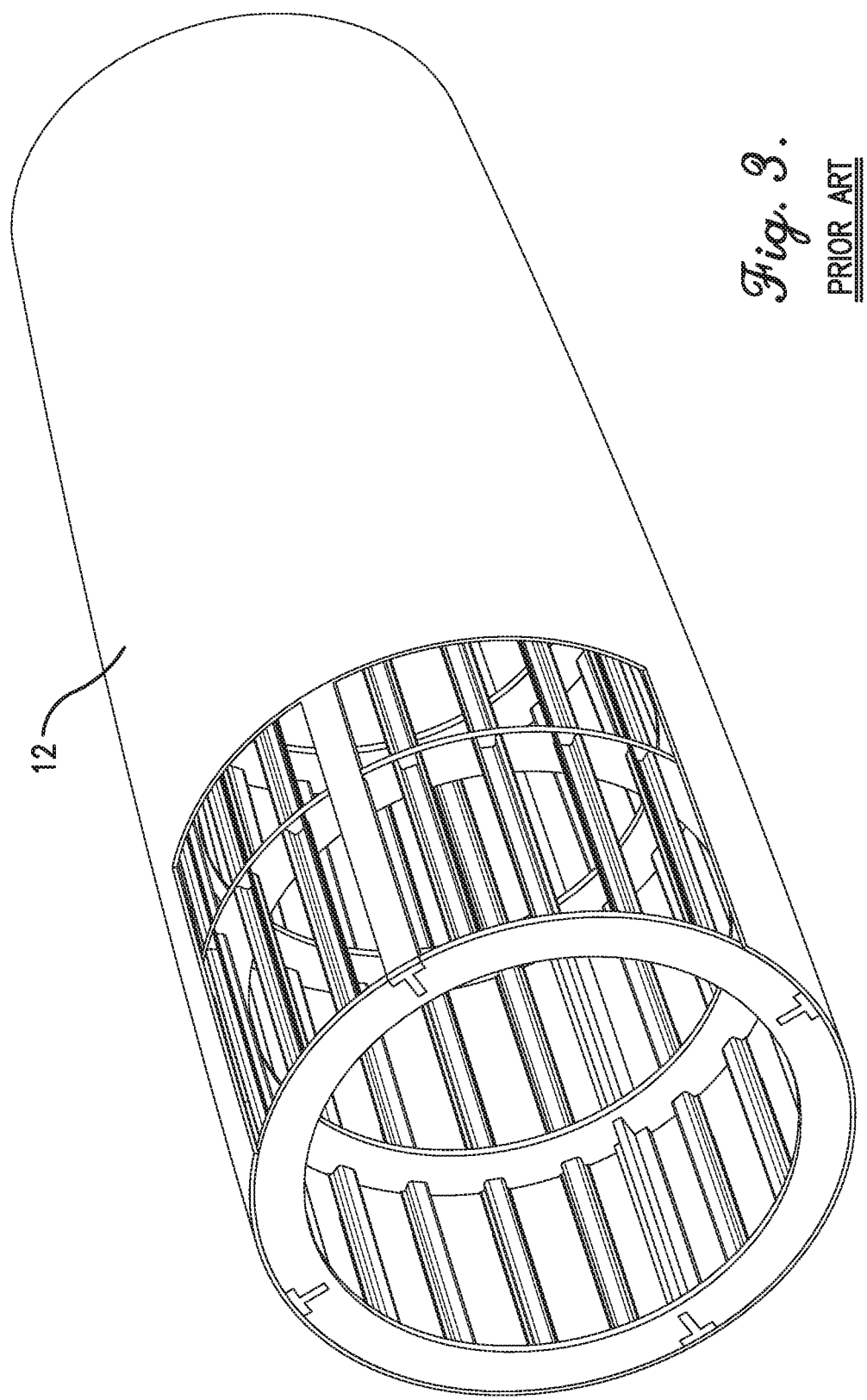
FIG. 3 is a perspective view of a portion of a fuselage with a section of aircraft skin removed.
Figure 4:
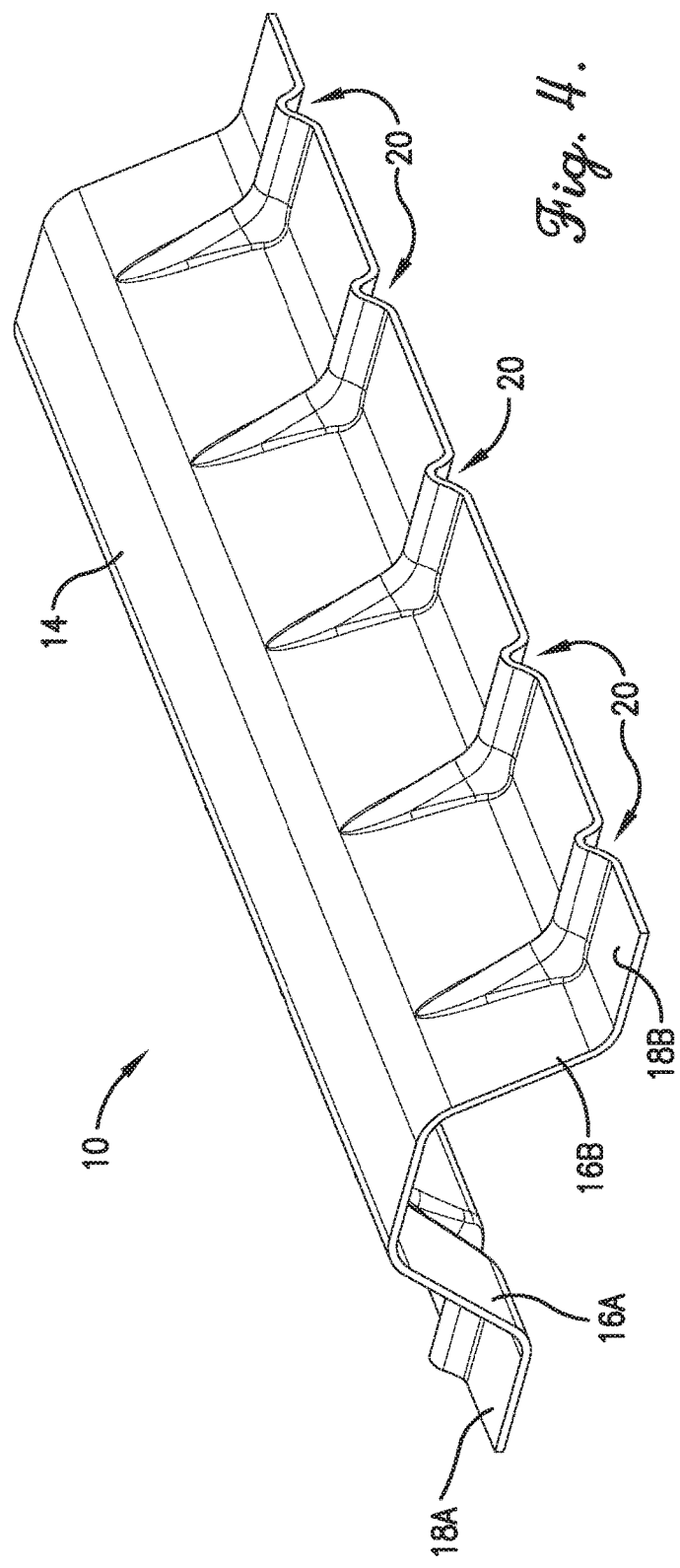
FIG. 4 is a perspective view of a stiffening element, constructed in accordance with various embodiments of the current invention, the stiffening element including a tension and compression member, first and second shear members, an attachment member, and a plurality of beads.
Figure 5:
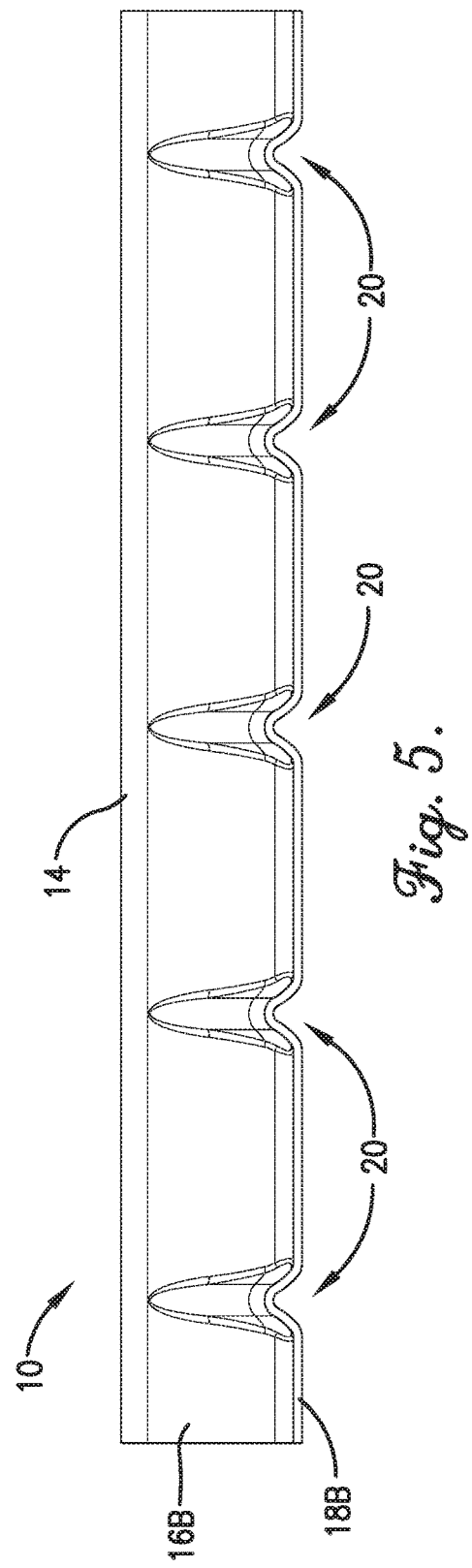
FIG. 5 is a side view of the stiffening element.

A stiffening element 10, constructed in accordance with various embodiments of the current invention, for providing structural reinforcement for a skin 12, or similar component, of an aircraft is shown in FIGS. 4 and 5. Typically, the skin 12 is an outer component or layer of an aircraft fuselage, as shown in FIG. 3. The stiffening element 10 may be similar to the hat or omega stringer. The stiffening element 10 broadly comprises a tension and compression member 14, first and second shear members 16A, 16B, first and second attachment members 18A, 18B, and a plurality of beads 20, which may be provided in each attachment member 18A, 18B, and partly in each shear member 16A, 16B.

The tension and compression member 14 is a generally planar elongated flange, beam, rail, or plank that provides stiffness and structural strength. The tension and compression member 14 bears, or carries, compression or tension forces acting on the skin 12 and/or resulting from bending of the skin 12 thereby stiffening the skin 12 and preventing it from buckling. The tension and compression member 14 is spaced apart from, positioned offset from, or positioned away from, the skin 12, such that it is typically inward from the skin 12.

The first and second shear members 16A, 16B each may be a generally planar web extending between each of the first and second attachment members, respectively, and opposite sides of the tension and compression member 14. The shear members 16A, 16B bear, or carry, the shear forces between the tension and compression member 14 and the skin 12. Each shear member 16A, 16B is preferably oriented at a generally diagonal angle away from the tension and compression member 14. For example, if the tension and compression member 14 is positioned on a horizontal plane, then the first side edge of the first shear member 16A may be connected to a first side edge of the tension and compression member 14 at an angle in the range of approximately 30 degrees to approximately 90 degrees. An exemplary connection angle may be approximately 60 degrees. The first side edge of the second shear member 16B may be connected to a second side edge of the tension and compression member 14 at an angle in the range of approximately 90 degrees to approximately 150 degrees. An exemplary connection angle may be approximately 120 degrees. Restated in another way, the included angle between the first shear member 16A and the second shear member 16B may be in the range of approximately 0 degrees to approximately 120 degrees. An exemplary included angle between the first shear member 16A and the second shear member 16B may be approximately 60 degrees. In various embodiments, the connection, joint, or intersection of the first and second shear members 16A, 16B with the tension and compression member 14 may be filleted, rounded, arcuate, or may have another curvature.

In various embodiments, the connection, joint, or intersection of the first and second attachment members 18A, 18B with their respective shear members 16A, 16B may be filleted, rounded, arcuate, or may have another curvature. In most embodiments, the attachment members 18A, 18B roughly align (may be generally parallel) with one another and are roughly parallel to the tension and compression member 14. The attachment members 18A, 18B are configured to attach to the skin 12.

In general, the attachment members 18A, 18B couple the skin 12 to the tension and compression member 14 through the shear members 16A, 16B such that any bending of the skin 12 also necessarily stretches or compresses the tension and compression member 14.

Each bead 20 may be an undulation, ripple, or wave that creates an out-of-plane feature that may be positioned (e.g., formed) in each of the attachment members 18A, 18B, and can extend at least partially into the shear members 16A, 16B. Each bead 20 may have an arch or roughly parabolic cross-sectional shape. Each bead 20 is illustrated having the same cross-sectional shape, but different beads 20 could have different cross sectional shapes. Each bead 20 extends transversely from the free edge of each of the attachment members 18A, 18B, across each attachment members 18A, 18B, and further extends into at least a portion of respective first and second shear members 16A, 16B. The beads 20 are formed protruding outwardly from (e.g., from the outside surface of) the omega-shaped stiffening member 10. Each bead 20 may be configured to be reshaped to adjust a longitudinal curvature of the stiffening element 10. Alternatively, some of the beads 20 may not be configured to be reshaped, in which case adjustment of the longitudinal curvature of the stiffening element 10 may be accomplished by reshaping certain beads 20 selected from those which are configured to be reshaped.

The stiffening element 10 may have a height of approximately 1.2 inches and a total width of approximately 4.6 inches. The tension and compression member 14 may have a width of approximately 1 inch. Each shear member 16A, 16B may have a width of approximately 1.2 inches. Each attachment member 18A, 18B may have a width of approximately 0.9 inches. Each bead 20 may have a width at the edge of the attachment members 18A, 18B (i.e., a maximum width) of approximately 0.4 inches and a height (or depth) of approximately 0.2 inches, but different beads 20 can have different dimensions. The spacing from a center of one bead 20 to a center of an adjacent bead 20 may be approximately 2 inches, but this dimension may also vary between different adjacent beads 20. In some situations, the skin 12, or other component to which the stiffening element 10 attaches, may include features on the attachment surface that stick up, or rise, from the generally planar surface (e.g., ply ramps or doubler locations). These features may have spacing or other relevant dimensions that are known. Accordingly, in some embodiments of the stiffening element 10, the spacing from a center of one bead 20 to a center of an adjacent bead 20 may match (or may be selected to be compatible with) the spacing, or other dimensions, of the skin 12 features.

The stiffening element 10 may be formed from thermoplastic composite materials which broadly include a reinforcement fiber and a matrix resin. Primary types of reinforcement fiber include carbon fiber and glass fiber, while matrix resins include polyphenylene sulfide (PPS), polyetheretherketone (PEEK), polyarylether ketone (PAEK), polyetherketoneketone (PEKK), polyetherimide (PEI), and so forth. The stiffening element 10 may be formed using continuous compression molding (CCM) or other manufacturing techniques. In various embodiments, the stiffening element 10 may be formed as a monolithic unit.

A stiffening element 30, constructed in accordance with other embodiments of the current invention, is shown in FIGS. 6 and 7. The stiffening element 30 also provides structural reinforcement and may be utilized interchangeably with the stiffening element 10. The stiffening element 30 may be similar to the U stringer. The stiffening element 30 broadly comprises an attachment member 32, first and second shear members 34A, 34B, first and second tension and compression members 36A, 36B, and a plurality of beads 38 formed in the attachment member 32 and at least part of the first and second shear members 34A, 34B.

In this embodiment, the attachment member 32 is a single generally planar elongated flange, beam, rail, or plank which is configured to attach to the skin 12 (as compared to the pair of attachment members 18A, 18B of the embodiment illustrated in FIGS. 4-5).

The first and second shear members 34A, 34B each may be a generally planar elongated flange, beam, rail, or plank extending from one of the opposing sides of the attachment member 32. The shear members 34A, 34B bear, or carry, the shear forces between the compression and tension members 36A, 36B and the skin 12. Each shear member 34A, 34B may be oriented at a generally right angle, or approximately 90 degrees, with respect to the attachment member 32. In various embodiments, the connection, joint, or intersection of the first and second shear members 34A, 34B with the attachment member 32 may be filleted, rounded, arcuate, or may have another curvature.

The tension and compression member in this embodiment is a pair of tension and compression members 36A, 36B (as compared to the single tension and compression member 14 of the embodiment illustrated in FIGS. 4-5). The tension and compression members 36A, 36B bear, or carry, compression or tension forces that stiffen the skin 12 and prevent the skin 12 from bending or buckling. The tension and compression members 36A, 36B are spaced apart from, positioned offset from, or positioned away from, the skin 12, such that they are typically inward from the skin 12. The tension and compression members 36A, 36B can each be a generally planar elongated flange, beam, rail, or plank. A side edge of the first tension and compression member 36A is connected to the second side edge of the first shear member 34A, while a side edge of the second tension and compression member 36B is connected to the second side edge of the second shear member 34B. The first tension and compression member 36A is oriented at a generally right angle, or approximately 90 degrees, with respect to the first shear member 34A. The second tension and compression member 36B is oriented at a generally right angle, or approximately 90 degrees, with respect to the second shear member 34B. In various embodiments, the connection, joint, or intersection of the first and second tension and compression members 36A, 36B with their respective shear members 34A, 34B may be filleted, rounded, arcuate, or may have another curvature. In most embodiments, the first and second tension and compression members 36A, 36B roughly align with one another and are roughly parallel to the attachment member 32. The tension and compression members 36A, 36B provide stiffness and structural strength. The tension and compression members 36A, 36B bear, or carry, compression or tension forces that act on the skin 12 and/or result from bending of the skin 12.

In general, the attachment member 32 couples the skin 12 to the tension and compression members 36A, 36B through the shear members 34A, 34B such that any bending of the skin 12 also necessarily stretches or compresses the tension and compression members 36A, 36B.

Each bead 38 may be an undulation, a ripple, or a wave that creates an out-of-plane feature that is positioned, or formed, in the attachment member 32 and at least part of the shear members 34A, 34B. Each bead 38 may have an arch or roughly parabolic cross-sectional shape. Each bead 38 is illustrated having the same cross-sectional shape, but different beads 38 may have different cross sectional shapes. Each bead 38 preferably has the same cross-sectional shape, but different beads 38 could have different cross sectional shapes. Each bead 38 extends transversely across the attachment member 32, and further extends into at least a portion of respective first and second shear members 34A, 34B. The beads 38 in this embodiment are formed protruding inwardly from (e.g., from the inside surface of) the U-shaped stiffening member 30. The beads 38 are spaced apart from one another along the lengths of the first and second shear members 34A, 34B and the attachment member 32. Each bead 38 may be configured to be reshaped to adjust a longitudinal curvature of the stiffening element 30. Alternatively, some of the beads 38 may not be configured to be reshaped, in which case adjustment of the longitudinal curvature of the stiffening element 30 may be accomplished by reshaping certain beads 38 selected from those which are configured to be reshaped.

The stiffening element 30 may have a height of approximately 1.25 inches and a total width of approximately 2.4 inches. The attachment member 32 may have a width of approximately 1.2 inches. Each shear member 34A, 34B may have a width of approximately 1.2 inches. Each of the first and second tension and compression members 36A, 36B may have a width of approximately 0.6 inches. Each bead 38 may have a maximum width of approximately 0.4 inches and a depth of approximately 0.2 inches, but different beads 38 may have different dimensions. The spacing from a center of one bead 38 to a center of an adjacent bead 38 is approximately 2 inches, but this dimension may also vary between different adjacent beads 38. Like the stiffening element 10, the stiffening element 30 may be utilized with a skin 12 that includes attachment surface features. And accordingly, in some embodiments of the stiffening element 30, the spacing from a center of one bead 38 to a center of an adjacent bead 38 may match (or may be selected to be compatible with) the spacing, or other dimensions, of the skin 12 features.

Like the stiffening element 10, the stiffening element 30 may be formed from thermoplastic composite materials and may be formed as a monolithic unit.

Figure 8:
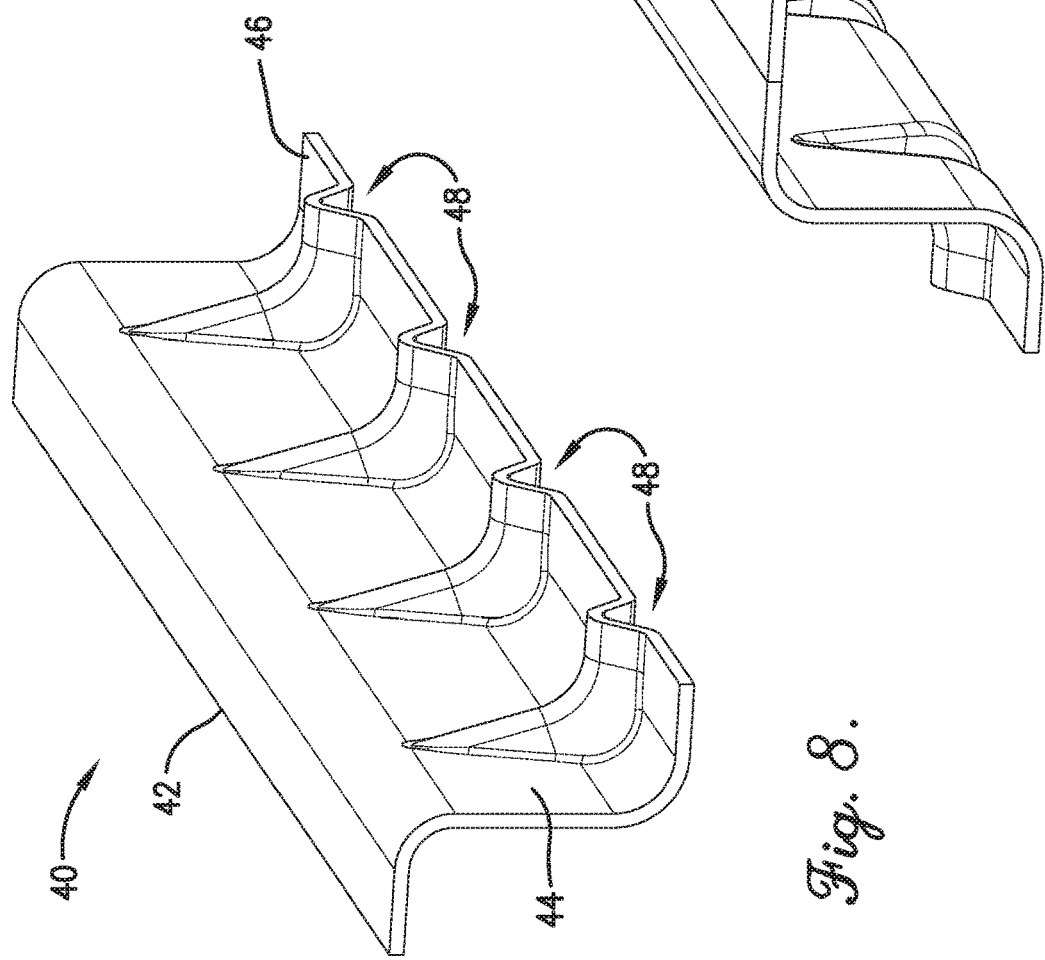
FIG. 8 is a perspective view of a stiffening element, constructed in accordance with other embodiments of the current invention, the stiffening element including a tension and compression member, a shear member, an attachment member, and a plurality of beads.

A stiffening element 40, constructed in accordance with other embodiments of the current invention, is shown in FIG. 8. The stiffening element 40 also provides structural reinforcement and may be considered, or similar to, a "Z" stringer. The stiffening element 40 broadly comprises a tension and compression member 42, a shear member 44, an attachment member 46, and a plurality of beads 48.

The tension and compression member 42 includes a generally planar elongated flange, beam, rail, or plank that provides stiffness and structural strength. The tension and compression member 42 bears, or carries, compression or tension forces that stiffen the skin 12 and prevent the skin 12 from bending or buckling. The tension and compression member 42 is spaced apart from, positioned offset from, or positioned away from, the skin 12, such that it is typically inward from the skin 12.

The shear member 44 may be a generally planar elongated flange, beam, rail, or plank with a first side edge connected to the tension and compression member 42. The shear member 44 may bear, or carry, the shear forces between the tension and compression member 42 and the skin 12. The shear member 44 may be oriented at a nonzero angle with respect to the tension and compression member 42. For example, if the tension and compression member 42 is positioned on a horizontal plane, then the first side edge of the shear member 44 may be connected to a first side edge of the tension and compression member 42 at an angle in the range of approximately 60 degrees to approximately 120 degrees. In various embodiments, the connection, joint, or intersection of the shear member 44 with the tension and compression member 42 may be filleted, rounded, arcuate, or may have another curvature.

The attachment member 46 may be a generally planar elongated flange, beam, rail, or plank. The attachment member 46 is connected to the shear member 44. In various embodiments, the connection, joint, or intersection of the attachment member 46 with the shear member 44 may be filleted, rounded, arcuate, or may have another curvature. In this Z-shaped configuration, the attachment member 46 and the tension and compression member 42 each extend away from the shear member 44 in opposing directions. The attachment member 46 is configured to attach to the skin 12.

In general, the attachment member 46 couples the skin 12 to the tension and compression member 42 through the shear member 44 such that any bending of the skin 12 also necessarily stretches or compresses the tension and compression member 42.

Each bead 48 may be an undulation, a ripple, or a wave creating an out-of-plane feature that is, as in previously described embodiments, positioned partially in the shear member 44 and may extend across substantially the entire width of the attachment member 46. The bead 48 may have an arch or roughly parabolic cross-sectional shape. The bead 48 extends in a transverse direction across the attachment member 46 and transversely into and across at least part of the shear member 44. The beads 48 are spaced apart from one another along the length of the stiffening element 40. The beads 48 may have the same dimensions and spacing along the stiffening element 40, or their dimensions and spacing my vary. Some, all, or only a portion of the beads 48 may be configured to be reshaped, in the same way as described above in connection with the embodiments illustrated in FIGS. 4-7.

Figure 9:
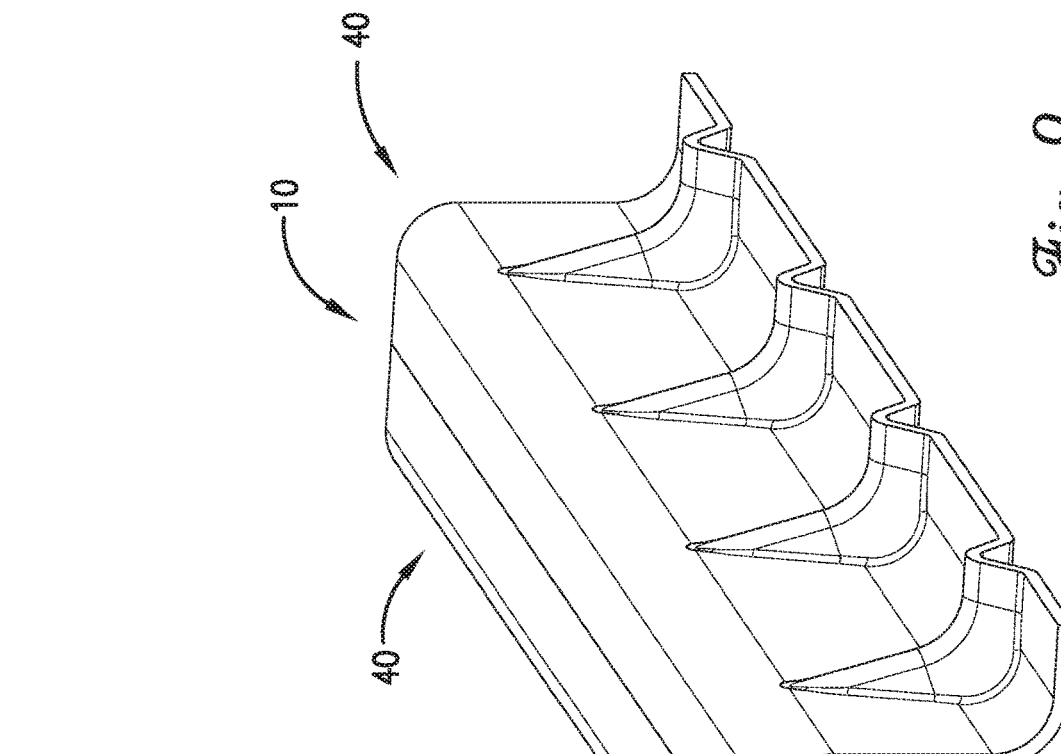
FIG. 9 is a perspective view of the stiffening element of FIGS. 4 and 5 formed by joining two of the stiffening elements of FIG. 8.

The stiffening element 40 may be utilized as a component to form either the stiffening element 10 or the stiffening element 30. When forming the stiffening element 10, two stiffening elements 40 are joined along the free edge of the tension and compression member 42 as shown in FIG. 9. When forming the stiffening element 30, two stiffening elements 40 are joined along the free edge of the attachment member 46 as shown in FIG. 10.

A stiffening element 50, constructed in accordance with other embodiments of the current invention, is shown in FIG. 11. The stiffening element 50 also provides structural reinforcement and may be considered, or similar to, a "C" stringer. The stiffening element 50 broadly comprises a tension and compression member 52, a shear member 54, an attachment member 56, and a plurality of beads 58.

The tension and compression member 52 includes a generally planar elongated flange, beam, rail, or plank that provides stiffness and structural strength. The tension and compression member 52 bears, or carries, compression or tension forces that stiffen the skin 12 and prevent the skin 12 from bending or buckling. The tension and compression member 52 is spaced apart from, positioned offset from, or positioned away from, the skin 12, such that it is typically inward from the skin 12.

The shear member 54 may be a generally planar web with a first edge connected to the tension and compression member 52 and an opposite edge connected to the attachment member 56. The shear member 54 can bear, or carry, the shear forces between the tension and compression member 52 and the skin 12. The shear member 54 may be oriented at a nonzero angle with respect to the tension and compression member 52. For example, if the tension and compression member 52 is positioned on a horizontal plane, then edge of the shear member 54 may be connected to the edge of the tension and compression member 52 at an angle in the range of approximately 60 degrees to approximately 120 degrees. In various embodiments, the connection, joint, or intersection of the shear member 54 with the tension and compression member 52 may be filleted, rounded, arcuate, or may have a curvature.

The attachment member 56 can be a generally planar elongated flange, beam, rail, or plank. The attachment member 56 is connected to one edge of the shear member 54 opposite the edge of the shear member 54 that is connected to the tension and compression member 52. In various embodiments, the connection, joint, or intersection of the attachment member 56 with the shear member 54 may be filleted, rounded, arcuate, or may have another curvature. In this C-shaped configuration the attachment member 56 and the tension and compression member 52 each extend away from the shear member 54 in the same direction. The attachment member 56 is configured to attach to the skin 12.

In general, the attachment member 56 couples the skin 12 to the tension and compression member 52 through the shear member 54 such that any bending of the skin 12 also necessarily stretches or compresses the tension and compression member 52.

Each bead 58 includes an undulation, a ripple, or a wave creating an out-of-plane feature that is positioned in the shear member 54 and the attachment member 56. The bead 58 may have an arch or roughly parabolic cross-sectional shape. The bead 58 is formed at least partly in the shear member 54 and extends in a transverse direction across the shear member 54 and extends into and across the entire width of the attachment member 56. The beads 58 are spaced apart from one another along the length of the stiffening element 50. The beads 50 may have the same dimensions, and spacing along the stiffening element 40, or their dimensions and spacing my vary. All, some, or only a portion of the beads 48 may be configured to be reshaped, as described above in connection with the embodiments illustrated in FIGS. 4-7.

The stiffening element 50 may be utilized as a component to form an "I-beam" whose curvature along a longitudinal axis may be adjusted. To form the I-beam as shown in FIG. 12, two stiffening elements 50 may be joined, e.g., using fasteners or adhesive, along the shear member 54, such that the shear members 54 are joined with one another. Alternatively or additionally, the tension and compression members 52 of the two stiffening elements 50 may be joined by adding additional elongated flange, beam, rail, or plank (not shown) that spans across both tension and compression members 52 and attaches to each. Such additional elongated flange, beam, rail, or plank may be a ply of composite material.

Although the terms "tension and compression member" and "shear member" are sometimes described herein as including or comprising a "generally planar elongated flange, beam, rail, or plank," one having ordinary skill in the art will readily understand that these are generalizations of typical stiffener configurations and should not be interpreted as limiting. In particular, the present invention may also be applied to bulb stiffeners and stiffeners having sinusoidal webs such as the stiffeners disclosed in co-pending U.S. patent application Ser. No. 16/690,445 (the "'445 application"), which is hereby incorporated herein by reference in its entirety. For example, the web 26 of the bulb stiffener 22 shown in FIG. 6 of the '445 application should be understood to be a "shear member" although it is not completely planar. Likewise, the bulb cap 24 of the bulb stiffener 22 shown in FIG. 6 of the '445 application should be understood to be a "tension and compression member" although it is not generally planar and does not have a constant thickness as the terms flange or plank may suggest. In various embodiments of the present invention, the tension and compression member may be a bulb member and/or the shear member may be a sine wave web.

It should also be understood that the use of the phrase "connected to" herein to describe the physical relationship between the various features of the stiffening element should not be construed to imply that the invention must be practiced by literally connecting discrete pieces in an assembly operation to form a completed stiffening element. Indeed, it is contemplated by the inventor that stiffening elements made in accordance with the present invention will most often be formed as monolithic units.

Figure 13:
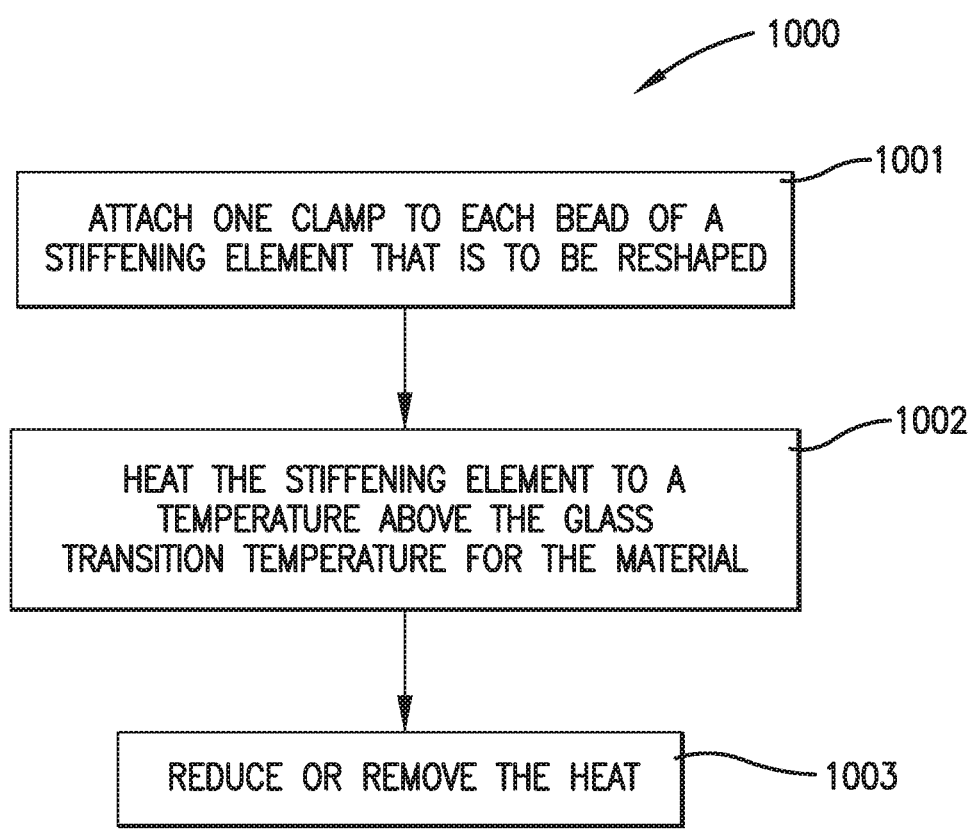
FIG. 13 is a listing of at least a portion of the steps of a first method of reshaping a bead of a stiffening element.

A listing of at least a portion of the steps of a first method 1000 of reforming or reshaping a stiffening element, such as the stiffening elements 10, 30, is shown in FIG. 13. The steps may be performed in the order shown in FIG. 13, or they may be performed in a different order. Furthermore, some steps may be performed concurrently as opposed to sequentially. In addition, some steps may be optional or may not be performed. The reforming or shaping of the stiffening element 10, 30 is performed to provide a longitudinal or lengthwise curvature to the stiffening element 10, 30 such that its longitudinal curvature roughly matches that of the inner surface of the skin 12 to which the stiffening element 10, 30 is to be attached. Typically, the skin 12 has a convex curvature. But, in some cases, the skin 12, or features or components attached to the inner surface of the skin 12, may have a concave curvature.

The reforming of the stiffening elements 10, 30 (to change their longitudinal curvature) is accomplished by applying forces to the beads 20, 38 as necessary to reshape the beads 20, 38. The nature of the force applied determines the new shape that the bead 20, 38 will have. For example, applying a force or pressure to the exterior of the bead 20 flattens, or decreases the height or depth of, the bead 20, 38, while applying a force or pressure to the interior of the bead 20 enhances, or increases the height or depth of, the bead 20, 38. Flattening the bead 20, 38 results in a convex curvature of the stiffening element 10, 30, and enhancing the bead 20, 38 results in a concave curvature of the stiffening element 10, 30.

The method 1000 utilizes clamps to reshape the beads 20, 38. The clamp varies according to whether the bead 20, 38 is on the stiffening element 10 or the stiffening element 30 and whether the bead 20, 38 is to be flattened or enhanced. Thus, there are four types of clamps. There is a first clamp 100 for flattening the bead 20 of the stiffening element 10, a second clamp 102 for enhancing the bead 20, a third clamp 104 for flattening the bead 38 of the stiffening element 30, and a fourth clamp 106 for enhancing the bead 38.

Figure 14:
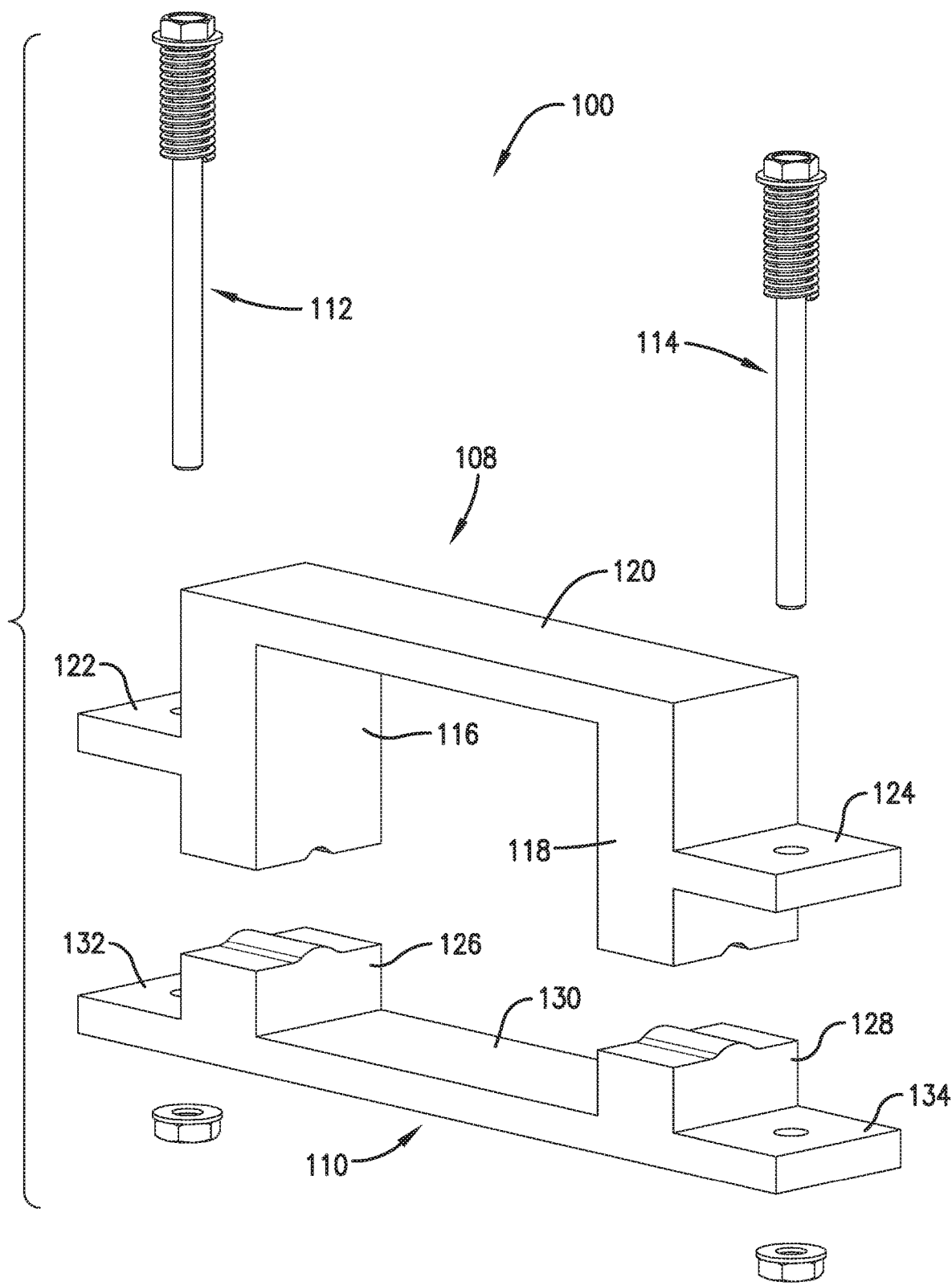
FIG. 14 is an upper perspective exploded view of a first clamp configured to flatten a bead of the stiffening element.
Figure 15:
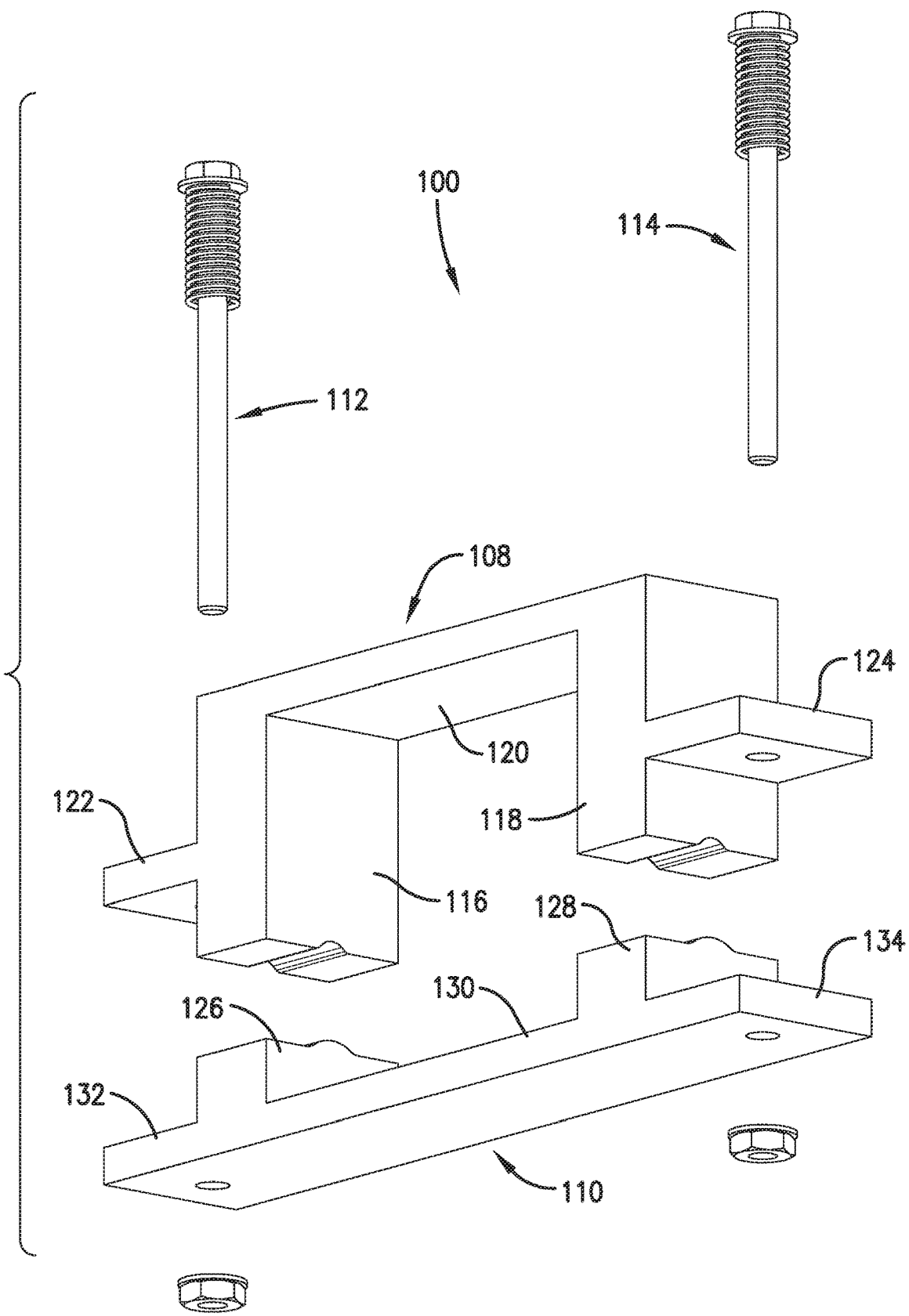
FIG. 15 is a lower perspective exploded view of the first clamp.

Referring to FIGS. 14 and 15, the first clamp 100 (for flattening the bead 20) includes an upper clamp member 108, a lower clamp member 110, and first and second fasteners 112, 114. The upper clamp member 108 includes first and second vertical walls 116, 118, a horizontal wall 120, and first and second bolt walls 122, 124. Each wall may have a generally rectangular box shape. The first and second vertical walls 116, 118 are spaced apart from one another, with the horizontal wall 120 positioned therebetween, connected to an upper edge of each vertical wall 116, 118. The first and second bolt walls 122, 124 each include a through hole to receive a fastener such as a bolt. The first bolt wall 122 is connected to an outer surface of the first vertical wall 116, while the second bolt wall 124 is connected to an outer surface of the second vertical wall 118. Each of the vertical walls 116, 118 includes a concave face to contact at least a portion of the bead 20, wherein the concave face has a recess, an indentation, or a depression that has a depth smaller than a height of the bead 20 to be flattened.

The lower clamp member 110 includes first and second vertical walls 126, 128, a horizontal wall 130, and first and second bolt walls 132, 134. Each wall may have a generally rectangular box shape. The first and second vertical walls 126, 128 are spaced apart from one another, with the horizontal wall 130 positioned therebetween, connected to a lower edge of each vertical wall 126, 128. The first and second bolt walls 132, 134 each include a through hole to receive a fastener such as a bolt. The first bolt wall 132 is connected to an outer surface of the first vertical wall 126, while the second bolt wall 134 is connected to an outer surface of the second vertical wall 128. Each of the vertical walls 126, 128 includes a convex face to contact at least a portion of the bead 20, wherein the convex face has a ridge, a bulge, or a protrusion that has a height smaller than a depth of the bead 20 to be flattened. The first and second vertical walls 126, 128 generally align with the first and second vertical walls 116, 118. And, the convex faces of the first and second vertical walls 126, 128 are generally complementary to the concave faces of the first and second vertical walls 116, 118.

The first and second fasteners 112, 114 each include a bolt, a nut, and a spring. For each fastener 112, 114, the spring is placed coaxially on the bolt. Each bolt is placed through the holes in the bolt walls 122, 124, 132, 134 so that the spring rests on the upper surface of the first and second bolt walls 122, 124. Each nut is attached to one of the bolts in a traditional manner.

Figure 16:
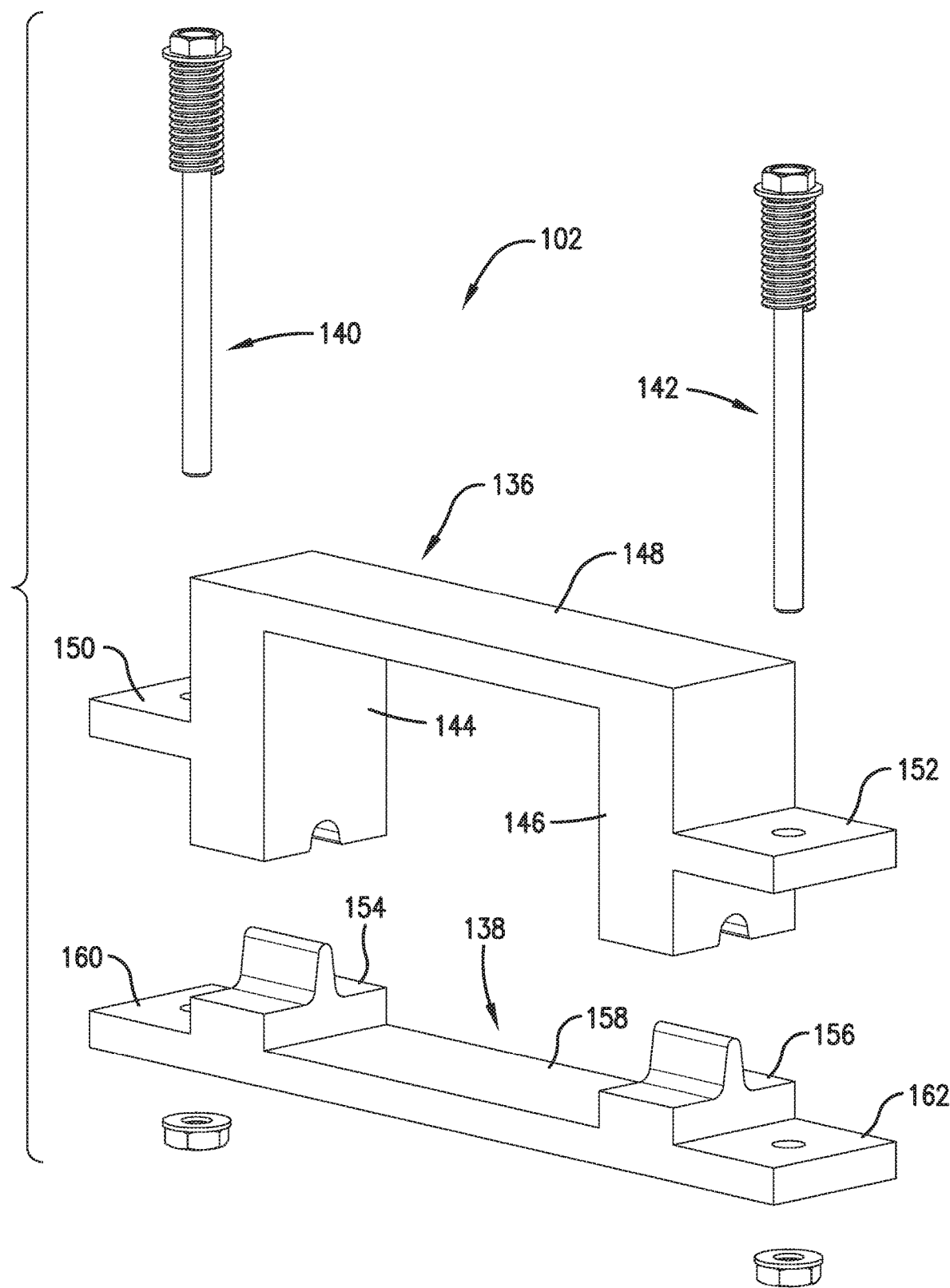
FIG. 16 is an upper perspective exploded view of a second clamp configured to enhance a bead of the stiffening element.
Figure 17:
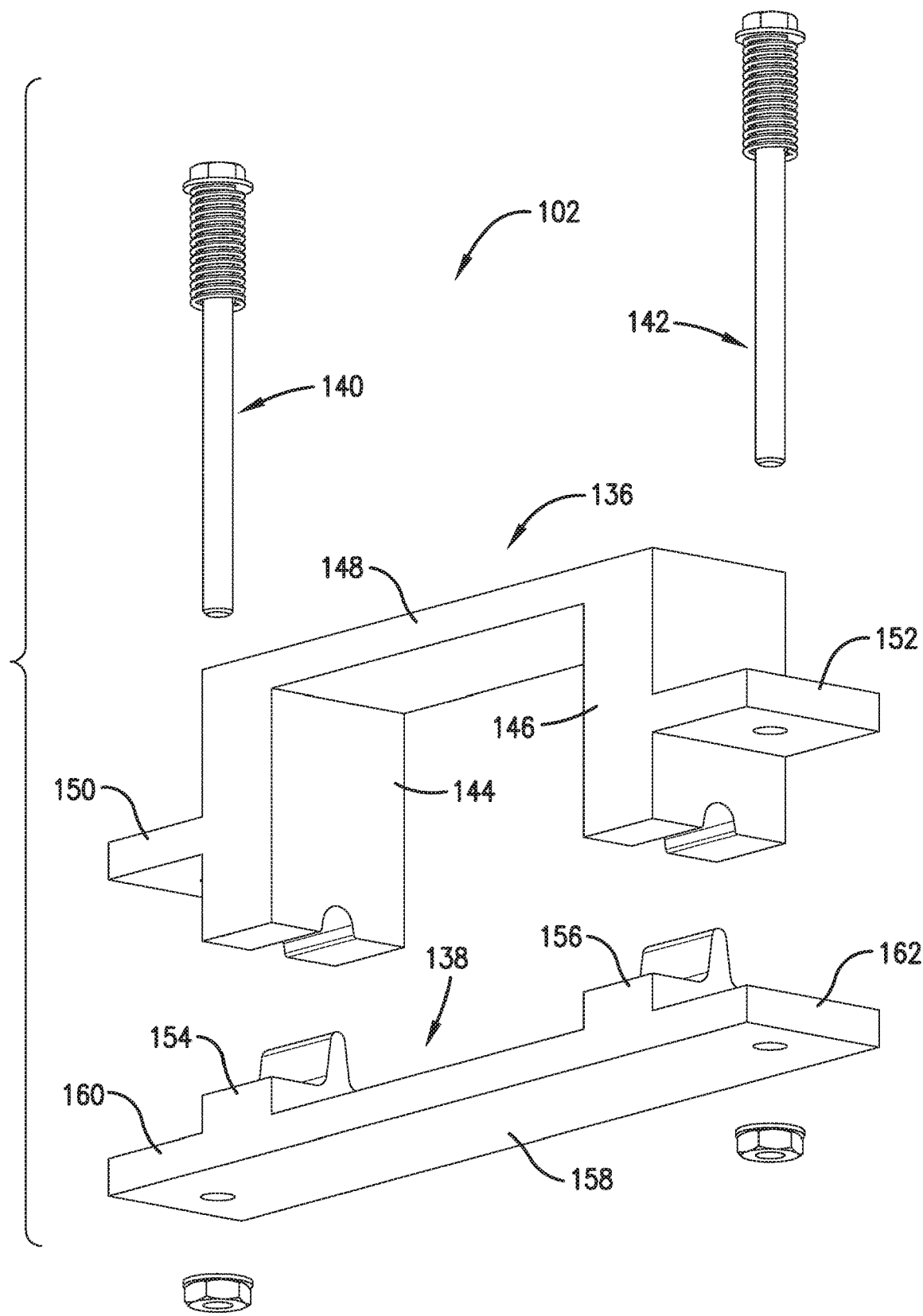
FIG. 17 is a lower perspective exploded view of the second clamp.

Referring to FIGS. 16 and 17, the second clamp 102 (for enhancing the bead 20) includes an upper clamp member 136, a lower clamp member 138, and first and second fasteners 140, 142. The upper clamp member 136 includes first and second vertical walls 144, 146, a horizontal wall 148, and first and second bolt walls 150, 152. The lower clamp member 138 includes first and second vertical walls 154, 156, a horizontal wall 158, and first and second bolt walls 160, 162. The first and second fasteners 140, 142 each include a bolt, a nut, and a spring. The second clamp 102 is substantially similar to the first clamp 100, except that each concave face of the vertical walls 144, 146 has a recess, an indentation, or a depression that receives the bead 20 to be enhanced. And, each convex face of the vertical walls 154, 156 has a ridge, a bulge, or a protrusion that has a height greater than the bead 20 to be enhanced.

Figure 18:
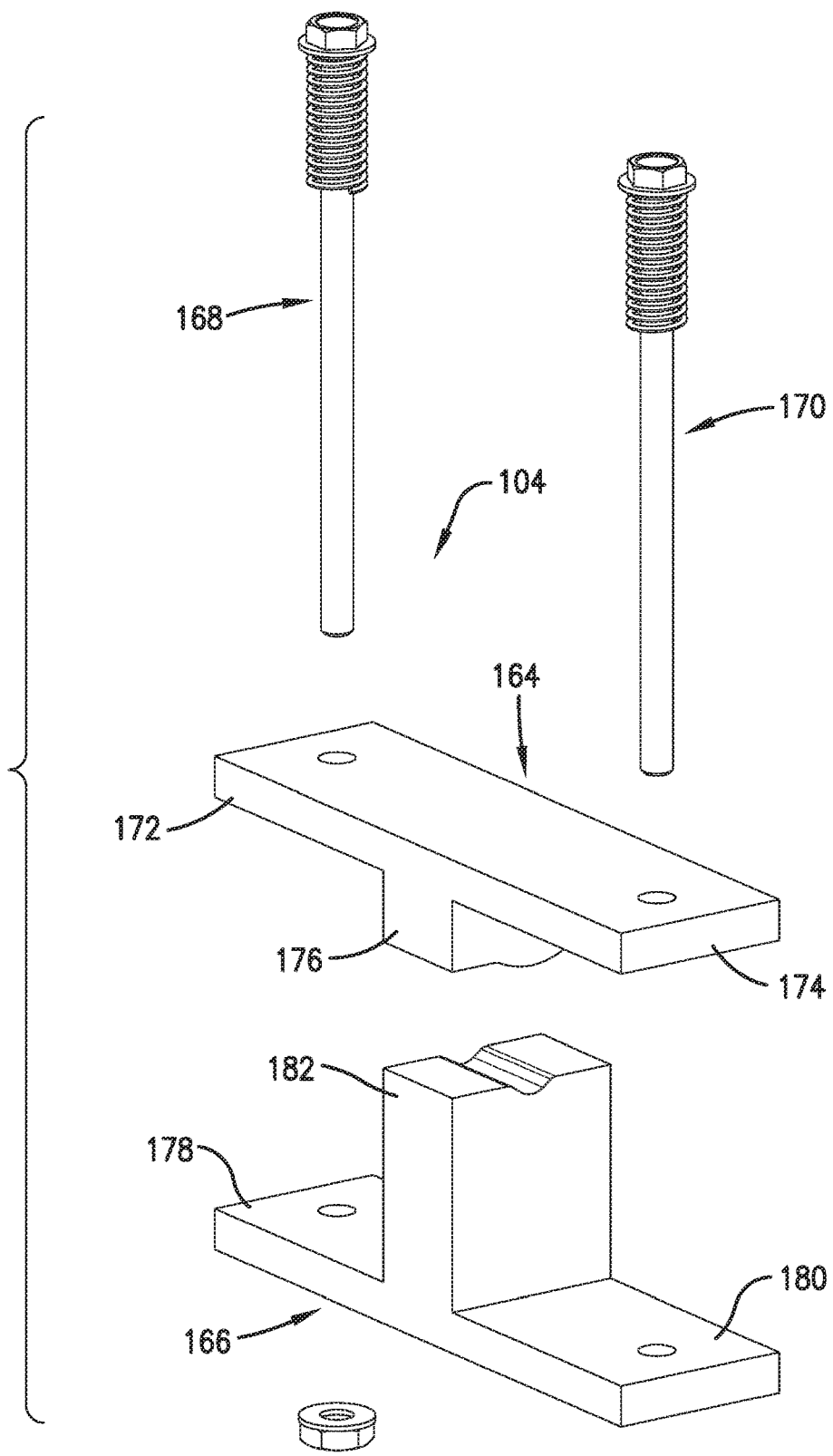
FIG. 18 is an upper perspective exploded view of a first clamp configured to flatten a bead of the stiffening element.
Figure 19:
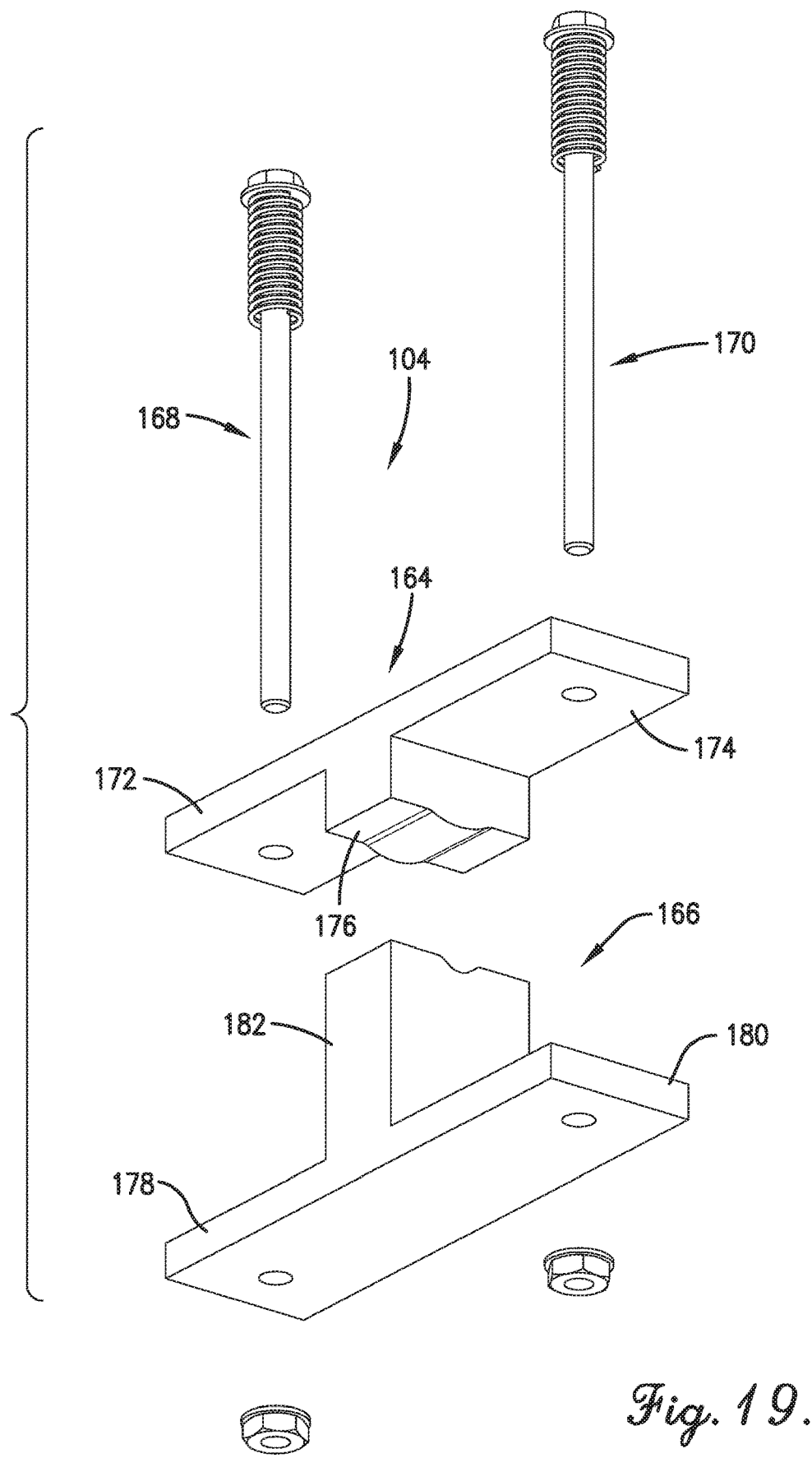
FIG. 19 is a lower perspective exploded view of the first clamp.

Referring to FIGS. 18 and 19, the third clamp 104 (for flattening the bead 38) includes an upper clamp member 164, a lower clamp member 166, and first and second fasteners 168, 170. The upper clamp member 164 includes first and second bolt walls 172, 174 and an upper central wall 176. Each wall may have a generally rectangular box shape. The first and second bolt walls 172, 174 each include a through hole to receive a fastener such as a bolt. The first and second bolt walls 172, 174 are connected to one another to form an elongated beam. The upper central wall 176 is connected to the intersection of the first and second bolt walls 172, 174. The upper central wall 176 includes a convex face to contact at least a portion of the bead 38, wherein the convex face has a ridge, a bulge, or a protrusion that has a height smaller than a depth of the bead 38 to be flattened.

The lower clamp member 166 includes first and second bolt walls 178, 180 and a lower central wall 182. Each wall may have a generally rectangular box shape. The first and second bolt walls 178, 180 each include a through hole to receive a fastener such as a bolt. The first and second bolt walls 178, 180 are connected to one another to form an elongated beam. The lower central wall 182 is connected to the intersection of the first and second bolt walls 178, 180. The lower central wall 182 includes a concave face to contact at least a portion of the bead 38, wherein the concave face has a recess, an indentation, or a depression that has a depth smaller than a height of the bead 38 to be flattened. The lower central wall 182 generally aligns with the upper central wall 176. And, the concave face of the lower central wall 182 is generally complementary to the convex face of the upper central wall 176.

The first and second fasteners 168, 170 each include a bolt, a nut, and a spring. For each fastener 168, 170, the spring is placed coaxially on the bolt. Each bolt is placed through the holes in the bolt walls 172, 174, 178, 180 so that the spring rests on the upper surface of the first and second bolt wall 172, 174. Each nut is attached to one of the bolts in a traditional manner.

Figure 20:
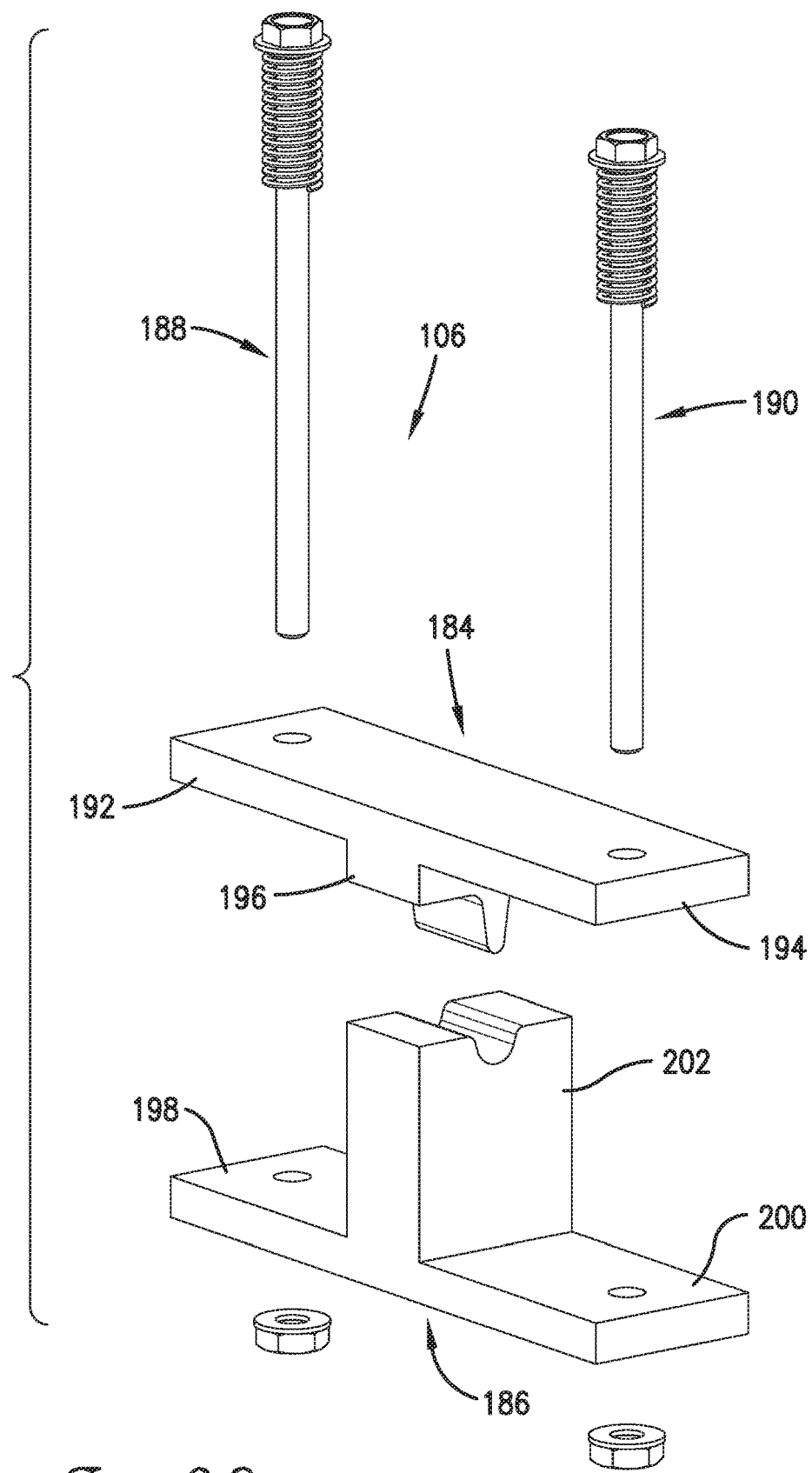
FIG. 20 is an upper perspective exploded view of a second clamp configured to enhance a bead of the stiffening element.
Figure 21:
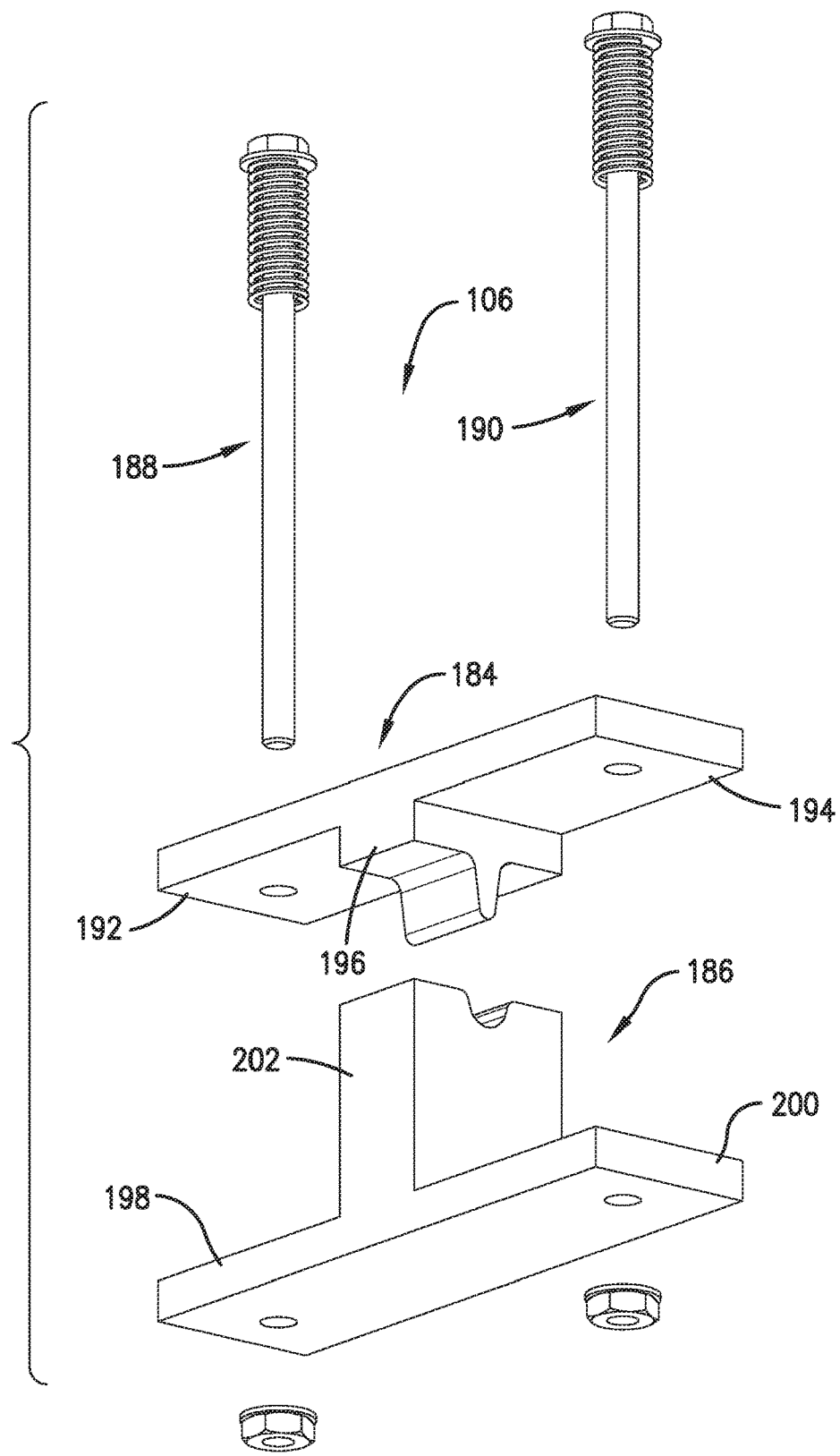
FIG. 21 is a lower perspective exploded view of the second clamp.
Figure 22:
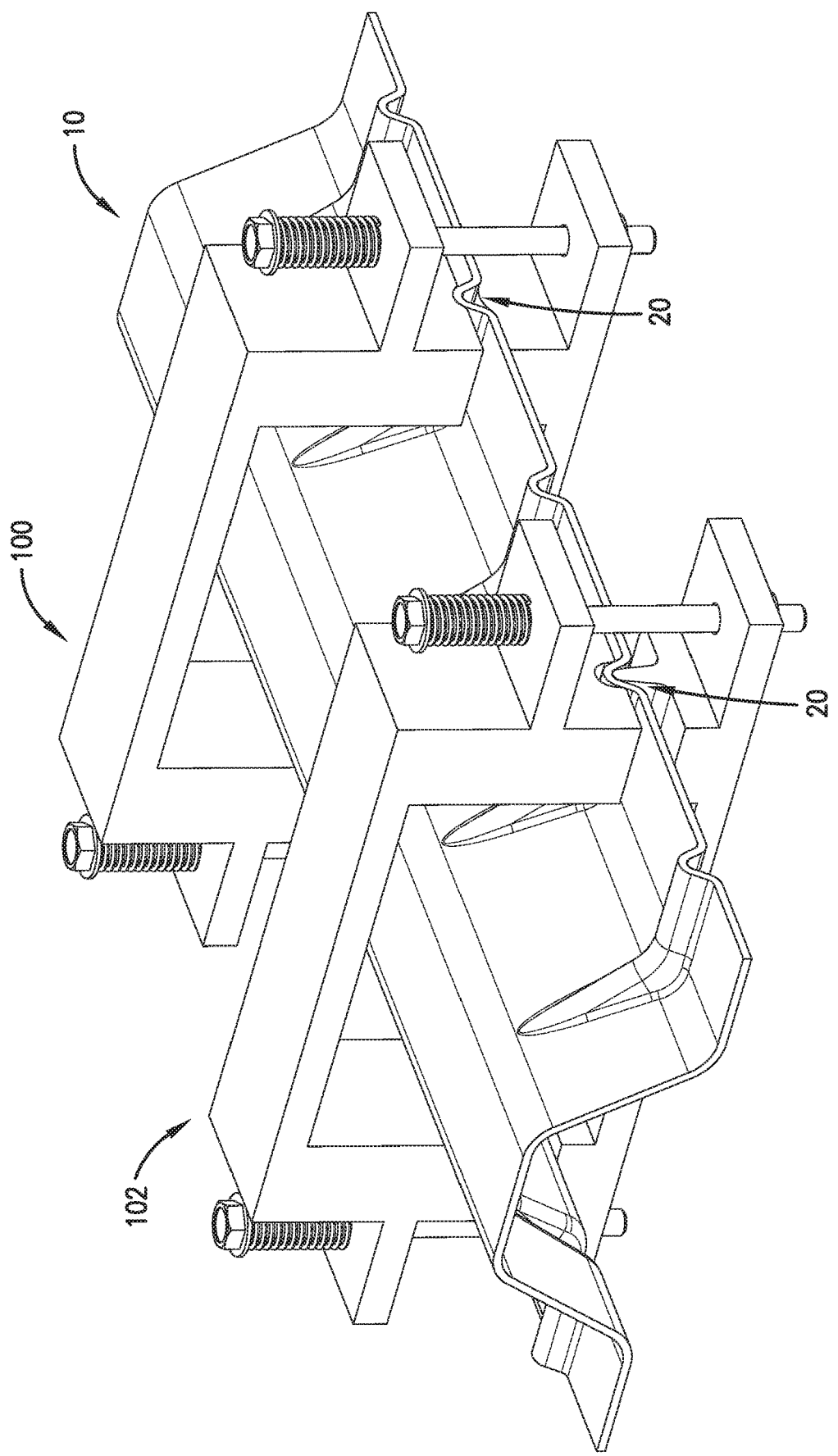
FIG. 22 is an upper perspective view of the stiffening element with the first clamp attached to flatten a first bead and the second clamp attached to enhance a second bead.
Figure 23:
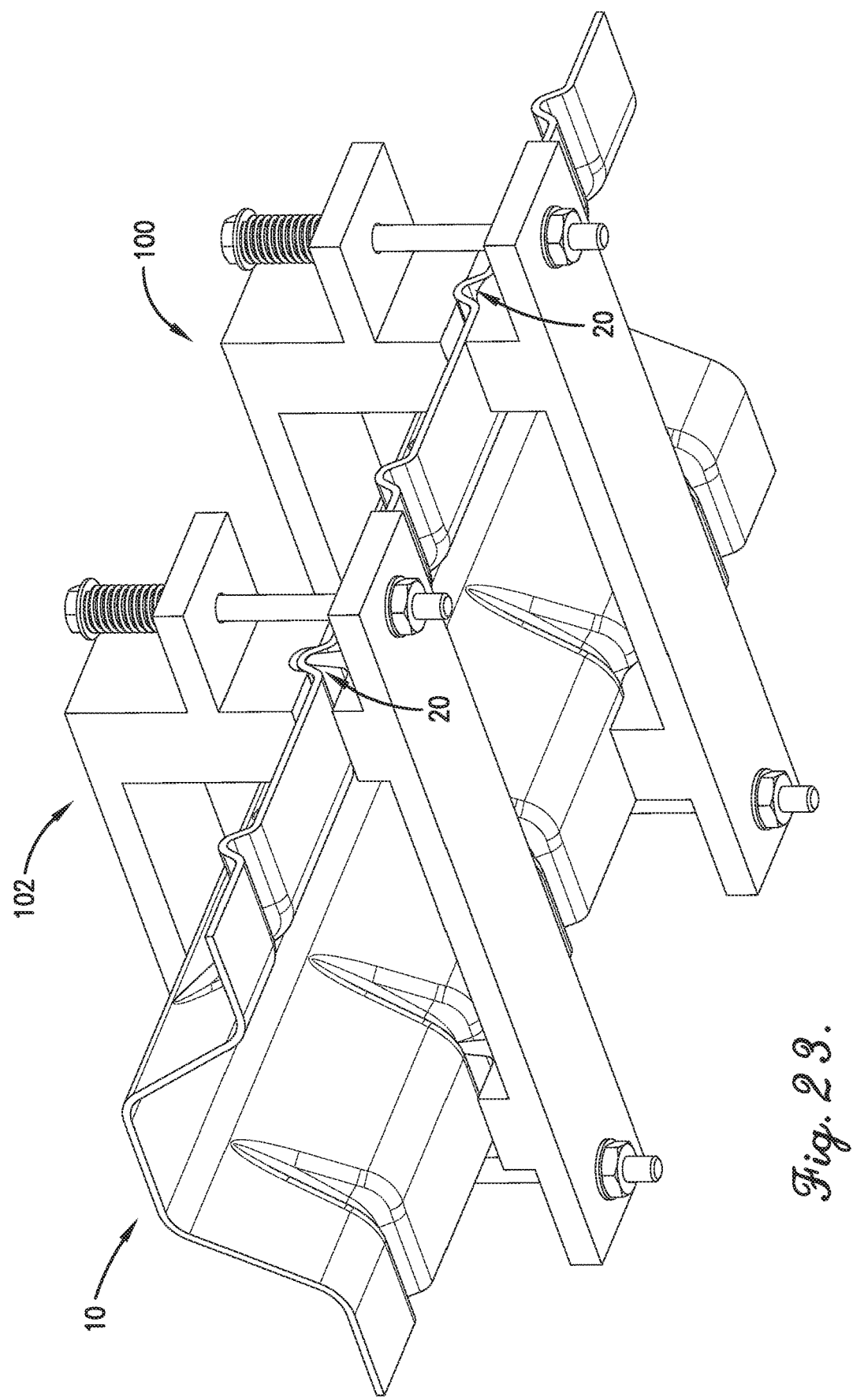
FIG. 23 is a lower perspective view of the stiffening element with the first clamp and the second clamp.
Figure 24:
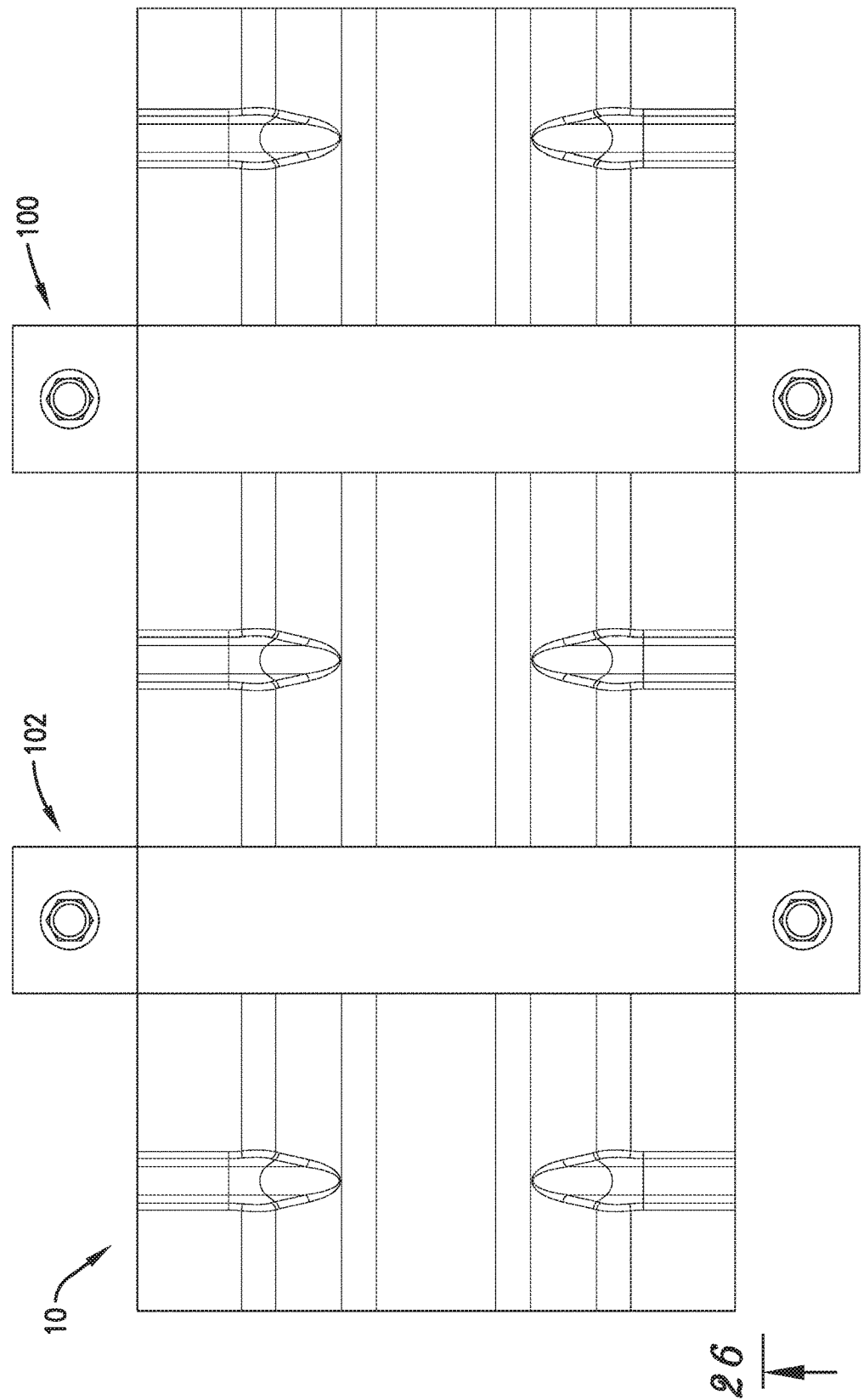
FIG. 24 is a top view of the stiffening element with the first clamp and the second clamp.

Referring to FIGS. 20 and 21, the fourth clamp 106 (for enhancing the bead 38) includes an upper clamp member 184, a lower clamp member 186, and first and second fasteners 188, 190. The upper clamp member 184 includes first and second bolt walls 192, 194 and an upper central wall 196. The lower clamp member 186 includes first and second bolt walls 198, 200 and a lower central wall 202. The first and second fasteners 188, 190 each include a bolt, a nut, and a spring. The fourth clamp 106 is substantially similar to the third clamp 104, except that the convex face of the upper central wall 196 has a ridge, a bulge, or a protrusion that has a height greater than the bead 38 to be enhanced. And, the concave face of the lower central wall 202 has a recess, an indentation, or a depression that receives the bead 38 to be enhanced.

Referring to step 1001, one of the four types of clamps 100, 102, 104, 106 is attached to each bead 20, 38 that is desired to be reshaped. For flattening a bead 20, the first clamp 100 is utilized. For enhancing a bead 20, the second clamp 102 is utilized. For flattening a bead 38, the third clamp 104 is utilized. For enhancing a bead 38, the fourth clamp 106 is utilized.

Generally, one of the lower clamp members 110, 138, 166, 186 is placed on a work surface. The stiffening element 10, 30 is placed on the lower clamp member 110, 138, 166, 186. And, a corresponding one of the upper clamp members 108, 136, 164, 184 is placed on the stiffening element 10, 30. The one of the lower clamp members 110, 138, 166, 186 contacts at least a portion of a first surface of the bead 20, 38, and the corresponding one of the upper clamp members 108, 136, 164, 184 contacts at least a portion of a second, opposing surface of the bead 20, 38. FIGS. 22-29 illustrate the stiffening element 10 with the first clamp 100 being utilized to flatten a first bead 20 and the second clamp 102 being utilized to enhance a second bead 20. During attachment, the ridges and the recesses of the first and second vertical walls 116, 118, 126, 128, 144, 146, 154, 156 are aligned with the bead 20, and the convex and concave faces of the first and second vertical walls 116, 118, 126, 128, 144, 146, 154, 156 contact the attachment member 18. FIGS. 33-40 illustrate the stiffening element 30 with the third clamp 104 being utilized to flatten a first bead 38 and the fourth clamp 106 being utilized to enhance a second bead 38. During attachment, the ridges and the recesses of the upper and lower central walls 176, 182, 196, 202 are aligned with the bead 38, and the convex and concave faces of the upper and lower central walls 176, 182, 196, 202 contact the attachment member 32. After placement of the clamps 100, 102, 104, 106 on the stiffening elements 10, 30, the bolts of each fastener 112, 114, 140, 142, 168, 170, 188, 190 are placed through the respective holes of the bolt walls 122, 124, 132, 134, 150, 152, 160, 162, 172, 174, 178, 180, 192, 194, 198, 200 and the nuts are attached and tightened.

While the stiffening element 10, 30 is in the clamp 100, 102, 104, 106 as the nuts are tightened on the bolts, the springs of the fasteners 112, 114, 140, 142, 168, 170, 188, 190 apply a downward force or pressure on the upper clamp member 108, 136, 164, 184, which in turn applies a force or pressure on the stiffening element 10, 30 toward the lower clamp member 110, 138, 166, 186.

Referring to step 1002, the stiffening element 10, 30 is heated to a temperature above the glass transition temperature for the material of the stiffening element 10, 30. At this temperature, the stiffening element 10, 30 becomes malleable and the forces or pressures applied by the springs of the fasteners 112, 114, 140, 142, 168, 170, 188, 190 urge the convex and concave faces to reshape the bead 20, 38. If the first clamp 100 or the third clamp 104 was utilized, then the bead 20, 38 is flattened. If the second clamp 102 or the fourth clamp 106 was utilized, then the bead 20, 38 is enhanced.

Figure 30:
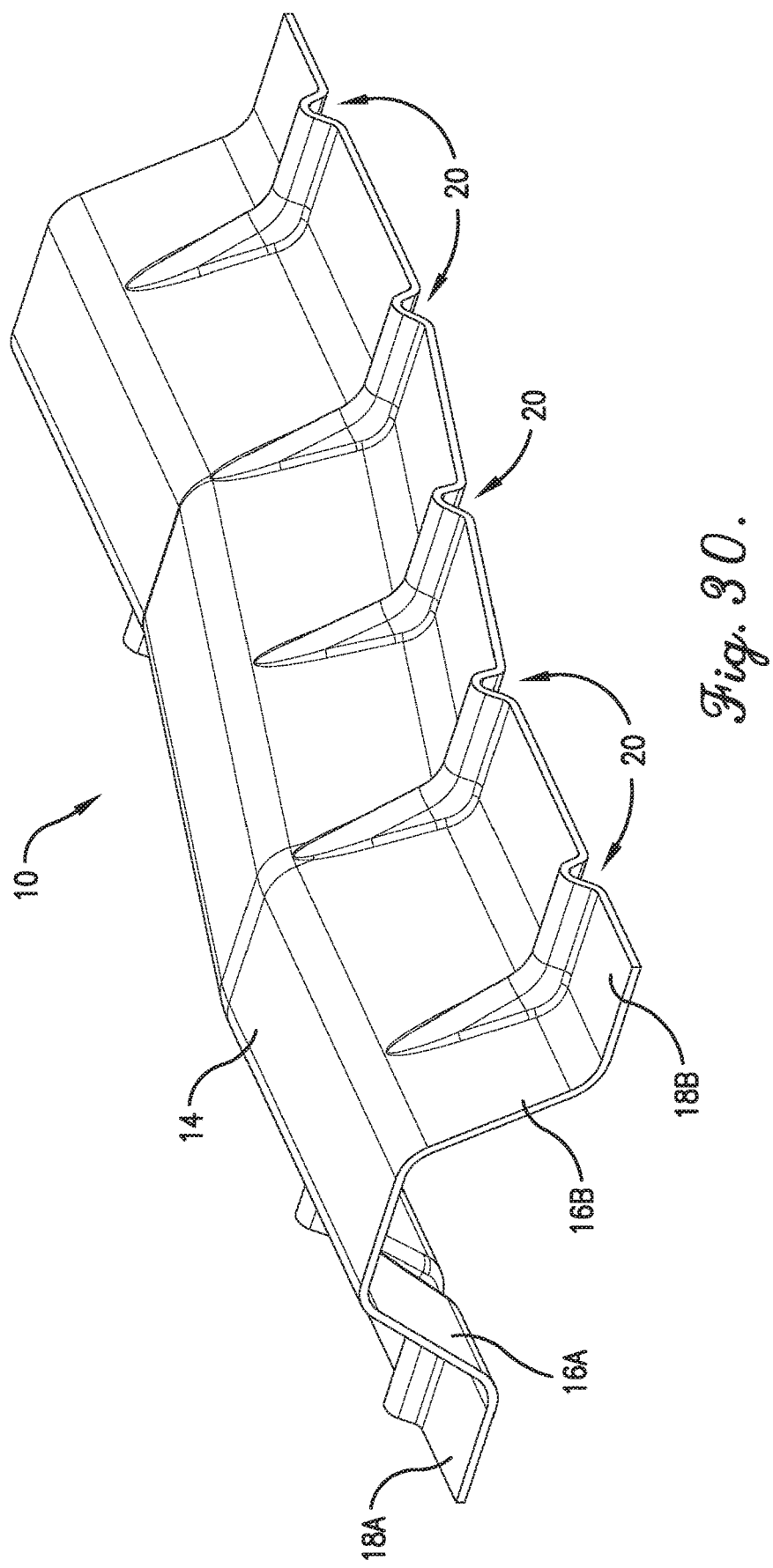
FIG. 30 is an upper perspective view of the stiffening element after heat has been applied and the clamps have been removed.
Figure 31:
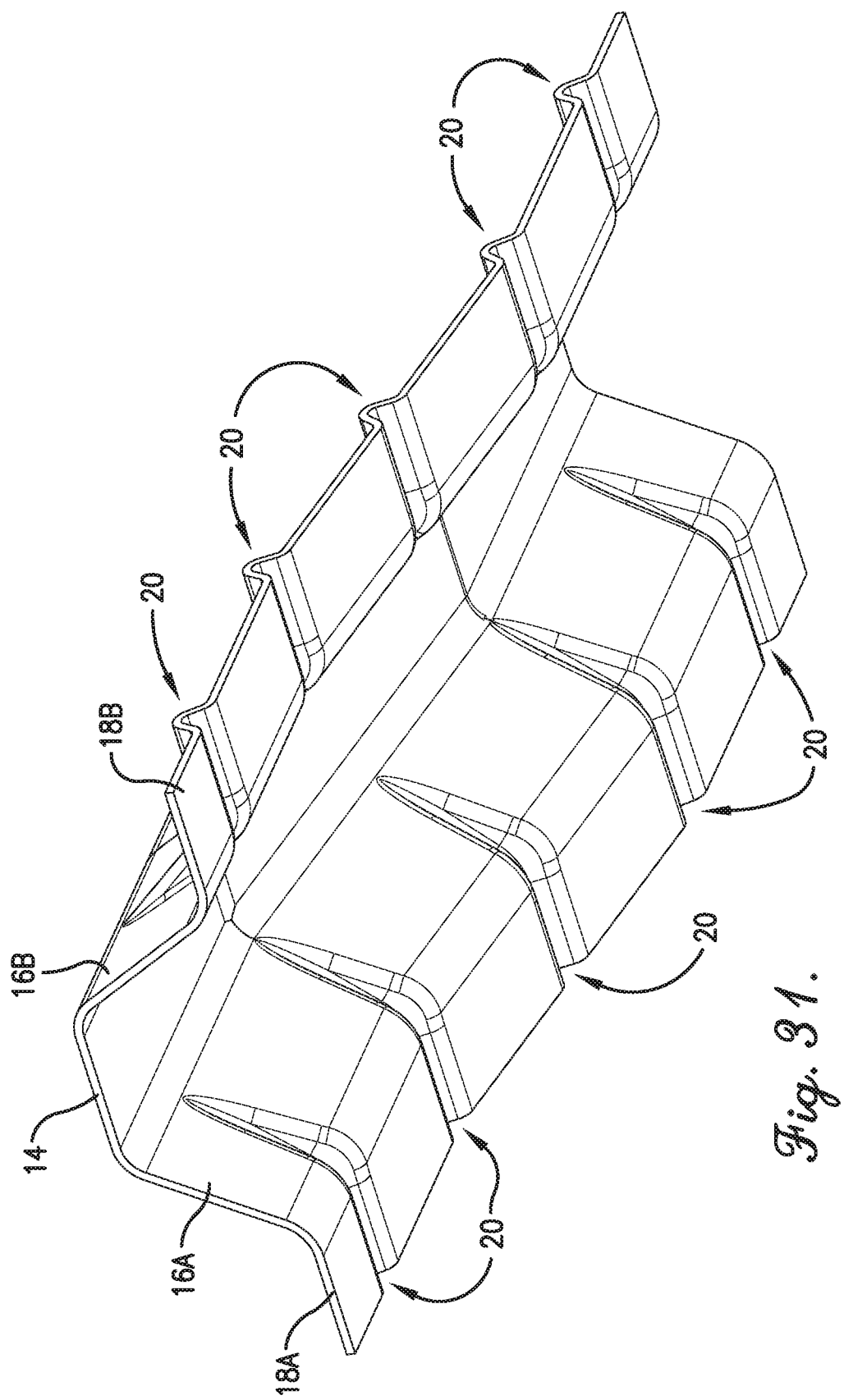
FIG. 31 is a lower perspective view of the stiffening element after heat has been applied and the clamps have been removed.
Figure 32:
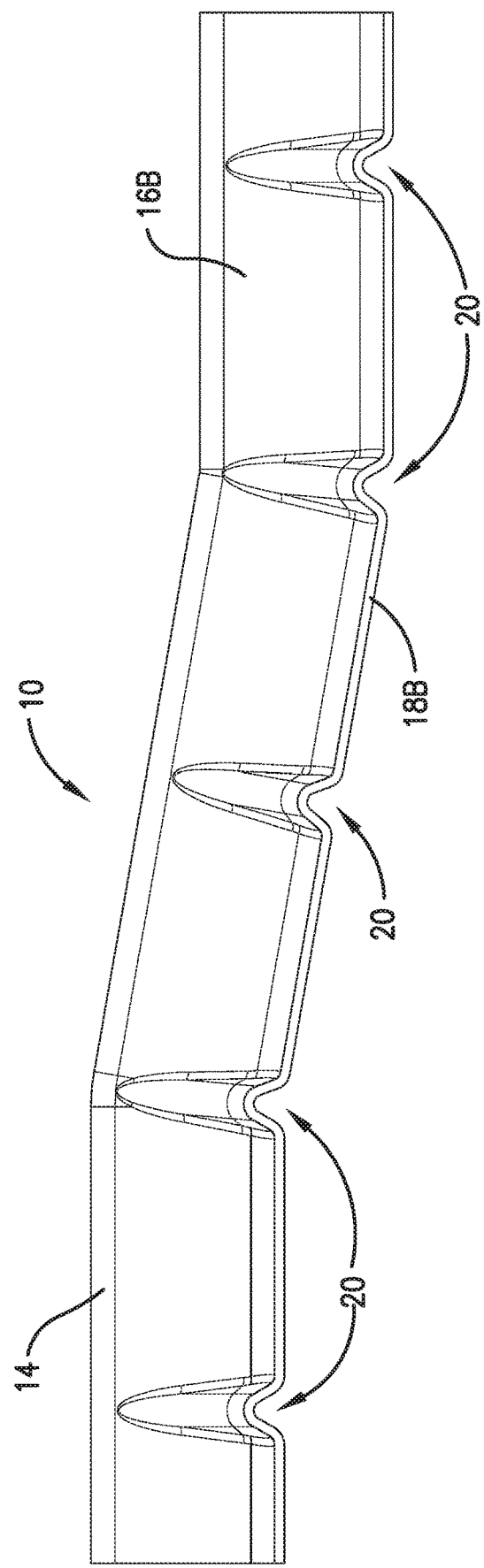
FIG. 32 is a side view of the stiffening element after heat has been applied and the clamps have been removed.
Figure 33:
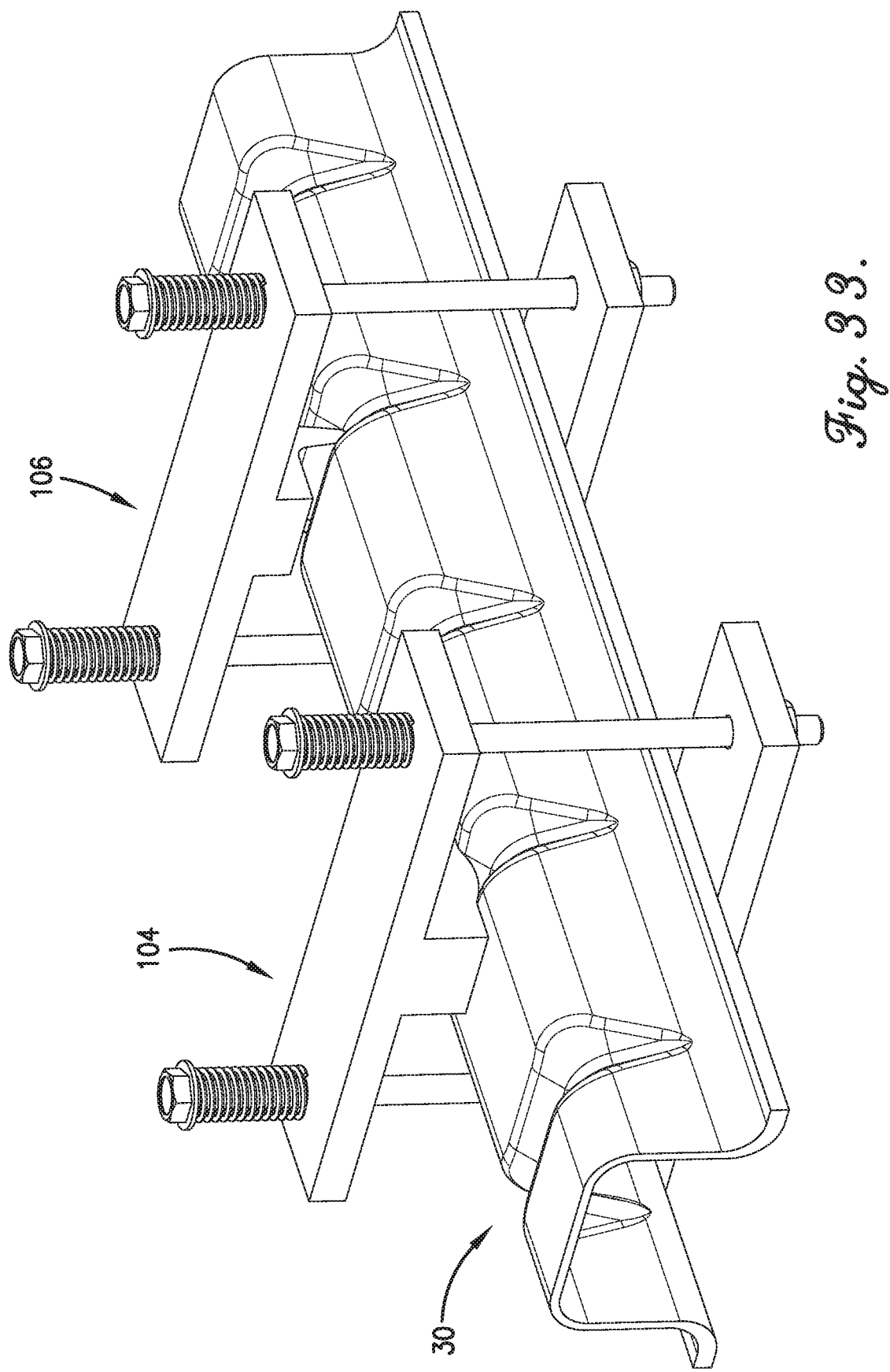
FIG. 33 is an upper perspective view of the stiffening element with the first clamp attached to flatten a first bead and the second clamp attached to enhance a second bead.
Figure 34:
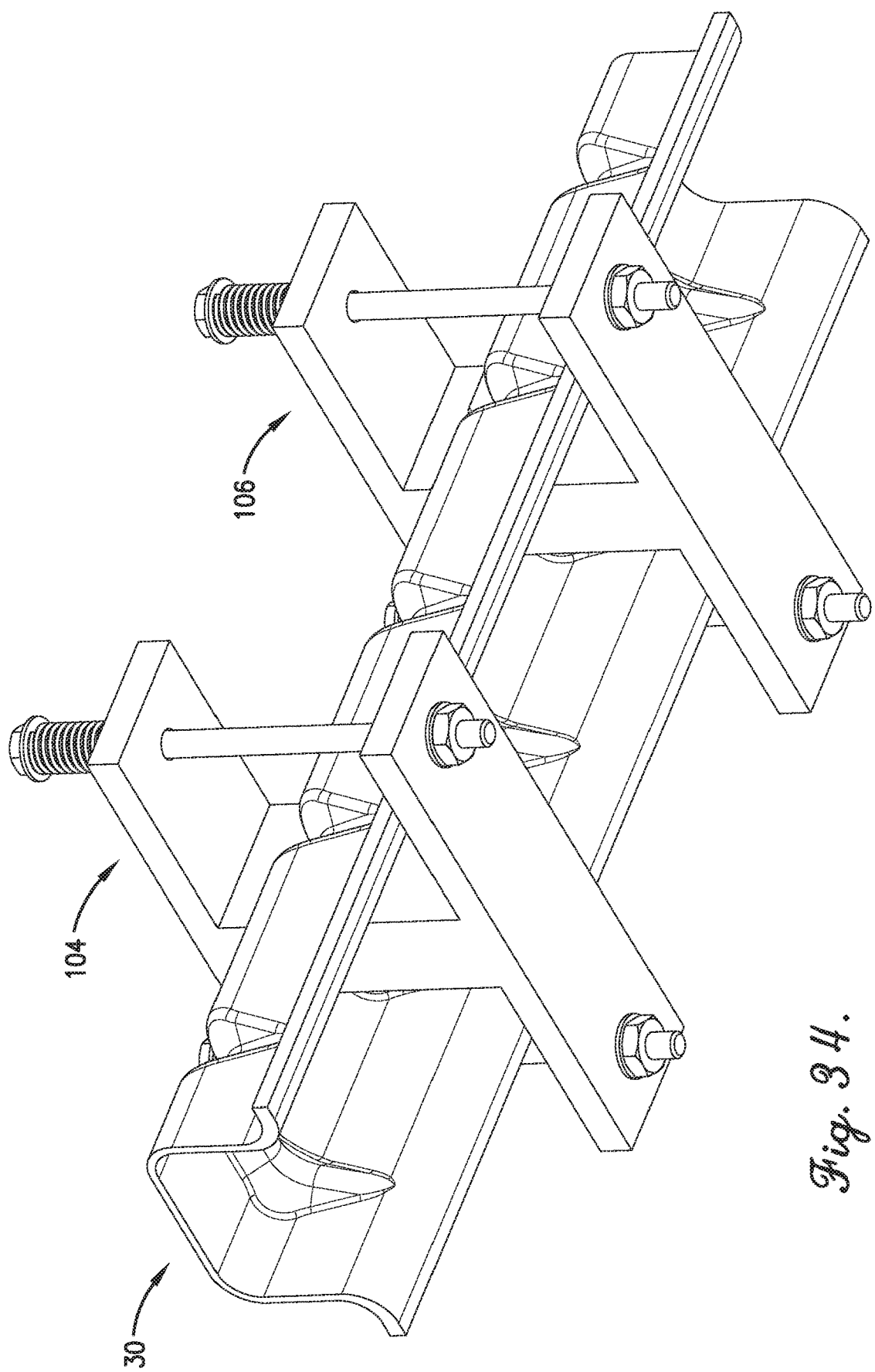
FIG. 34 is a lower perspective view of the stiffening element with the first clamp and the second clamp.
Figure 35:
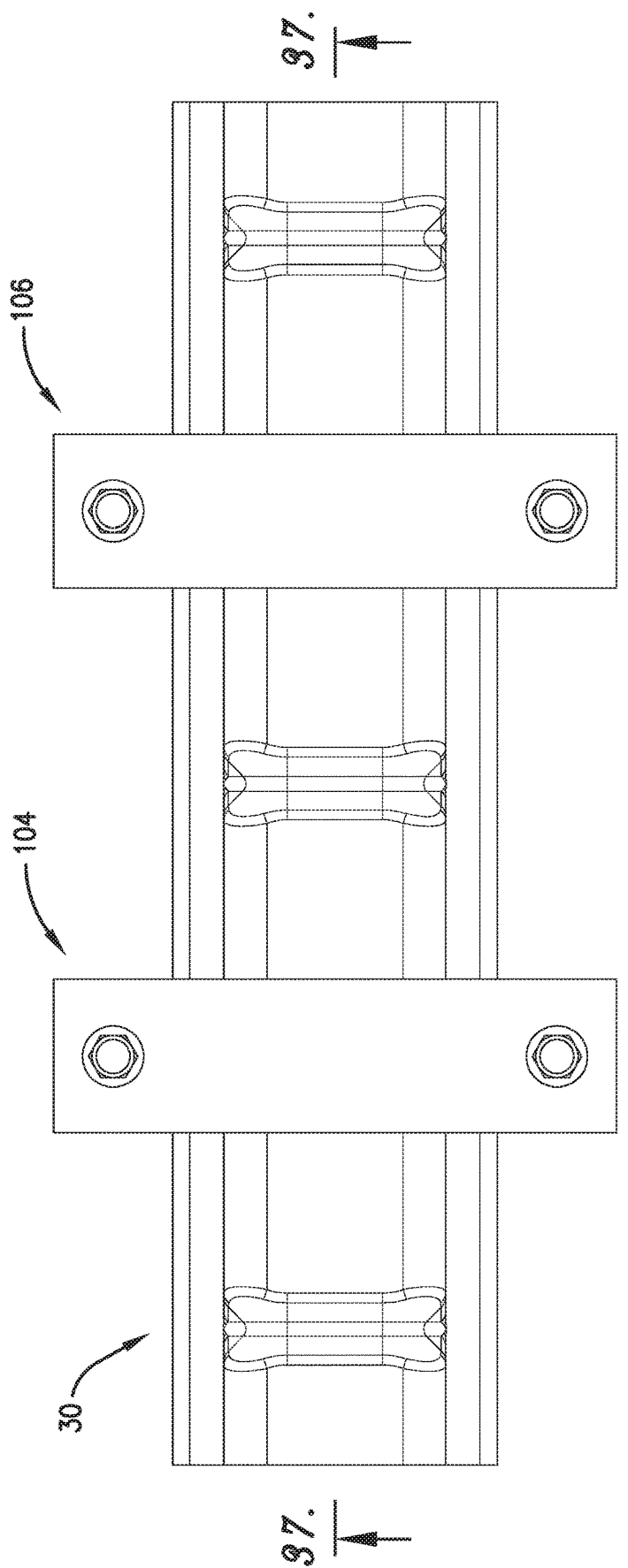
FIG. 35 is a bottom view of the stiffening element with the first clamp and the second clamp.
Figure 36:
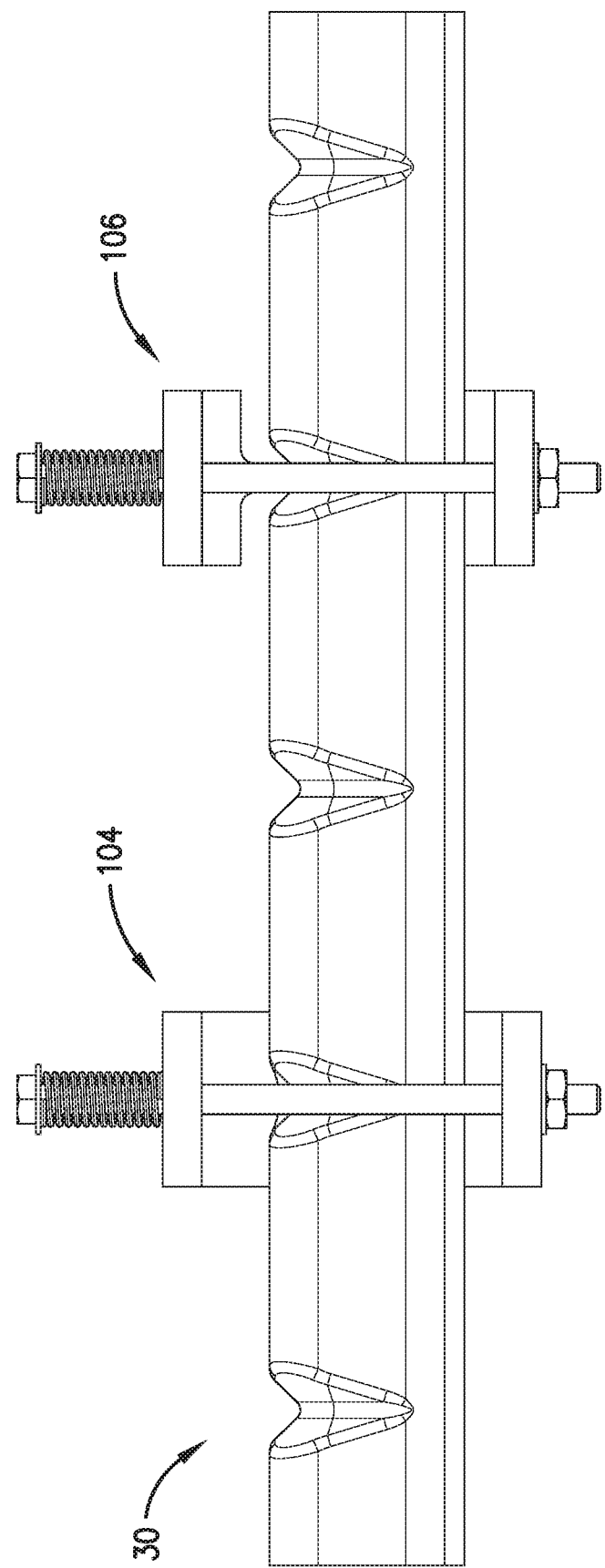
FIG. 36 is a side view of the stiffening element with the first clamp and the second clamp.
Figure 37:
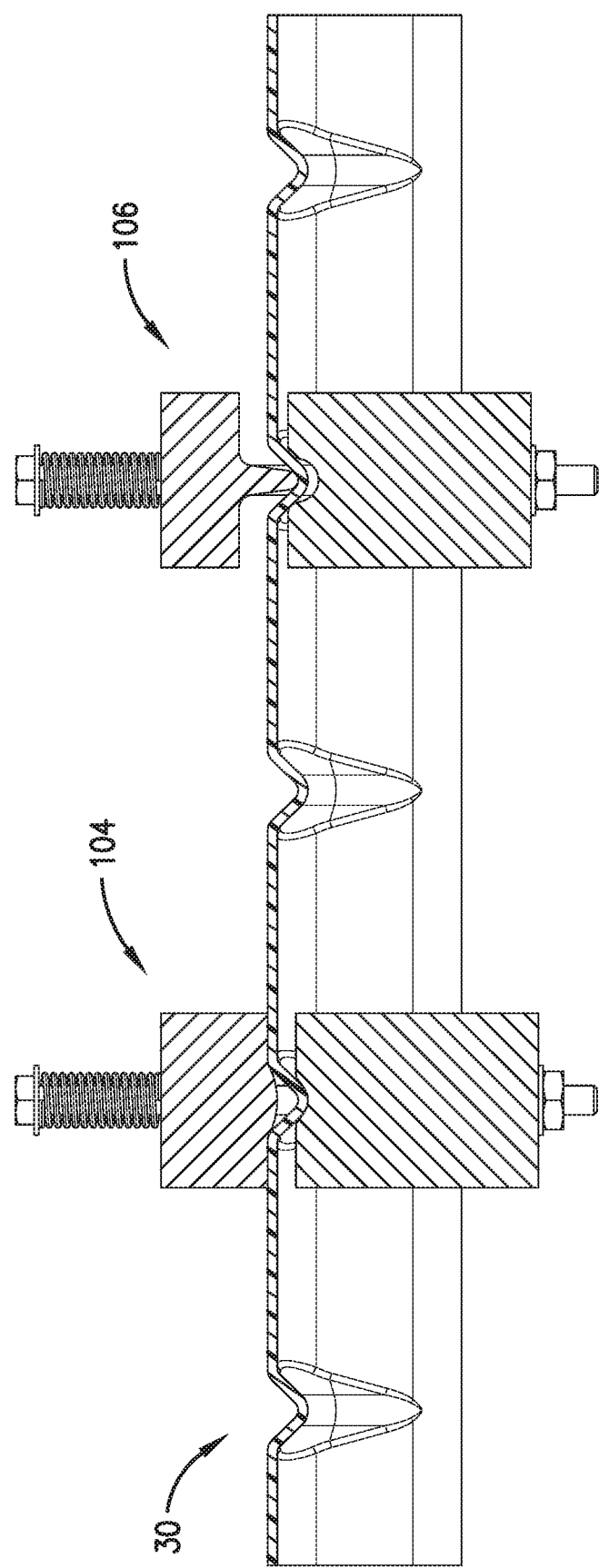
FIG. 37 is a side sectional view of the stiffening element with the first clamp and the second clamp cut along the line 32-32 in FIG. 30.
Figure 38:
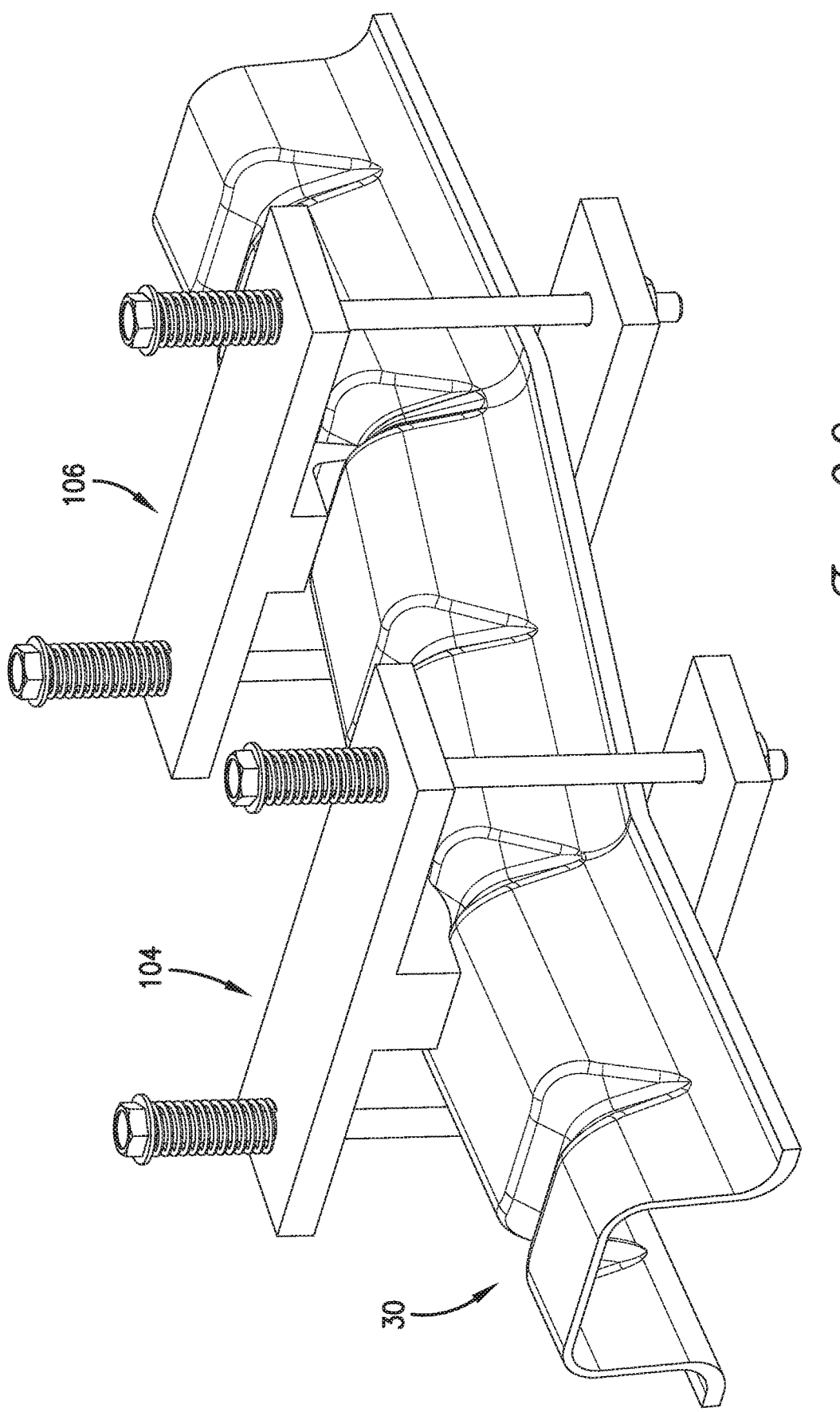
FIG. 38 is an upper perspective view of the stiffening element with the first clamp and the second clamp after heat has been applied to the stiffening element and the first and second beads have been reshaped.
Figure 39:
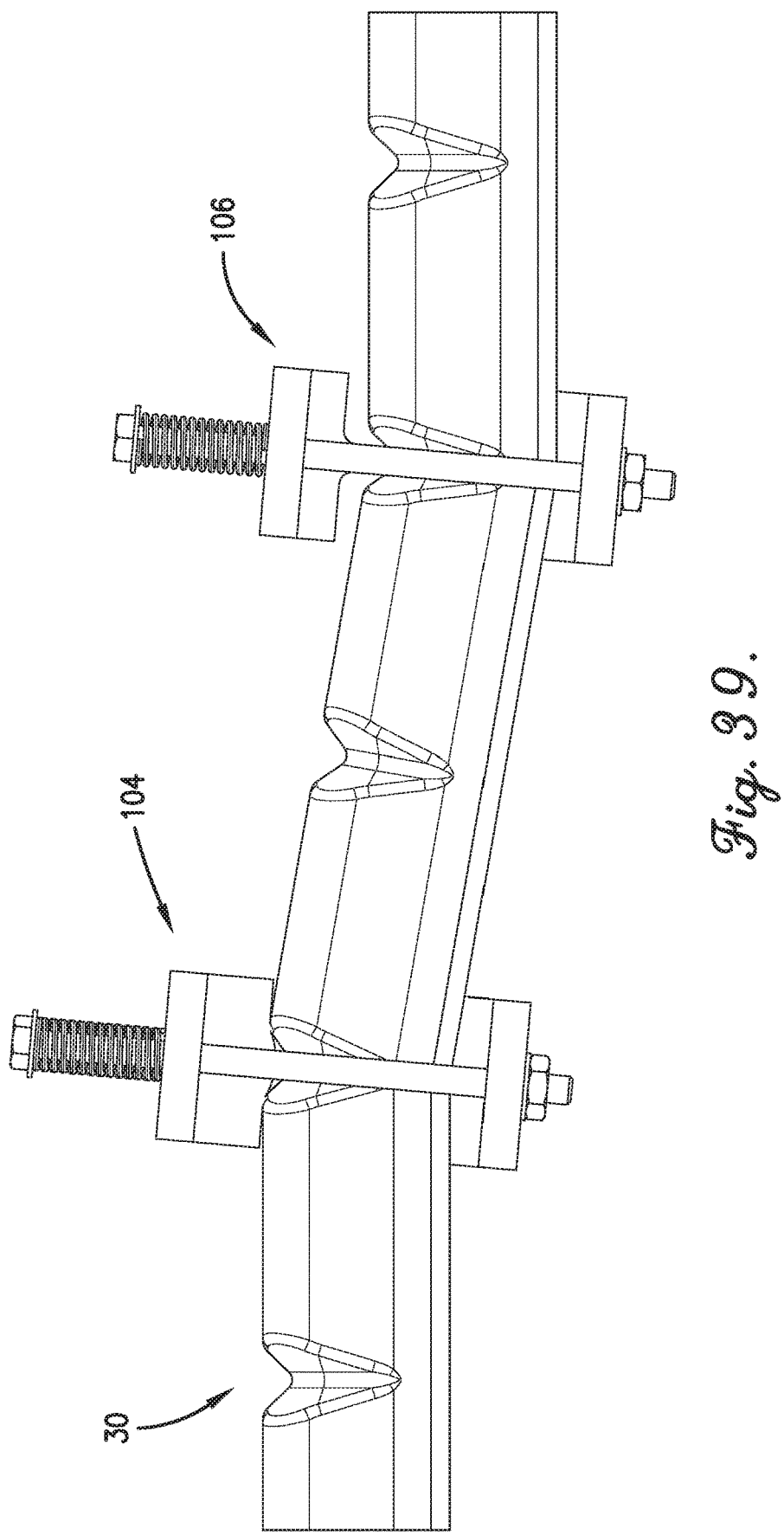
FIG. 39 is a side view of the stiffening element with the first clamp and the second clamp after heat has been applied to the stiffening element and the first and second beads have been reshaped.
Figure 40:
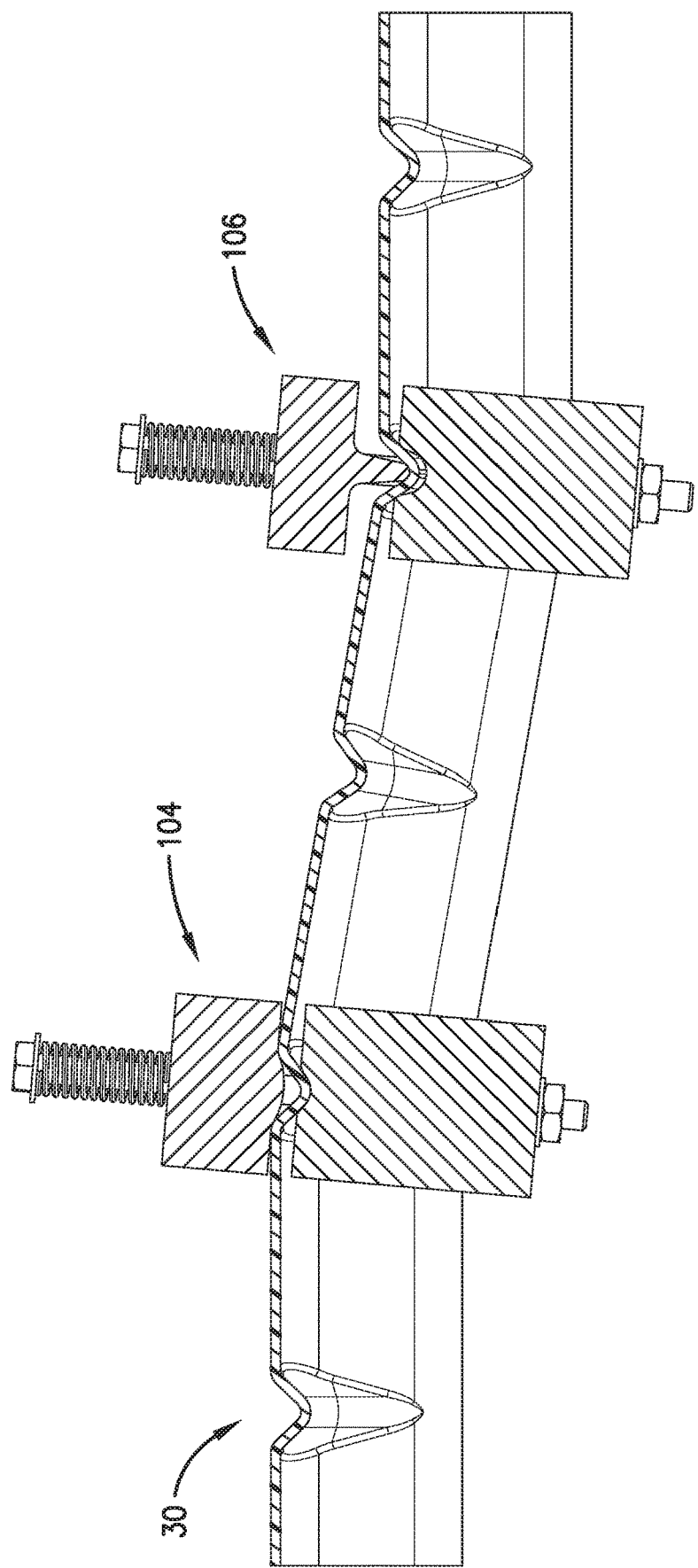
FIG. 40 is a side sectional view of the stiffening element with the first clamp and the second clamp after heat has been applied to the stiffening element and the first and second beads have been reshaped.
Figure 41:
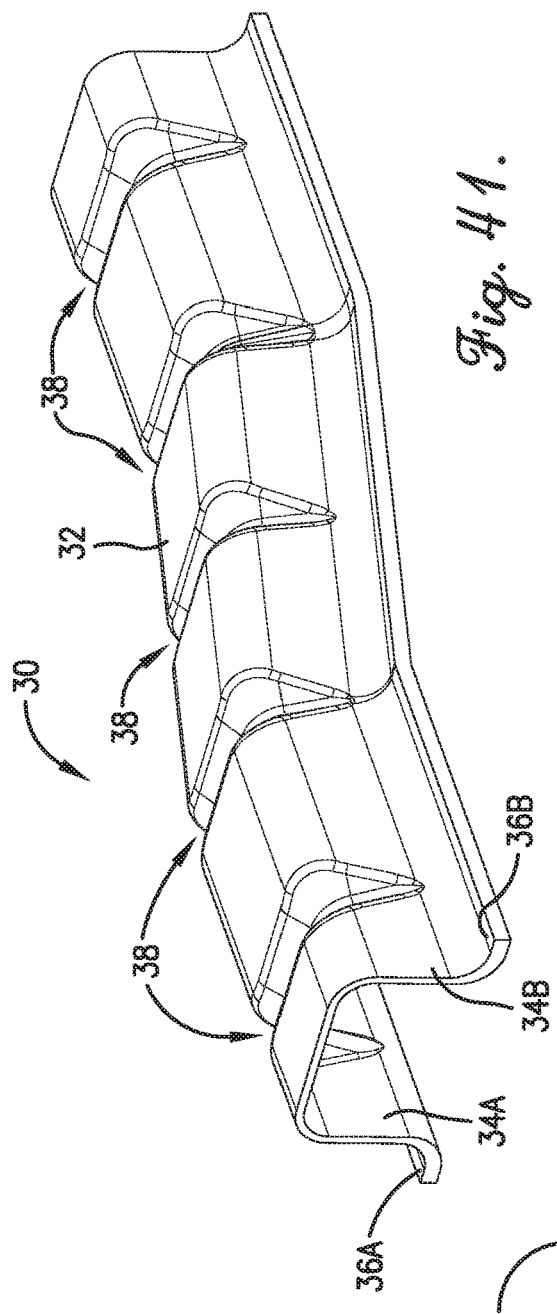
FIG. 41 is an upper perspective view of the stiffening element after heat has been applied and the clamps have been removed.
Figure 42:
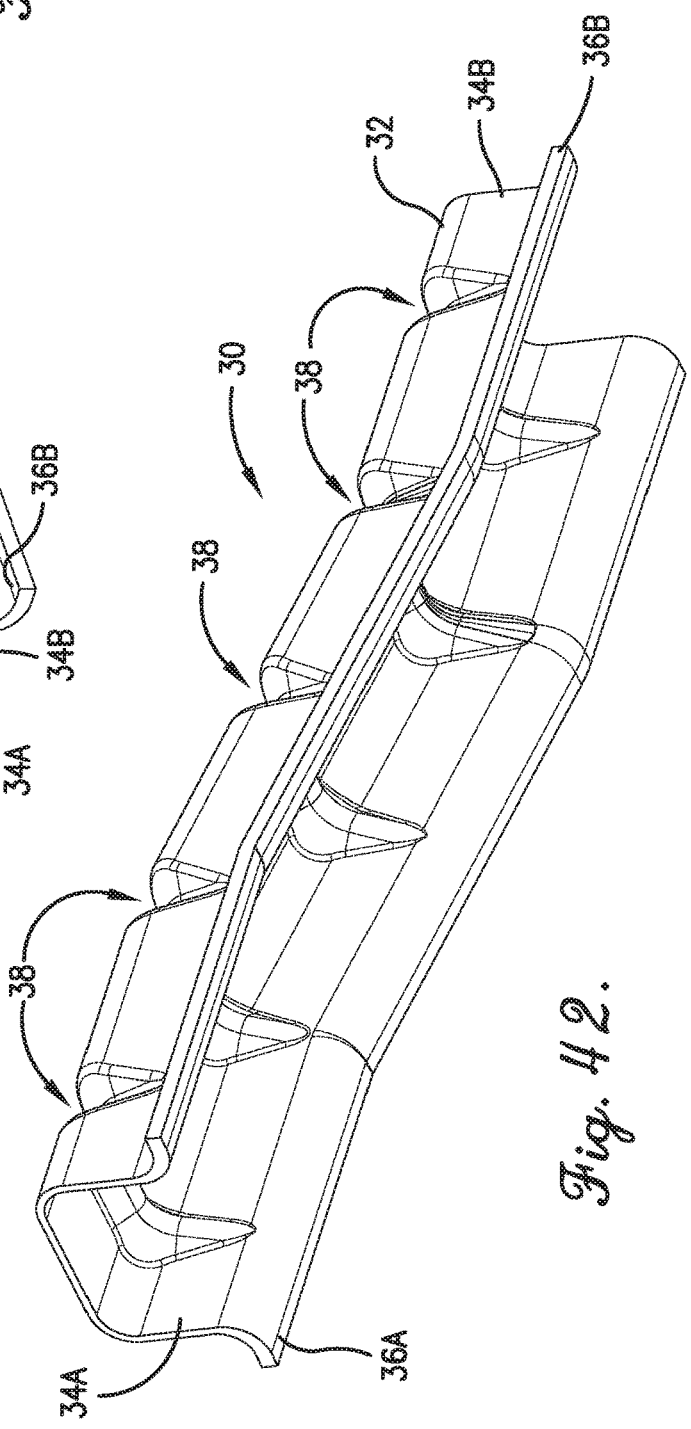
FIG. 42 is a lower perspective view of the stiffening element after heat has been applied and the clamps have been removed.
Figure 43:
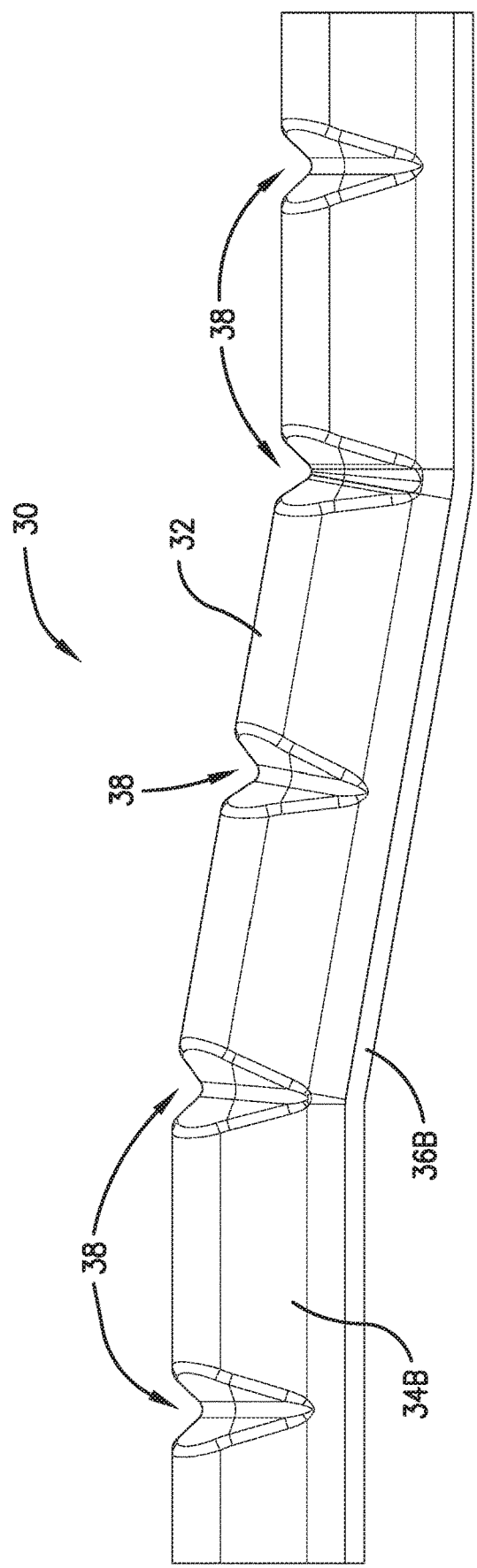
FIG. 43 is a side view of the stiffening element after heat has been applied and the clamps have been removed.

Referring to step 1003, after a time period, the heat is reduced or removed and the stiffening element 10, 30 is removed from the clamp 100, 102, 104, 106. The stiffening element 10 is shown in FIGS. 30-32 after the clamps 100, 102, 104, 106 are removed. As shown, a first bead 20 is flattened, and a second bead 20 is enhanced. The stiffening element 30 is shown in FIGS. 41-43 after the clamps 100, 102, 104, 106 are removed. As shown, a first bead 38 is flattened, and a second bead 38 is enhanced. The stiffening element 10, 30 is ready to be utilized and may be attached to the skin 12 by welding, tacking, bonding, fastening, or the like.

Figure 44:
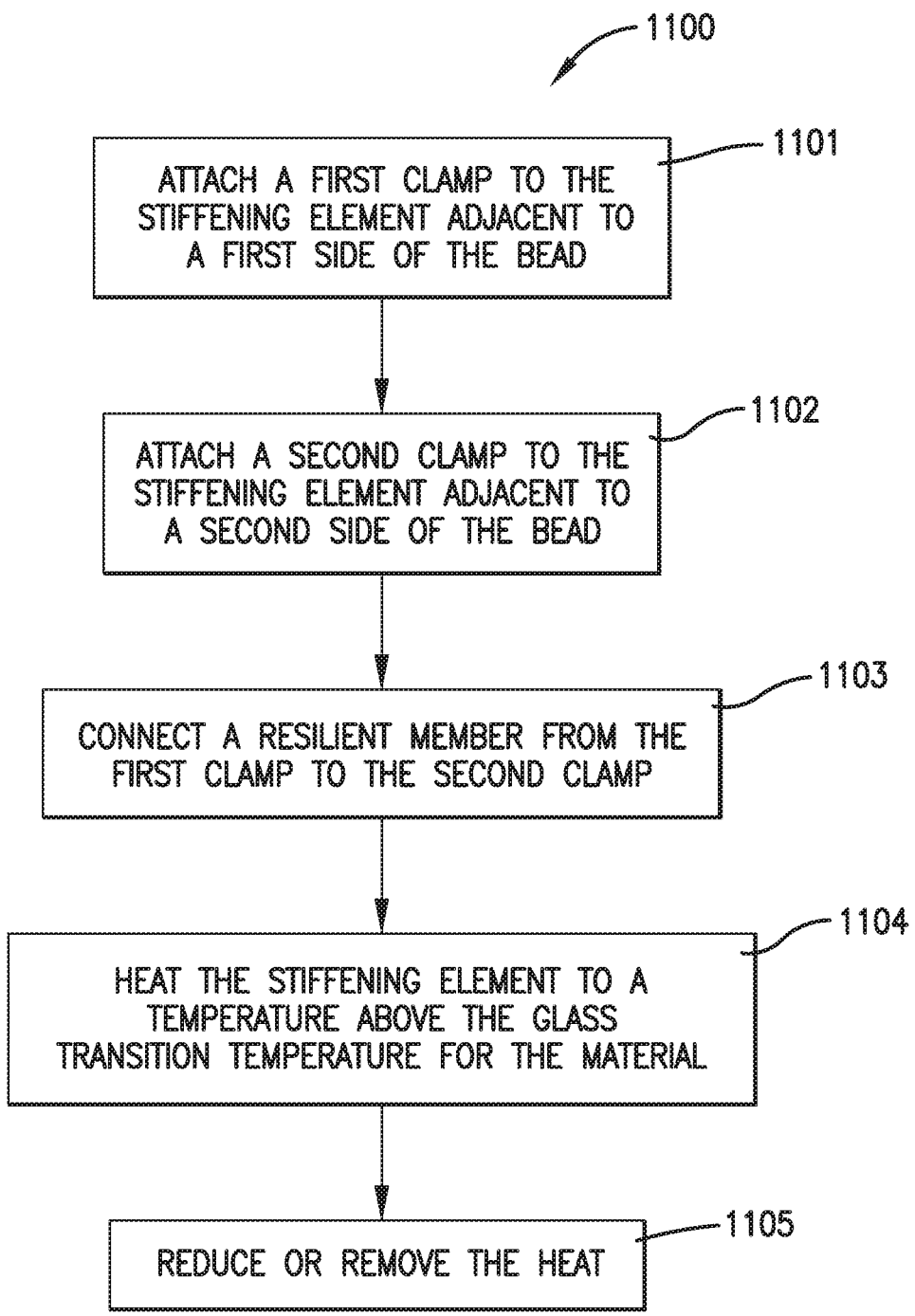
FIG. 44 is a listing of at least a portion of the steps of a second method of reshaping a bead of a stiffening element.

A listing of at least a portion of the steps of a second method 1100 of reforming or reshaping a stiffening element 10, 30 is shown in FIG. 44. The steps may be performed in the order shown in FIG. 44, or they may be performed in a different order. Furthermore, some steps may be performed concurrently as opposed to sequentially. In addition, some steps may be optional or may not be performed.

At least one of two clamp assemblies is utilized in the method 1100. A first clamp assembly 300, as shown in FIGS. 49-52 and 56-59, includes first and second clamps 302A, 302B, and a resilient member 304. Each clamp 302, as shown in FIGS. 45-48, includes an upper clamp member 306, a lower clamp member 308, and first and second fasteners 310, 312. The upper clamp member 306 includes a top wall 314, first and second side walls 316, 318, first and second bolt walls 320, 322, a spring block 324, a limit block 326, and a spring pin 328. The first and second side walls 316, 318 are spaced apart with the top wall 314 positioned therebetween and connected to upper edges of the first and second side walls 316, 318. The first and second bolt walls 320, 322 are connected to lower edges of the first and second side walls 316, 318. The spring block 324 is connected to an upper surface of the top wall 314. The limit block 326 is connected to a side surface of the spring block 324, and the spring pin 328 is connected to an upper surface of the spring block 324.

Figure 45:
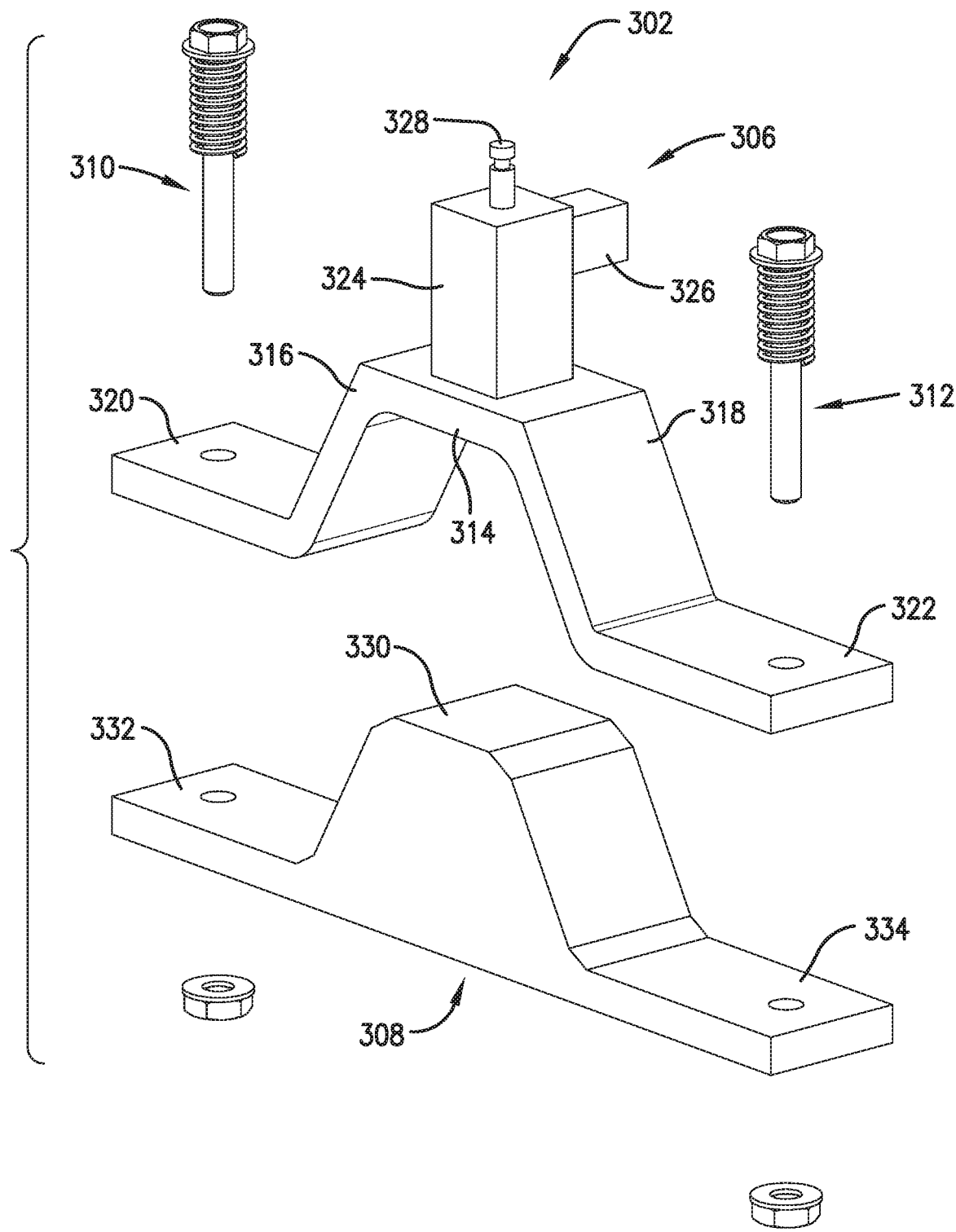
FIG. 45 is an upper perspective exploded view of a clamp that is a component of a first clamp assembly configured to reshape a bead of the stiffening element.
Figure 46:
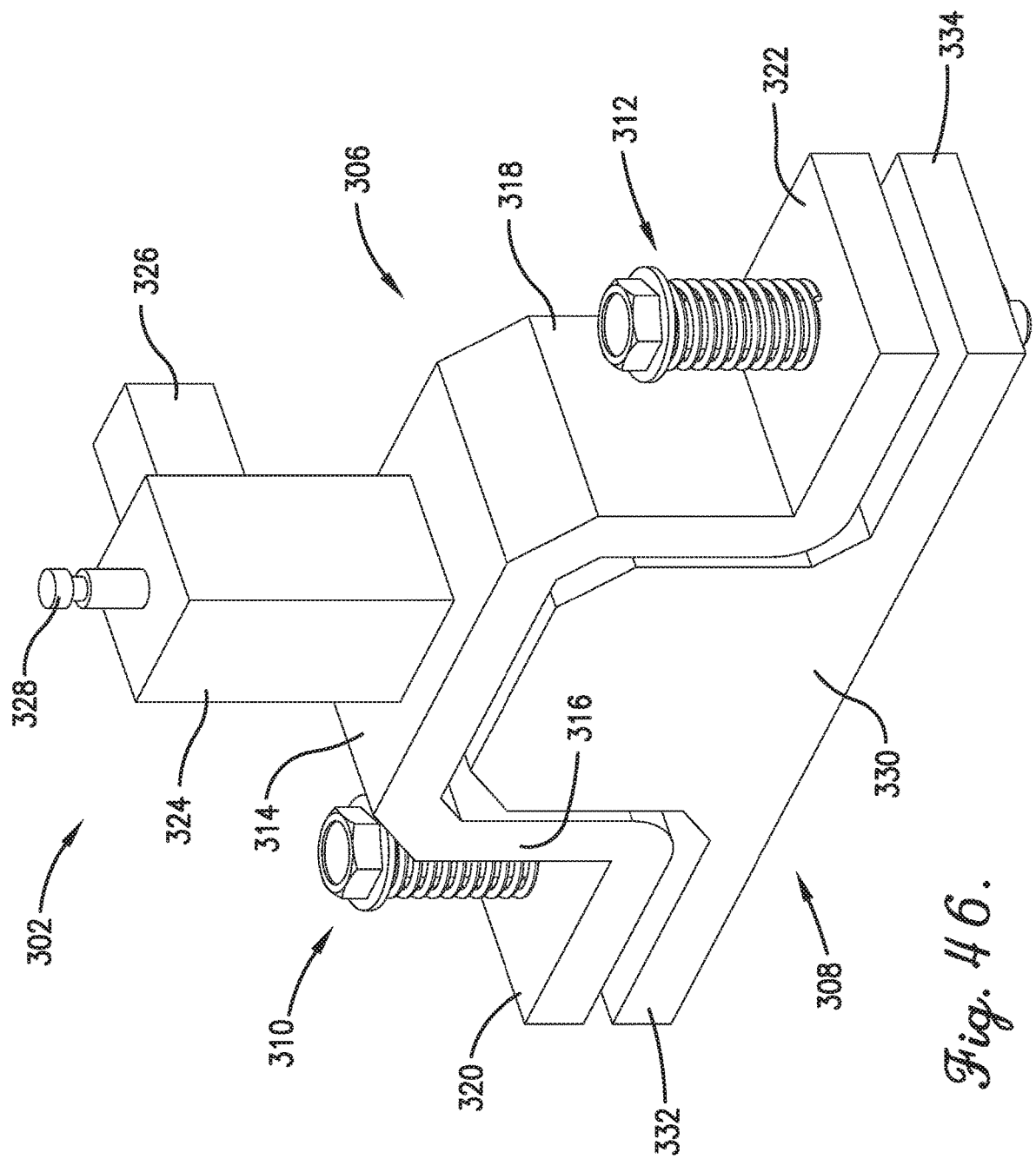
FIG. 46 is an upper perspective view of the clamp of FIG. 40.
Figure 47:
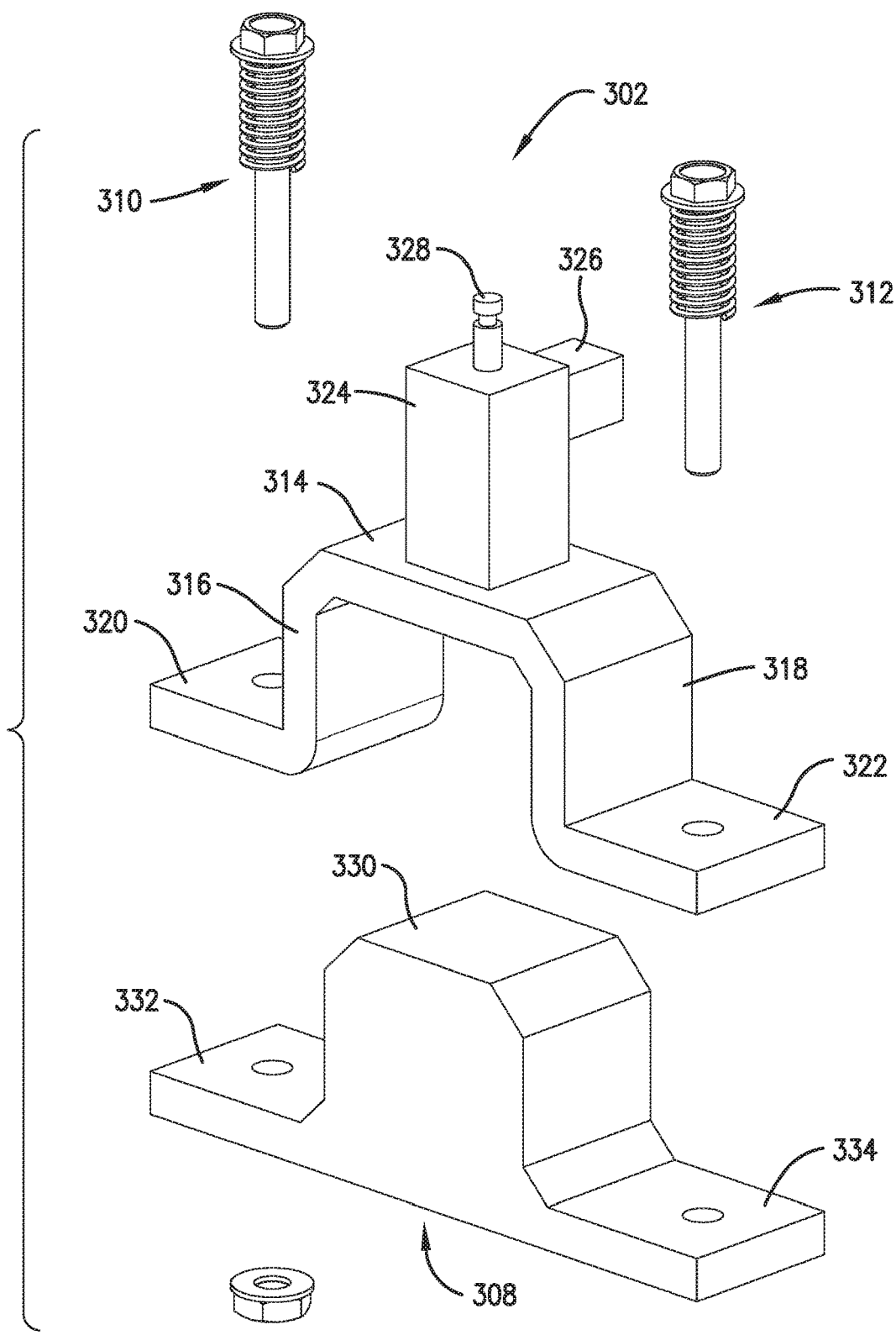
FIG. 47 is an upper perspective exploded view of a clamp that is a component of a first clamp assembly configured to reshape a bead of the stiffening element.
Figure 48:
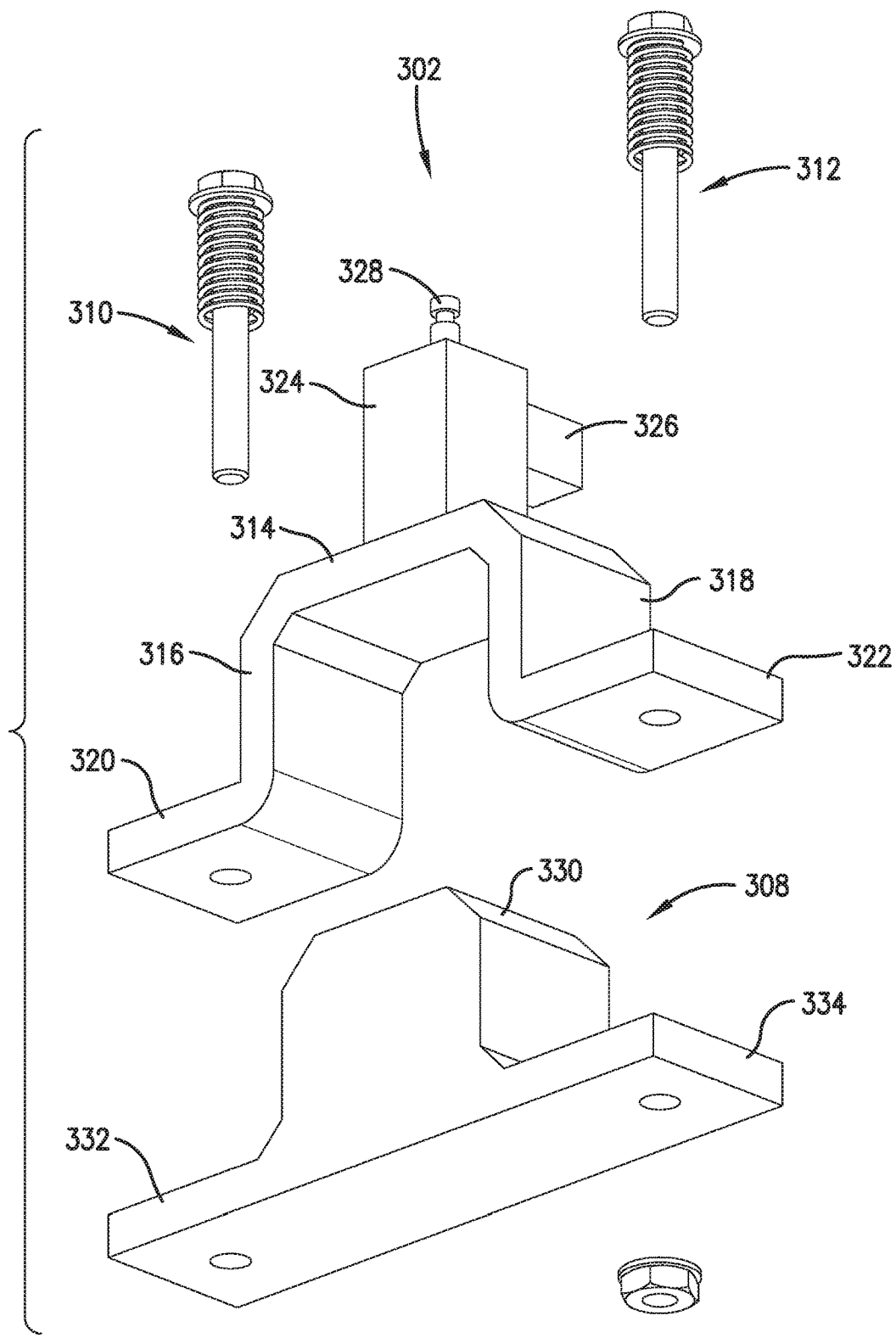
FIG. 48 is a lower perspective exploded view of the clamp of FIG. 42.

The lower clamp member 308 includes a central block 330 and first and second bolt walls 332, 334 attached to opposing lower edges of the central block 330. The first and second fasteners 310, 312 each include a bolt, a nut, and a spring and are similar in structure to the fasteners 112, 114. When utilized for reforming or reshaping the stiffening element 10, the first and second side walls 316, 318 and side surfaces of the central block 330 are angled or slanted to match the shape of the first and second shear members 16A, 16B, as shown in FIG. 45. When utilized for reforming or reshaping the stiffening element 30, the first and second side walls 316, 318 and side surfaces of the central block 330 are orthogonal to match the shape of the first and second shear members 34A, 34B, as shown in FIGS. 46-48.

The resilient member 304 typically includes a spring which is utilized in compression or in tension, although other mechanisms that provide a tension force or a compression force may be utilized.

Figure 49:
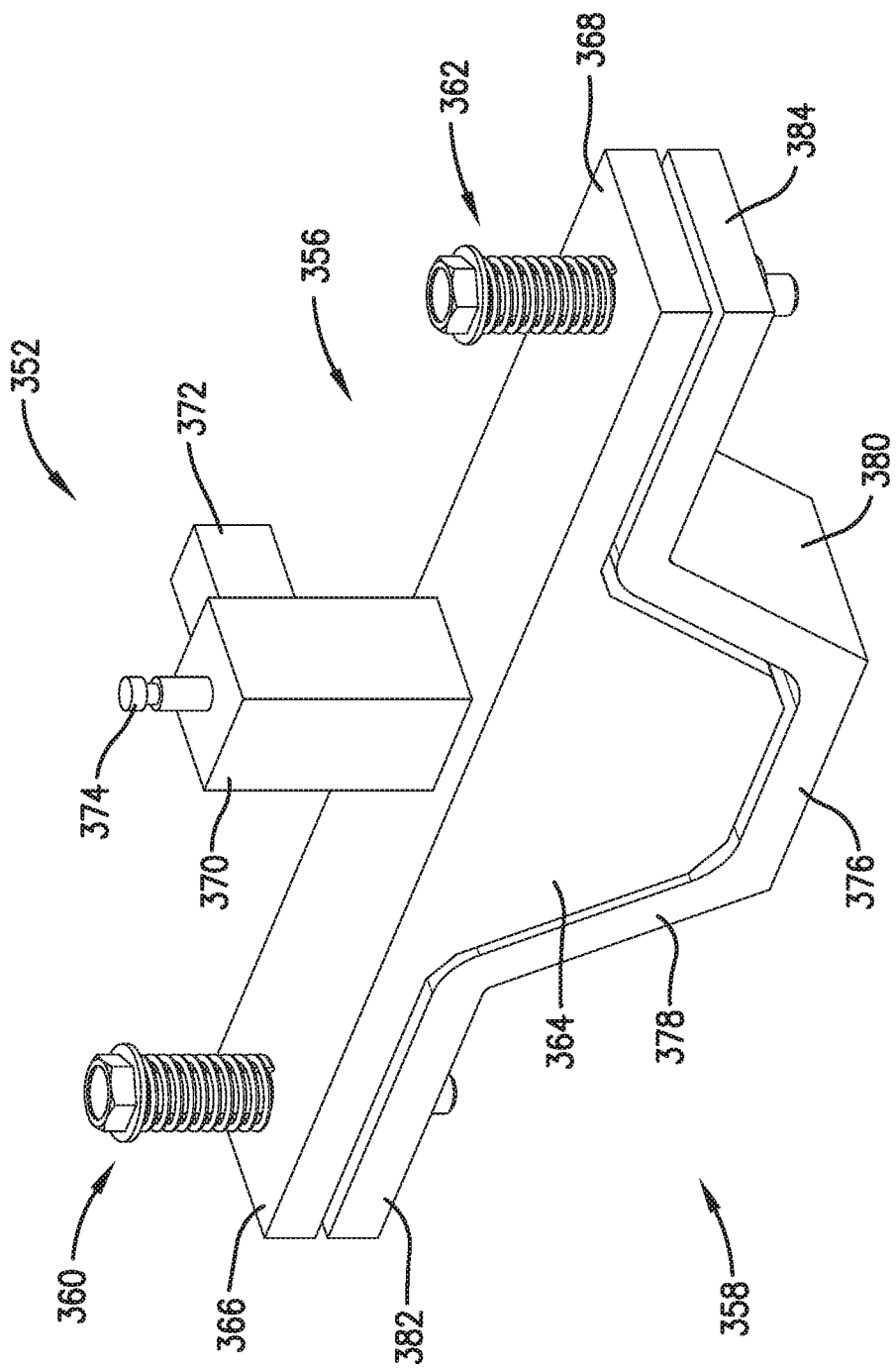
FIG. 49 is an upper perspective view of a clamp that is a component of a second clamp assembly configured to reshape a bead of the stiffening element.

A second clamp assembly 350, shown in FIGS. 53-55, 60, and 61 and which has a variation in structure compared to the first clamp assembly 300 and may be used as an alternative to the first clamp assembly 300, includes first and second clamps 352A, 352B, and a resilient member 354. Each clamp 352, as shown in FIG. 49, includes an upper clamp member 356, a lower clamp member 358, and first and second fasteners 360, 362. The upper clamp member 356 includes a central block 364, first and second bolt walls 366, 368, a spring block 370, a limit block 372, and a spring pin 374. The first and second bolt walls 366, 368 are connected to opposing upper edges of the central block 364. The spring block 370 is connected to a upper surface of the central block 364. The limit block 372 is connected to a side surface of the spring block 370, and the spring pin 374 is connected to a upper surface of the spring block 370. The lower clamp member 358 includes a bottom wall 376, first and second side walls 378, 380, and first and second bolt walls 382, 384. The first and second side walls 378, 380 are spaced apart with the bottom wall 376 positioned therebetween and connected to lower edges of the first and second side walls 378, 380. The first and second bolt walls 382, 384 are connected to upper edges of the first and second side walls 378, 380. The first and second fasteners 360, 362 each include a bolt, a nut, and a spring. The resilient member 354 is substantially identical to the resilient member 304.

Either clamp assembly 300, 350 can be used in the following steps of the method 1100.

Referring to steps 1101, 1102 and 1103, one of the two clamp assemblies 300, 350 is attached to the stiffening element 10, 30. The first clamp 302A, 352A is attached to the stiffening element 10, 30 to one side of the bead 20, 38 to be reshaped. The first clamp 302A, 352A is oriented such that the limit block 326 extends toward the bead 20, 38. The second clamp 302B, 352B is attached to the stiffening element 10, 30 to the opposite side of the bead 20, 38 to be reshaped. The second clamp 302B, 352B is oriented such that the limit block 326, 372 extends toward the bead 20, 38. Generally, the first clamp 302A, 352A and the second clamp 302B, 352B are positioned so that the bead 20, 38 is roughly midway between the two clamps 302A, 302B or 352A, 352B. Once the first clamp 302A, 352A and the second clamp 302B, 352B are attached to the stiffening element 10, 30, then the resilient member 304, 354 is coupled to the spring pins 328, 374.

Figure 50:
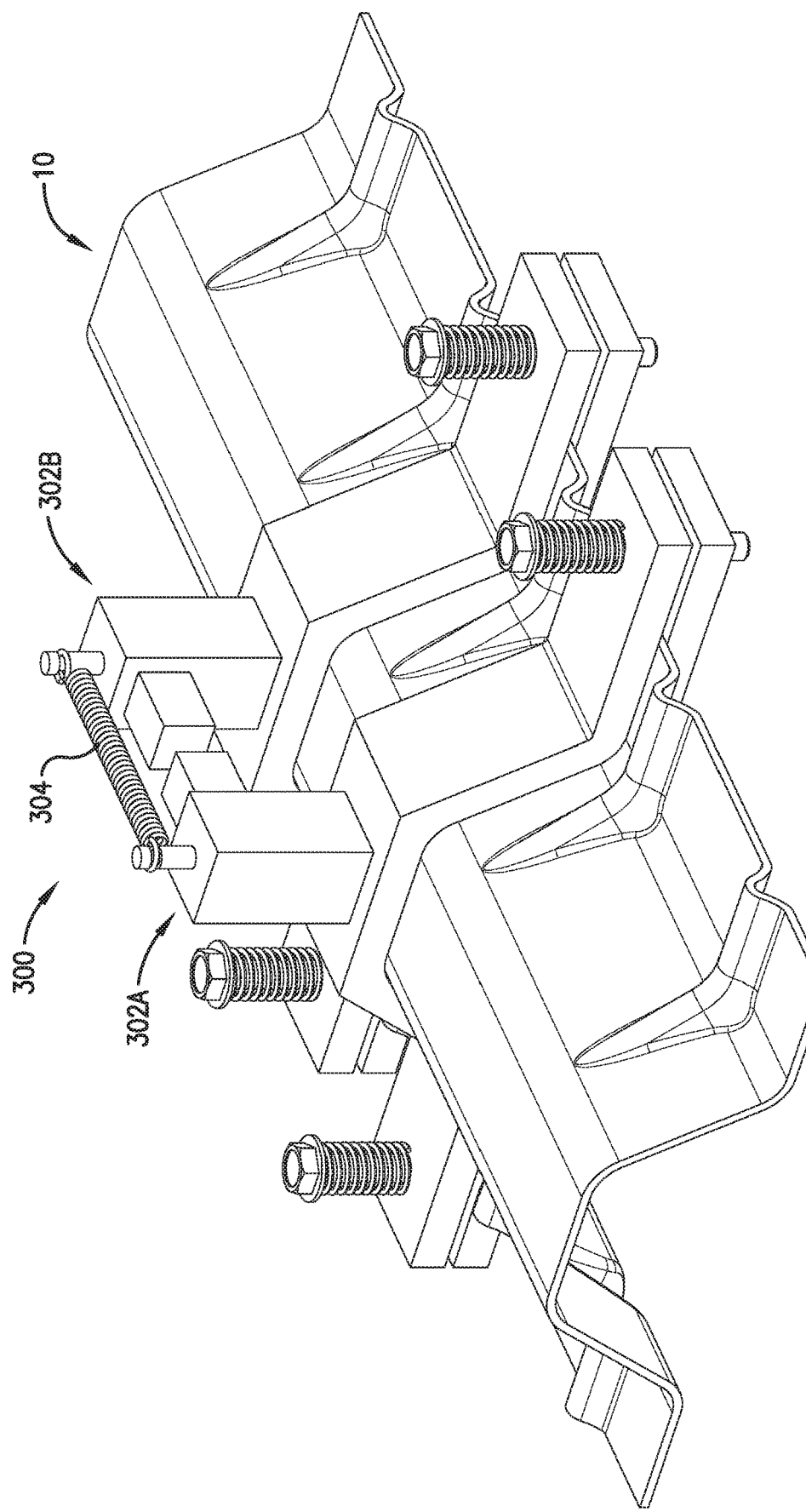
FIG. 50 is an upper perspective view of the first clamp assembly attached to the stiffening element and configured to flatten a bead.
Figure 51:
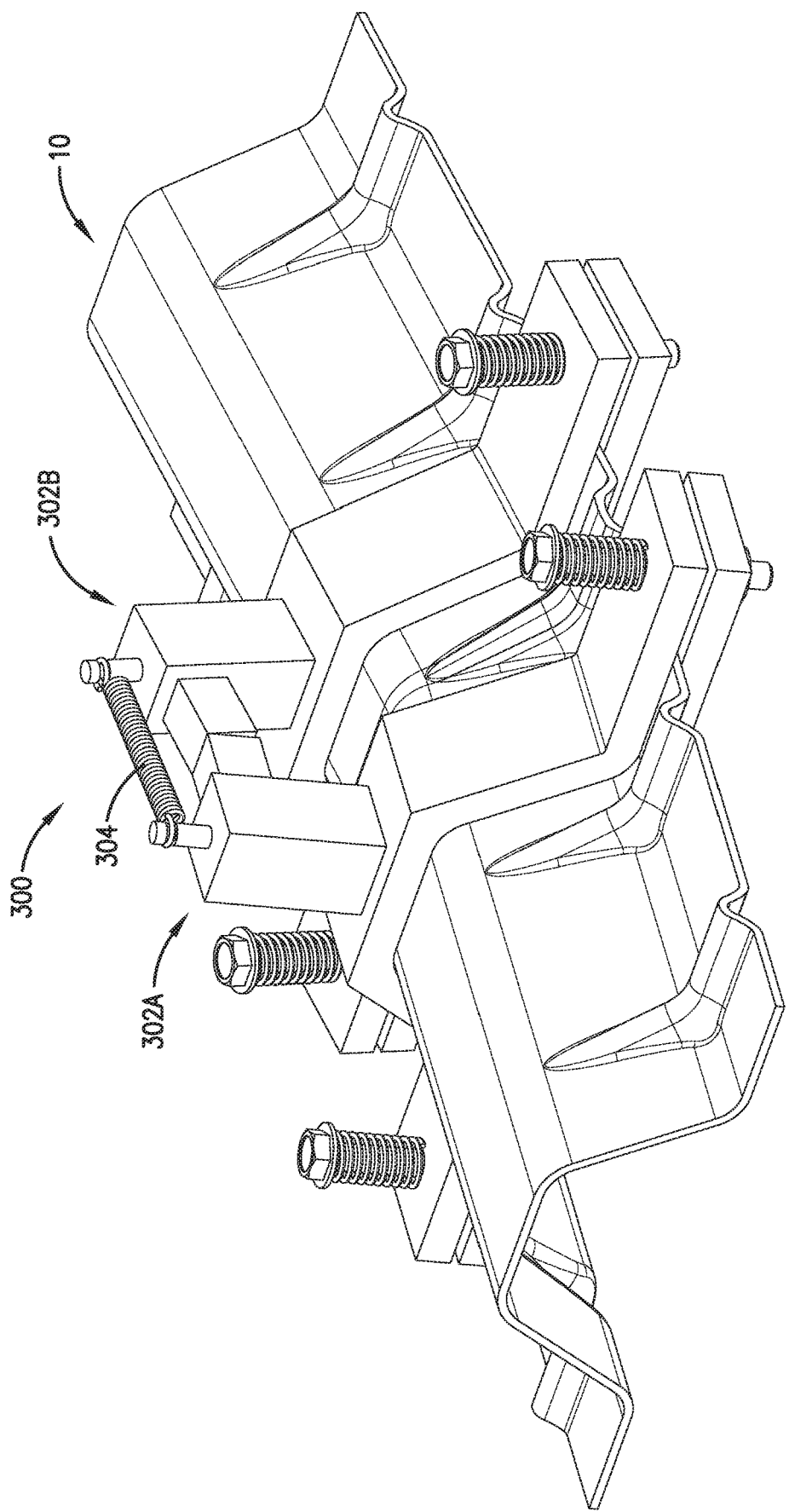
FIG. 51 is an upper perspective view of the stiffening element after heat has been applied and the bead has been flattened.
Figure 52:
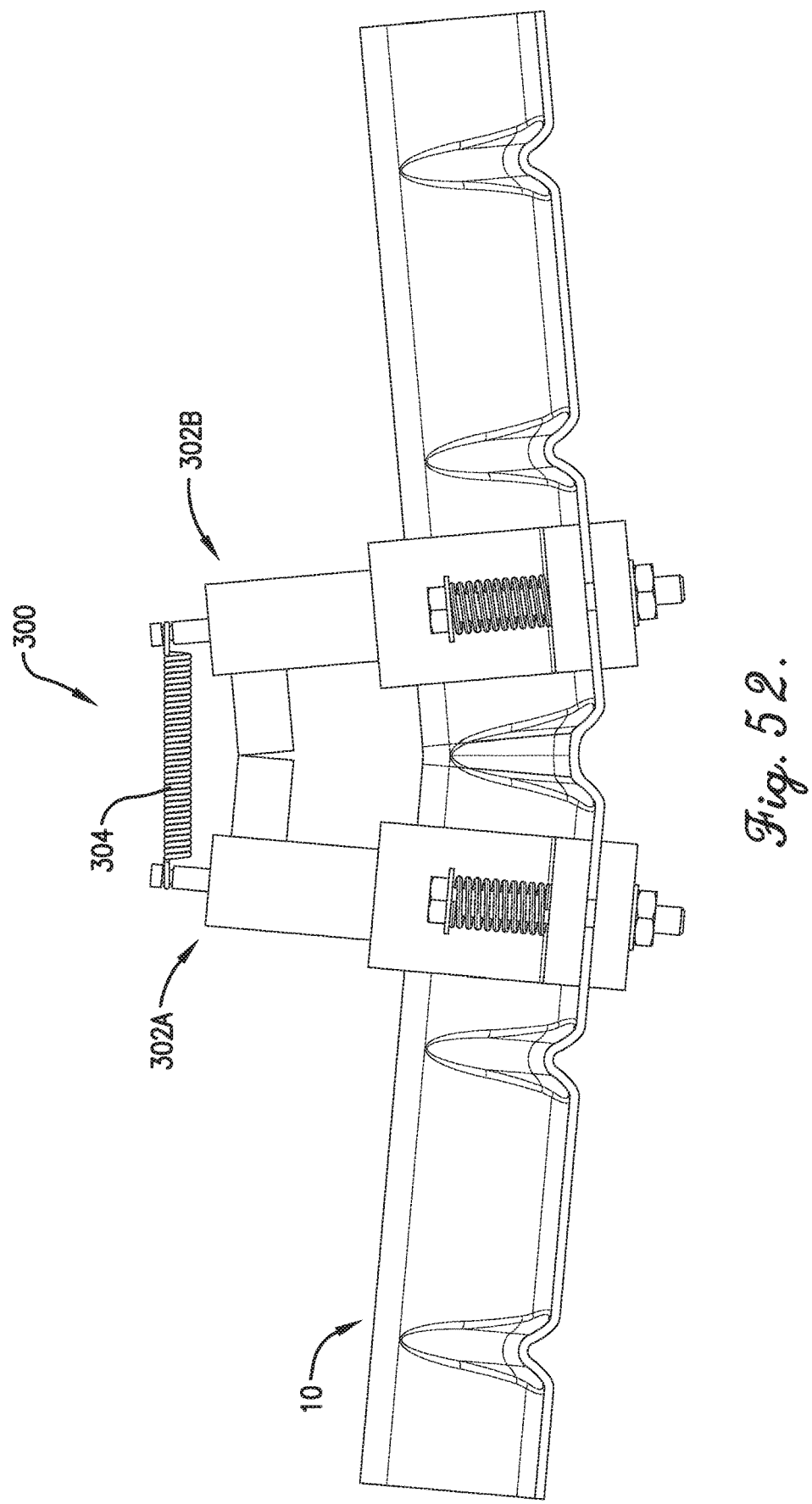
FIG. 52 is a side view of the stiffening element after heat has been applied and the bead has been flattened.

The first clamp assembly 300 is utilized with the stiffening element 10 in FIGS. 50-52. If the resilient member 304, 354 is under tension, then the bead 20, 38 is to be flattened, as shown. If the resilient member 304, 354 is under compression, then the bead 20, 38 is to be enhanced (not shown).

Figure 53:
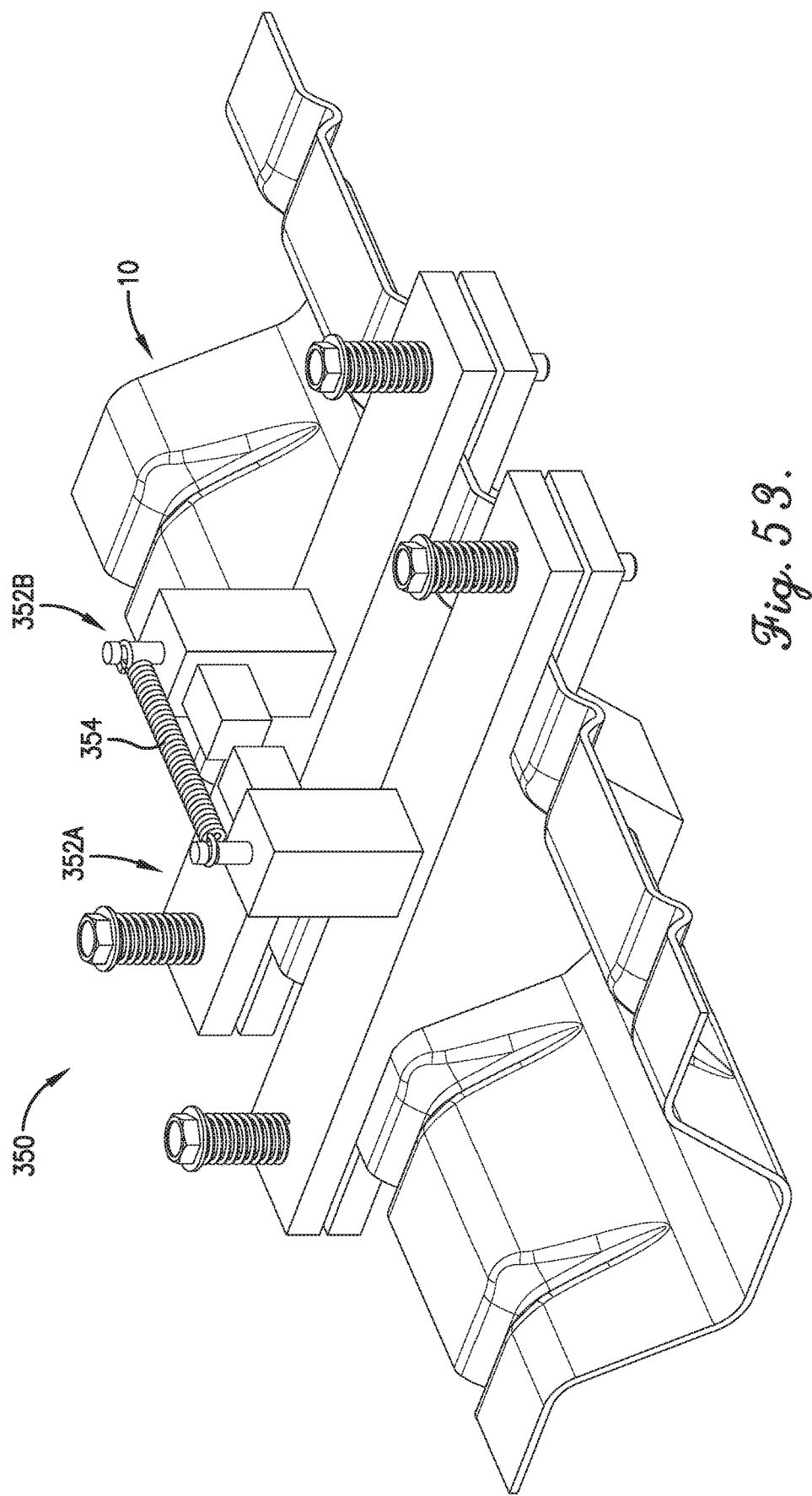
FIG. 53 is an upper perspective view of a second clamp assembly attached to the stiffening element and configured to enhance a bead.
Figure 54:
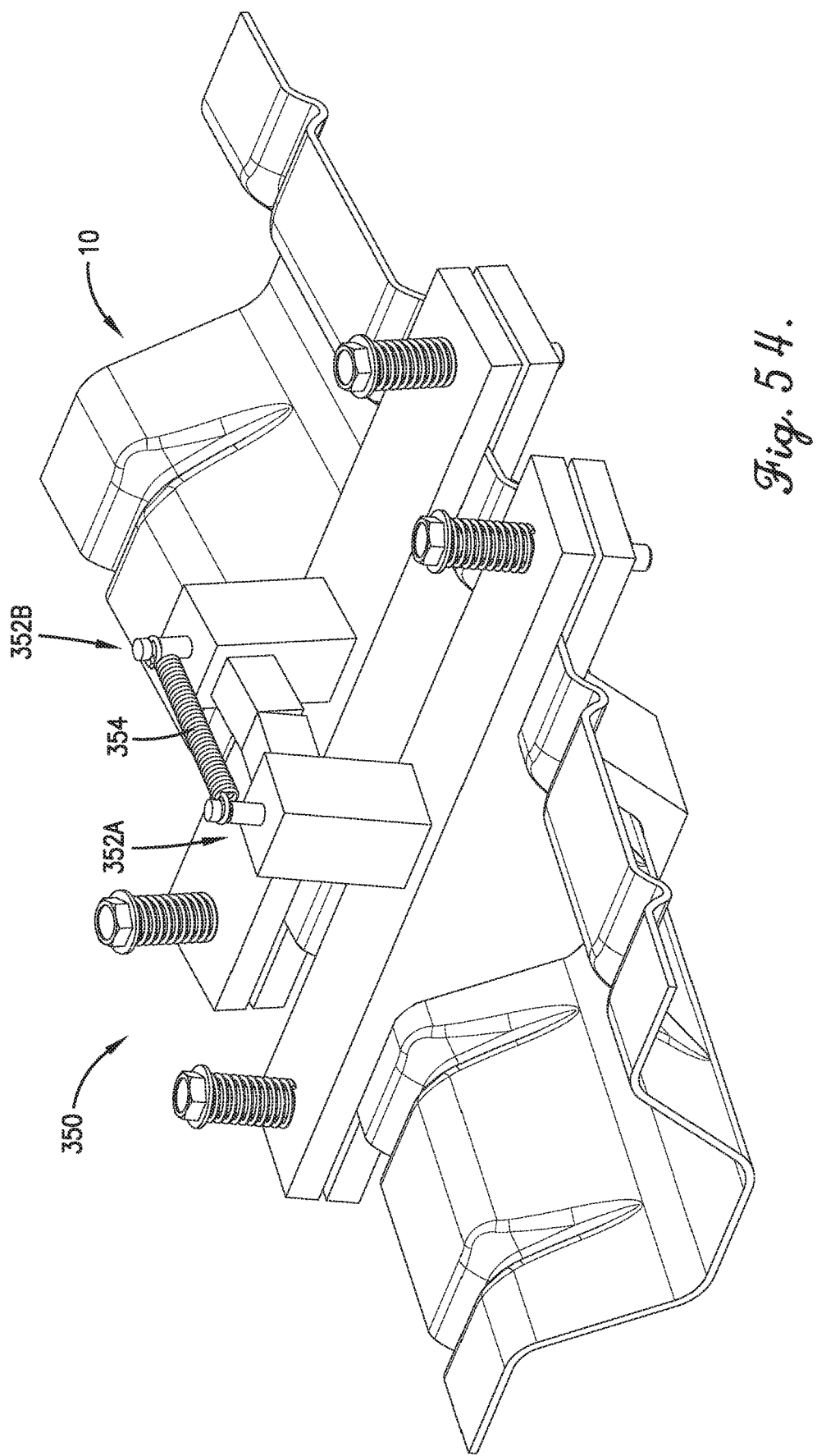
FIG. 54 is an upper perspective view of the stiffening element after heat has been applied and the bead has been enhanced.
Figure 55:
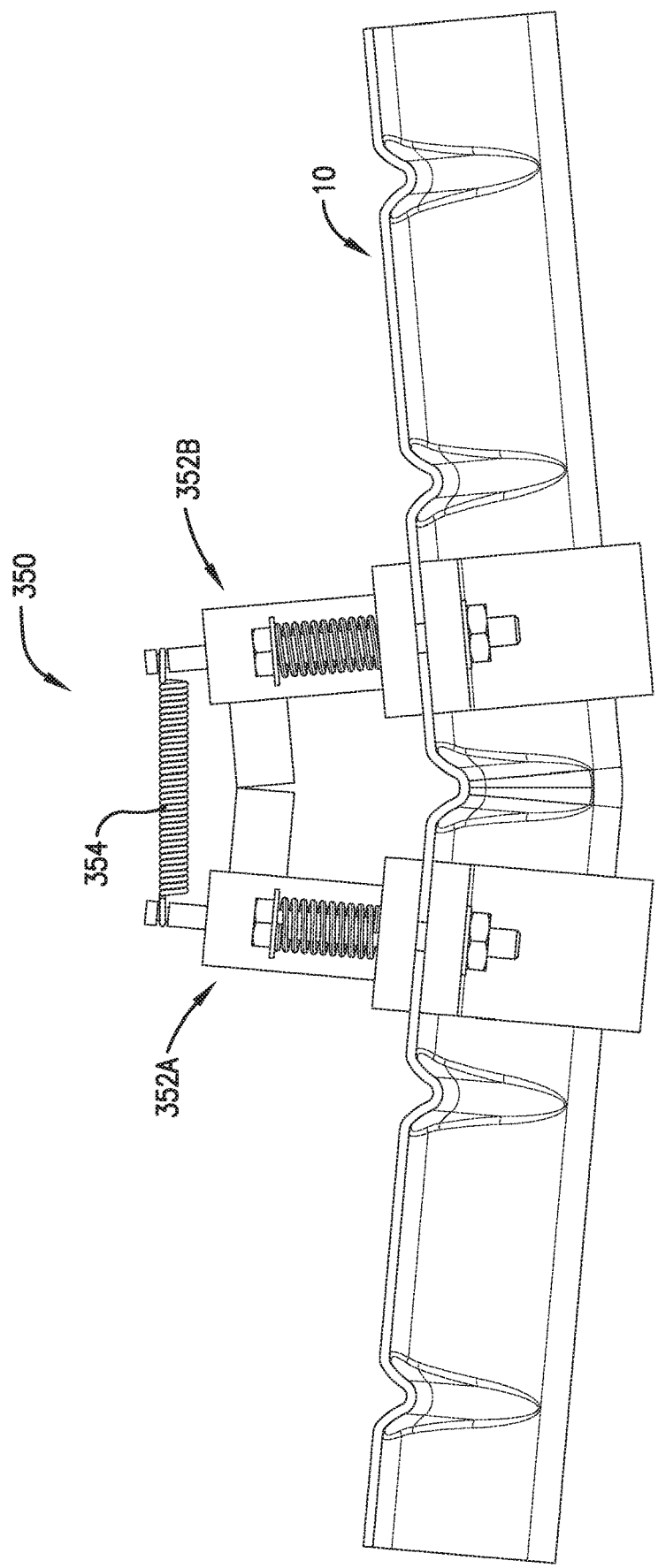
FIG. 55 is a side view of the stiffening element after heat has been applied and the bead has been enhanced.
Figure 56:
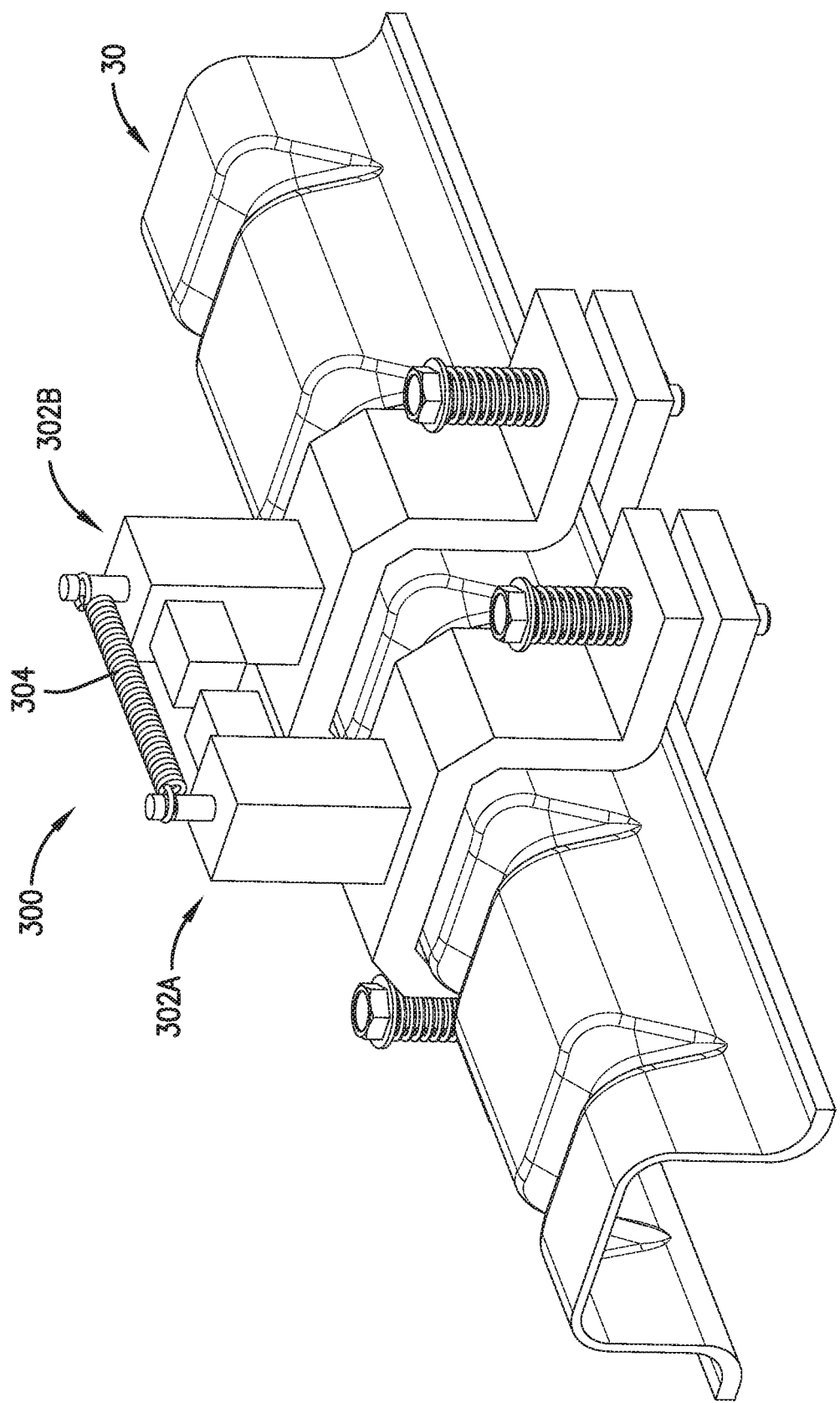
FIG. 56 is an upper perspective view of the first clamp assembly attached to the stiffening element and configured to enhance a bead.
Figure 57:
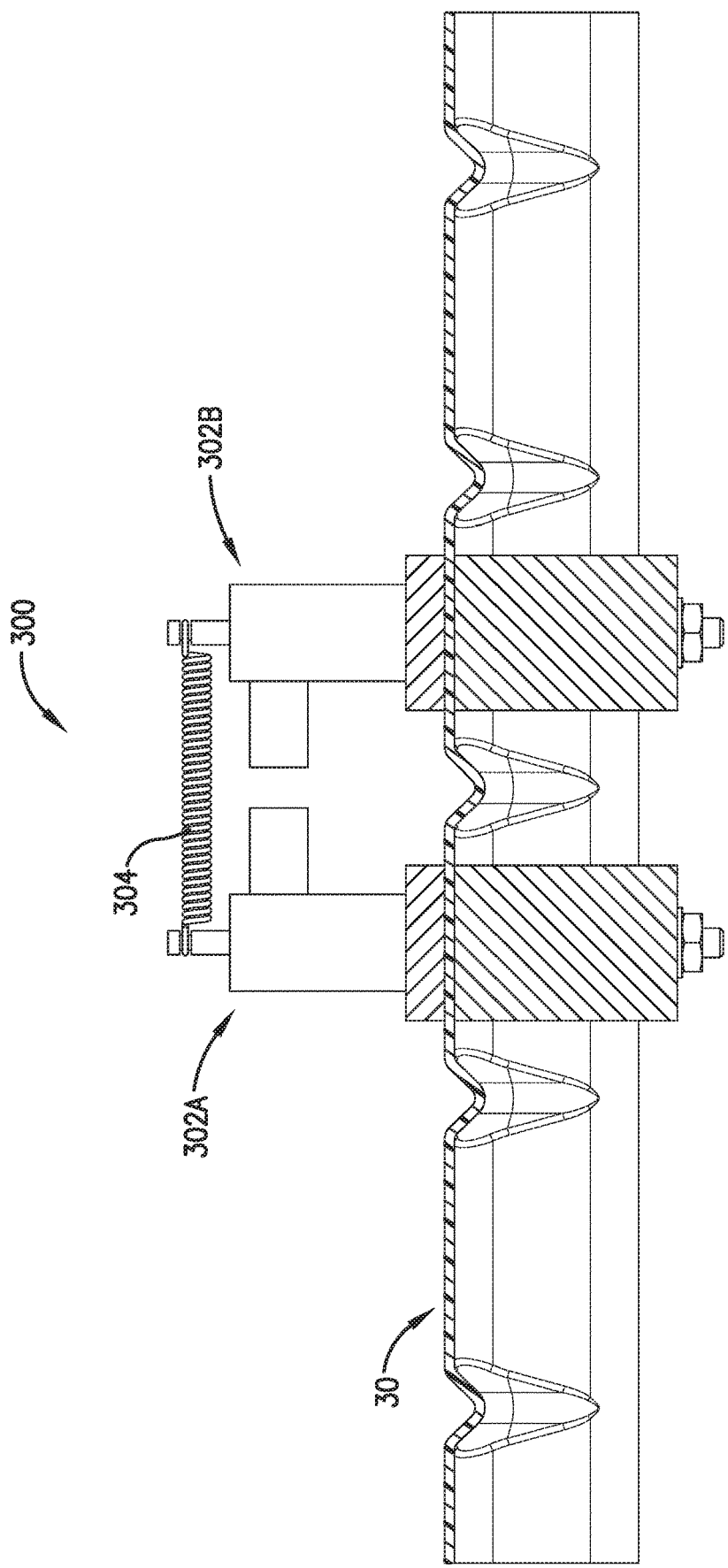
FIG. 57 is a side sectional view of the first clamp assembly attached to the stiffening element.
Figure 58:
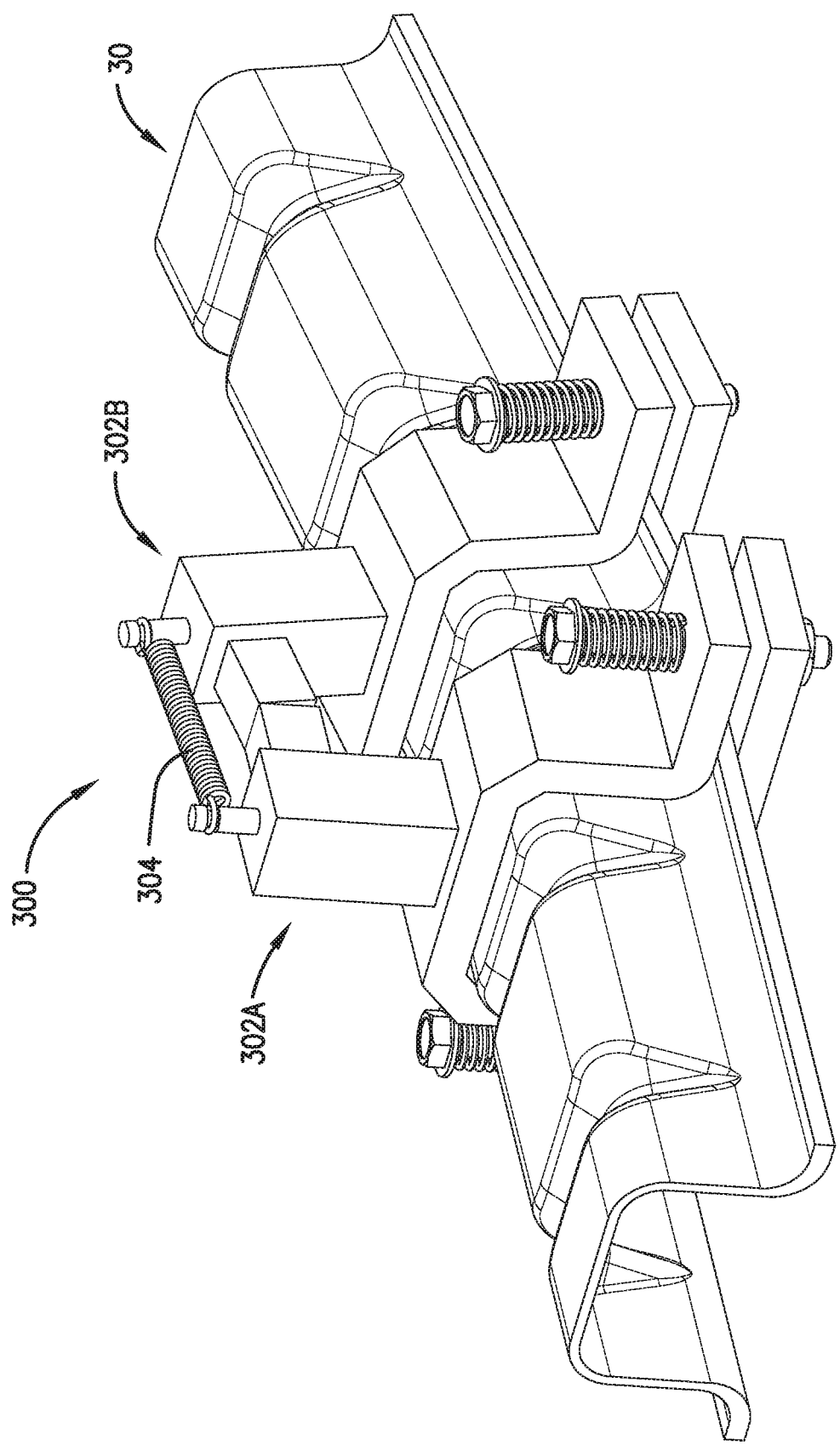
FIG. 58 is an upper perspective view of the stiffening element after heat has been applied and the bead has been enhanced.
Figure 59:
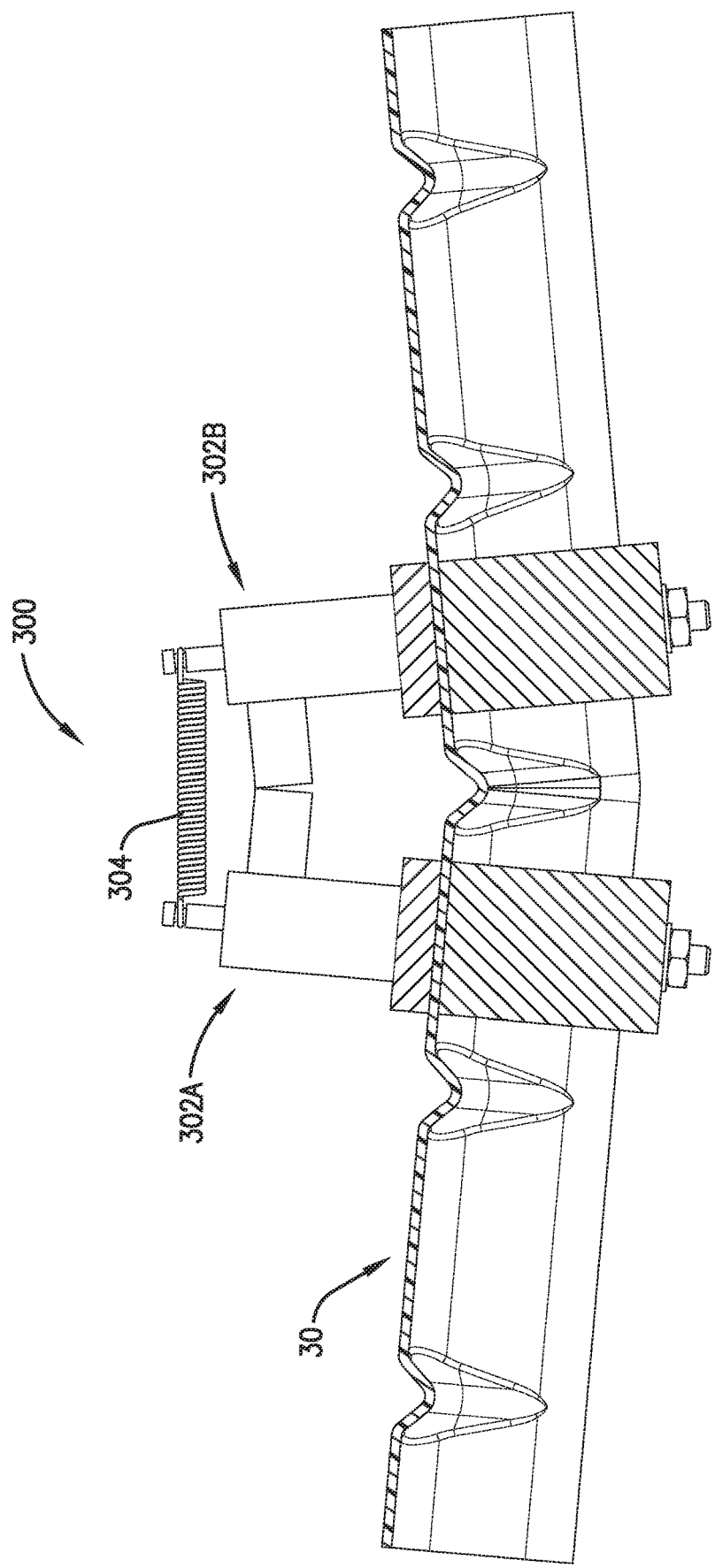
FIG. 59 is a side sectional view of the stiffening element after heat has been applied and the bead has been enhanced.

The second clamp assembly 350 is utilized with the stiffening element 10 in FIGS. 53-55. If the resilient member 304, 354 is under tension, then the bead 20, 38 is to be enhanced, as shown. If the resilient member 304, 354 is under compression, then the bead 20, 38 is to be flattened (not shown).

The first clamp assembly 300 is utilized with the stiffening element 30 in FIGS. 56-59. If the resilient member 304, 354 is under tension, then the bead 20, 38 is to be enhanced, as shown. If the resilient member 304, 354 is under compression, then the bead 20, 38 is to be flattened (not shown).

Figure 60:
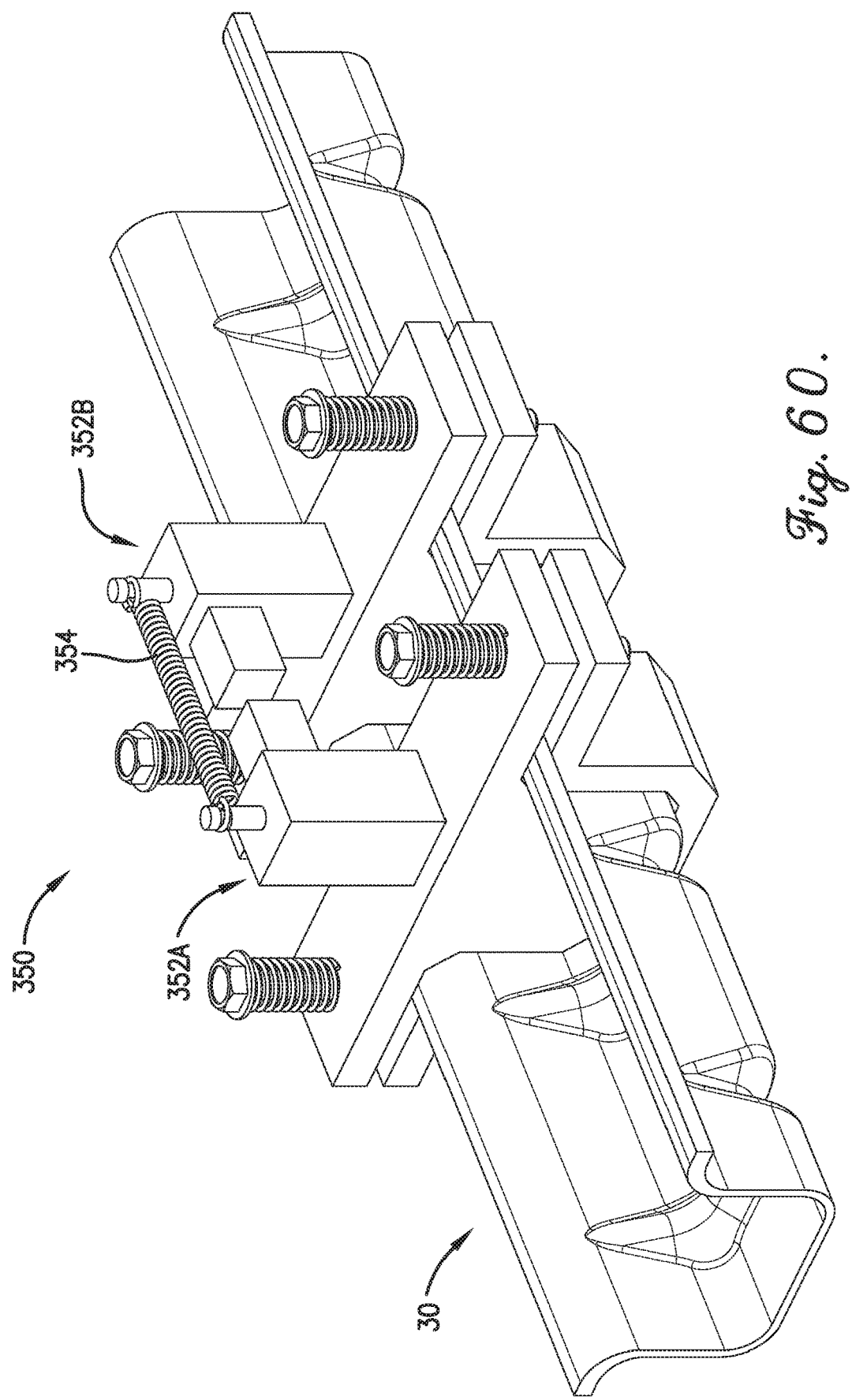
FIG. 60 is an upper perspective view of the second clamp assembly attached to the stiffening element and configured to flatten a bead.
Figure 61:
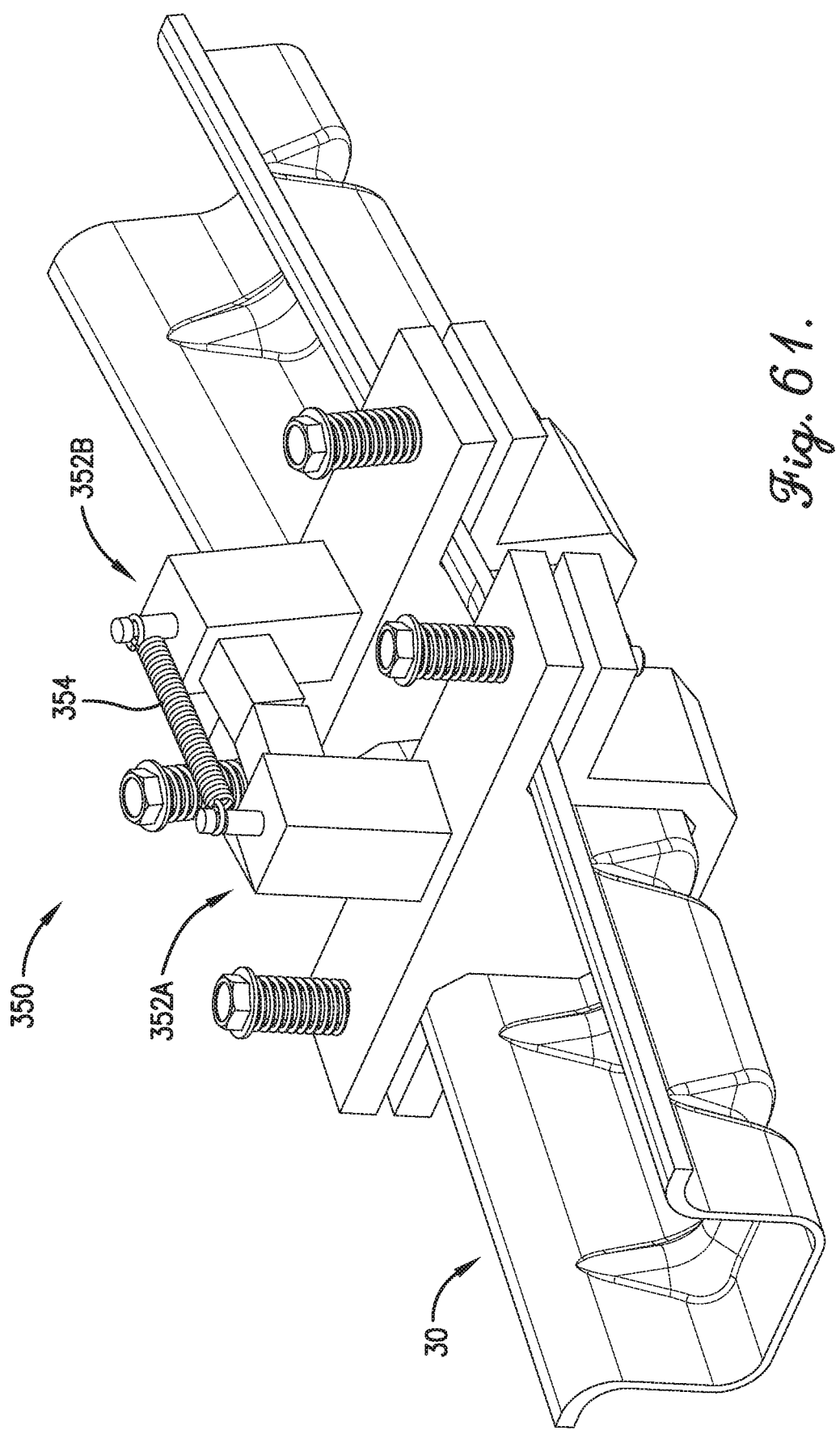
FIG. 61 is an upper perspective view of the stiffening element after heat has been applied and the bead has been enhanced.

The second clamp assembly 350 is utilized with the stiffening element 30 in FIGS. 60 and 61. If the resilient member 304, 354 is under tension, then the bead 20, 38 is to be flattened, as shown. If the resilient member 304, 354 is under compression, then the bead 20, 38 is to be enhanced (not shown).

Referring to step 1104, the stiffening element 10, 30 is heated to a temperature above the glass transition temperature for the material of the stiffening element 10, 30. At this temperature, the stiffening element 10, 30 becomes malleable and the forces or pressures applied by the resilient member 304, 354 reshape the bead 20, 38. If the resilient member 304, 354 was in tension, then the spring blocks 324, 370 are pulled together until the limit blocks 326, 372 contact one another, which halts reshaping of the bead 20, 38. If the resilient member 304, 354 was in compression, then the spring blocks 324, 370 are pushed apart from one another until the resilient member 304, 354 relaxes (neither in compression nor tension), which halts reshaping of the bead 20, 38. The amount of reshaping of the bead 20, 38 may vary according to, or be determined by, the size of the limit blocks 326, 372 or the amount of compression of the resilient member 304, 354. Generally, larger-sized limit blocks 326, 372 result in smaller or lesser reshaping, while smaller-sized limit blocks 326, 372 result in larger or greater reshaping. Also, lesser compression of the resilient member 304, 354 results in smaller or lesser reshaping, while greater compression of the resilient member 304, 354 results in larger or greater reshaping.

Referring to step 1105, after a time period, the heat is reduced or removed and the stiffening element 10, 30 is removed from the first clamp 302A, 352A and the second clamp 302B, 352B. The stiffening element 10, 30 is ready to be utilized and the attachment member 18A, 18B, 32 may be attached to the skin 12 by welding, tacking, bonding, fastening, or the like.

Figure 62:
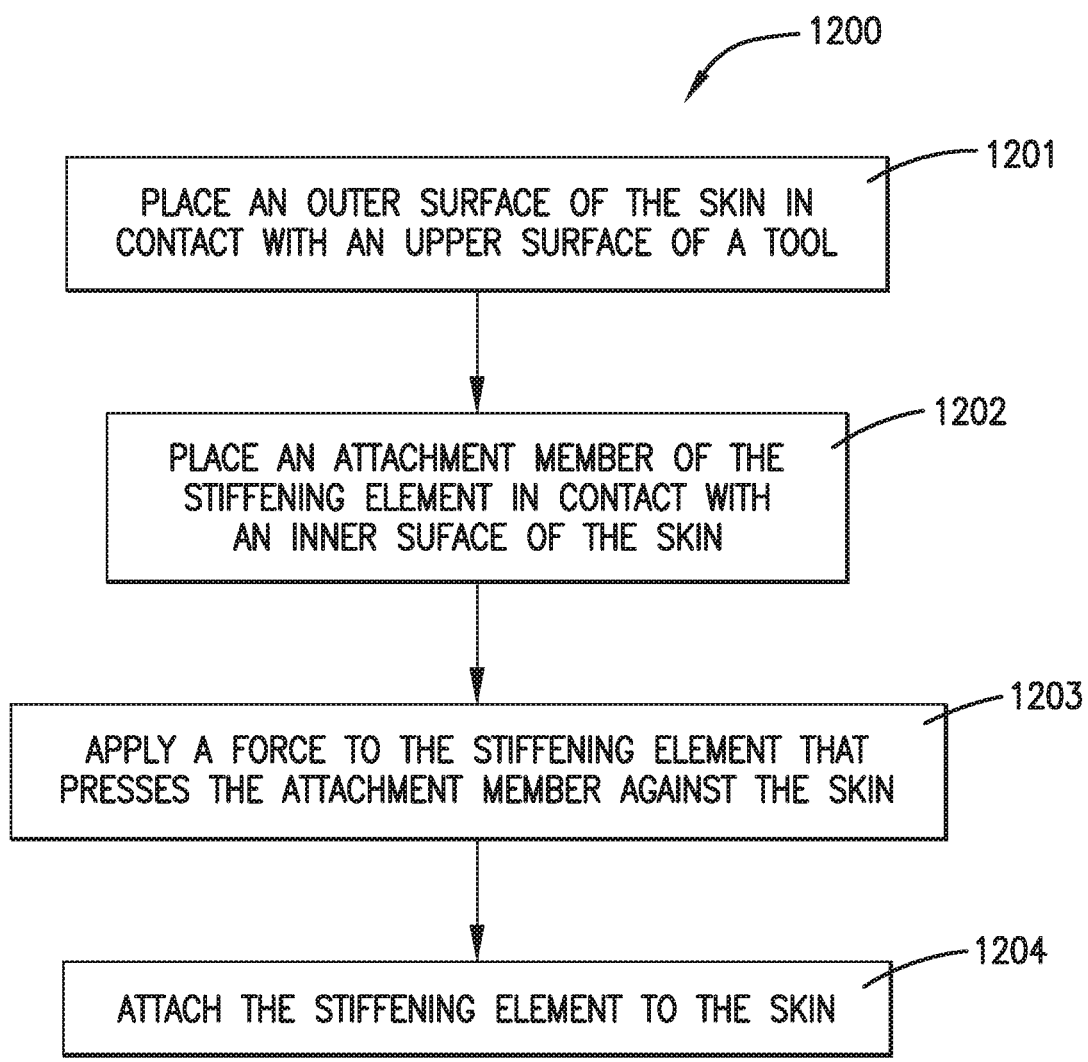
FIG. 62 is a listing of at least a portion of the steps of a first method of attaching a stiffening element to a skin.

A listing of at least a portion of the steps of a method 1200 of attaching a stiffening element 10, 30 to a skin 12 of an aircraft component is shown in FIG. 62. The steps may be performed in the order shown in FIG. 62, or they may be performed in a different order. Furthermore, some steps may be performed concurrently as opposed to sequentially. In addition, some steps may be optional or may not be performed.

Figure 63:
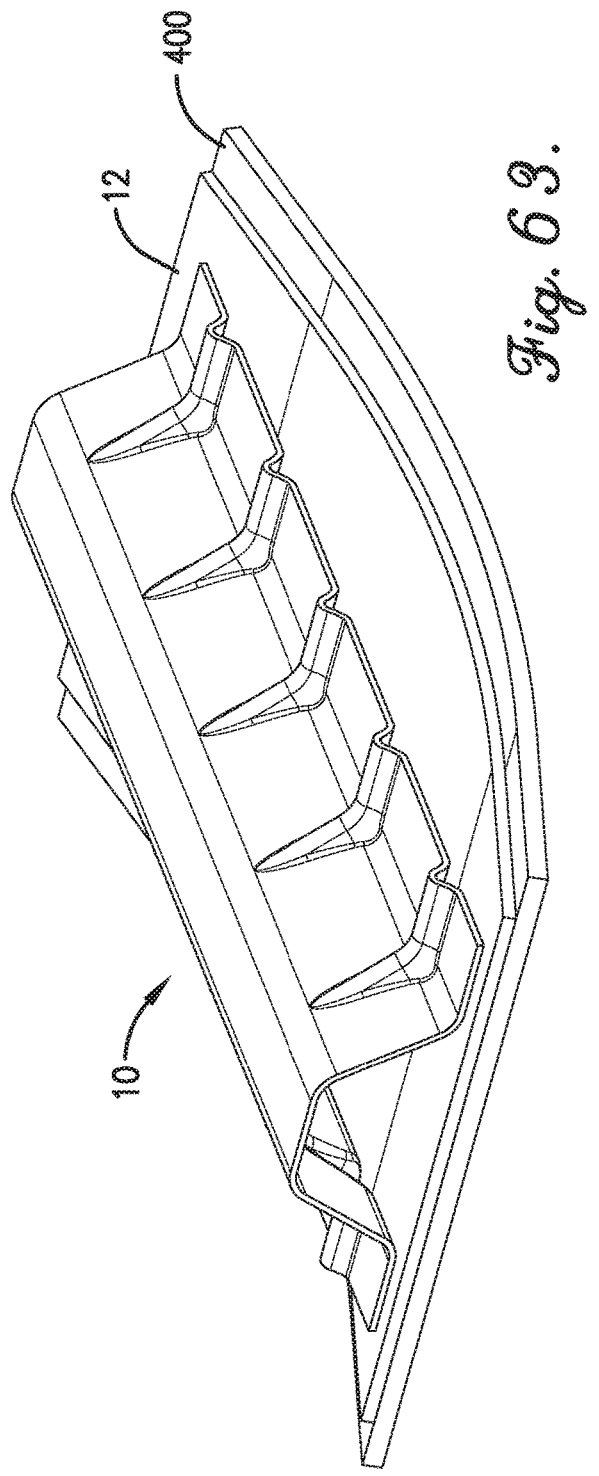
FIG. 63 is an upper perspective view of the stiffening element placed on the skin which is placed on an upper surface of a tool.

Referring to step 1201, a skin 12 is placed against, or in contact with, an upper surface of a tool 400, as shown in FIG. 63. The upper surface of the tool 400 is shaped like the outer mold line of an aircraft fuselage or other component that includes the skin 12. The skin 12 is placed such that its outer surface contacts the upper surface of the tool 400.

Referring to step 1202, the stiffening element 10, 30 is placed over the skin 12, as shown in FIG. 63. The stiffening element 10, 30 is placed so that the attachment member 18A, 18B, 32 is in contact with the inner surface of the skin 12.

Figure 64:
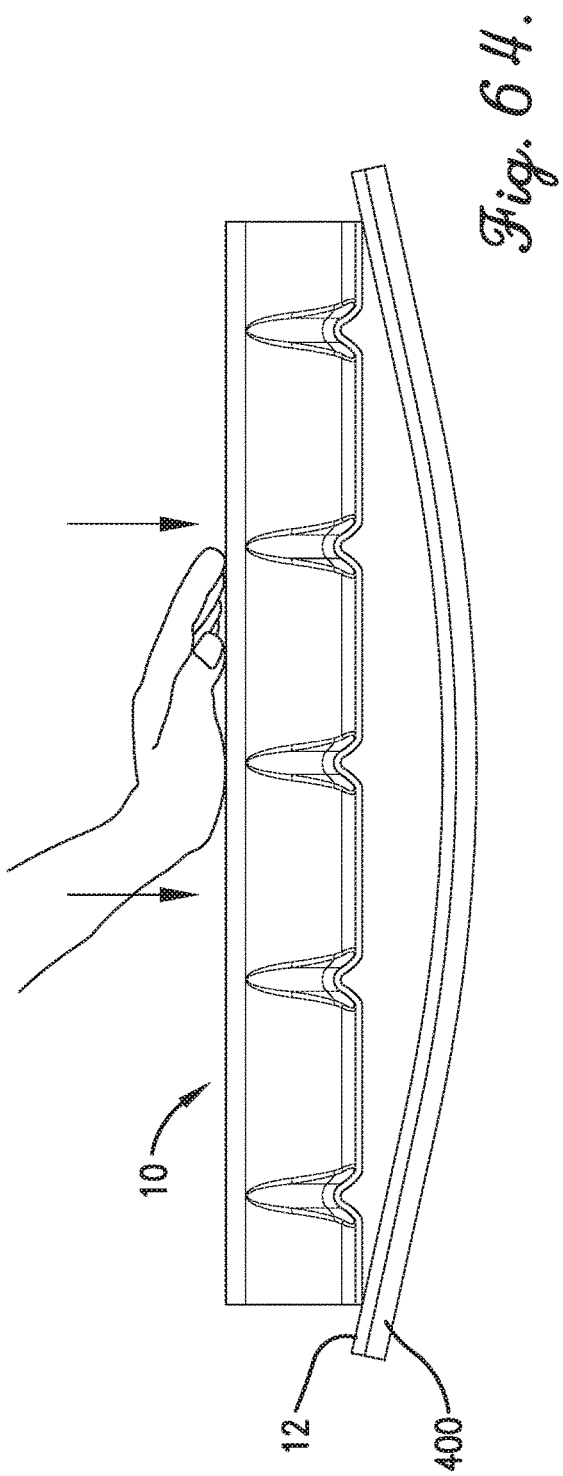
FIG. 64 is a side view of the stiffening element receiving a force or pressure applied to attach the stiffening element to the skin.
Figure 65:
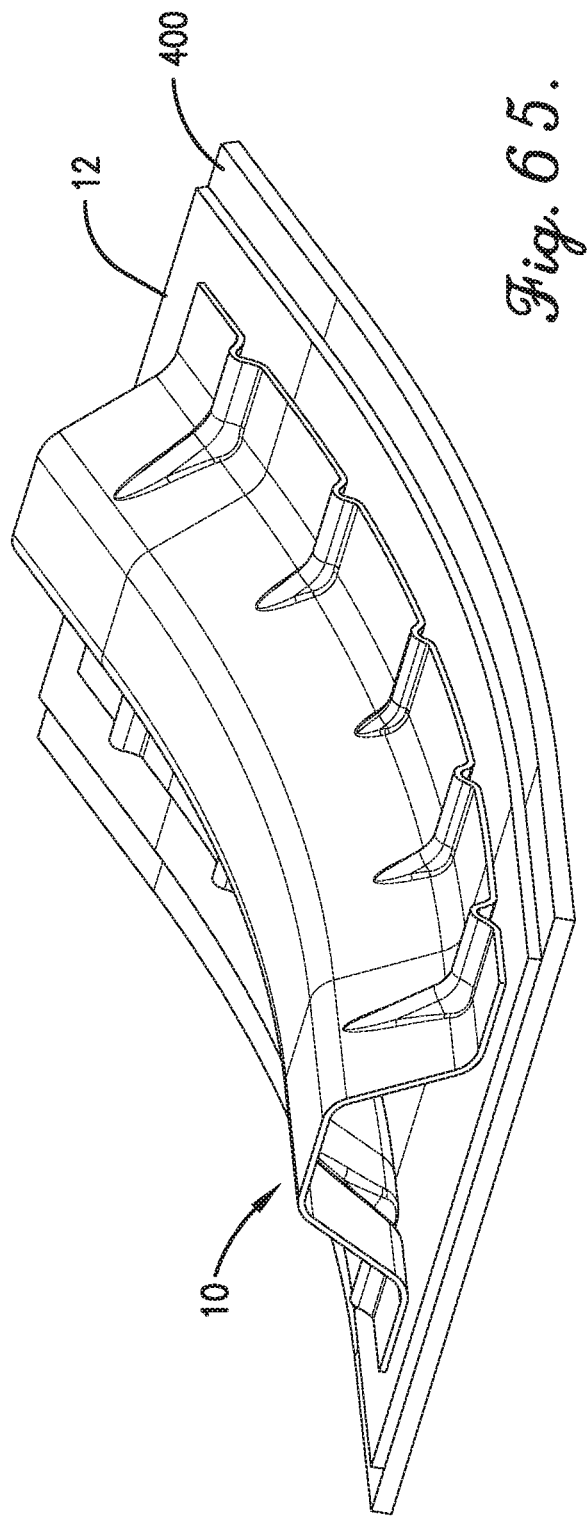
FIG. 65 is an upper perspective view of the stiffening element after it has been attached to the skin and a plurality of beads have been at least partially flattened.
Figure 66:
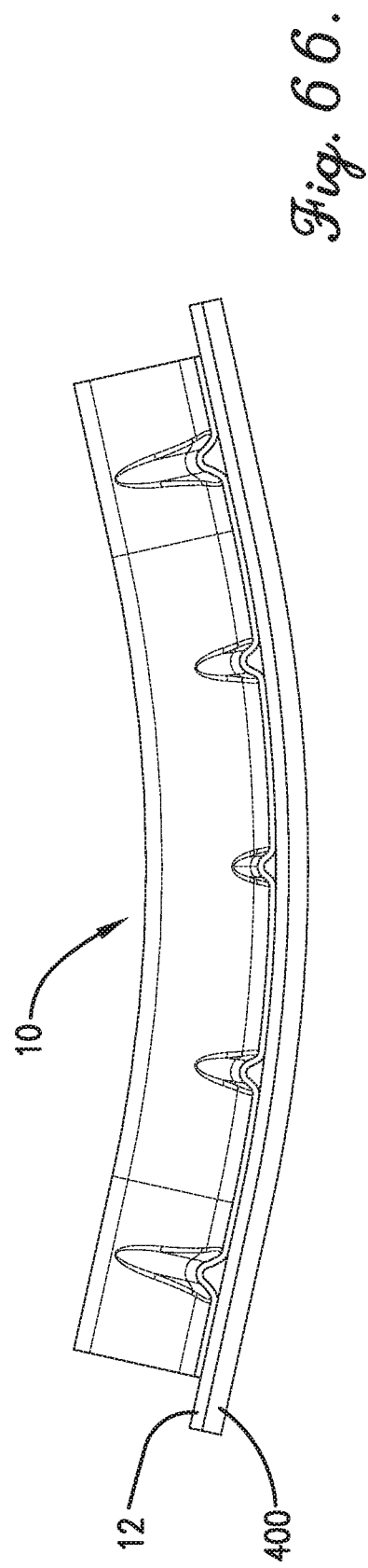
FIG. 66 is a side view of the stiffening element after it has been attached to the skin and a plurality of beads have been at least partially flattened.

Referring to step 1203, a (surface normal) force is applied to the stiffening element 10, 30, as shown in FIG. 64. The force results in the stiffening element 10, 30, and specifically the attachment member 18A, 18B, 32, being pressed against the skin 12 which is, itself, pressed against the tool 400. The force may be applied by human hand, a mass of sufficient weight, a weld head on a robotic arm, or the like. The force causes one or more beads 20, 38 to flatten or enhance according to the shape of the tool 400. For example, if the tool 400 has a concave shape, then the force will flatten one or more beads 20, 38, as shown in FIGS. 65 and 66, wherein beads 20 of the stiffening element 10 are flattened. If the tool 400 has a convex shape, then the force will enhance one or more beads 20, 38. Typically, if the tool 400 has a convex shape, then either multiple forces, each in a different location, are applied to the stiffening element 10, 30 or the force is applied over a greater area of the stiffening element 10, 30.

Referring to step 1204, the attachment member 18A, 18B, 32 of the stiffening element 10, 30 is attached to the skin 12. The attachment may occur by welding, tacking, bonding, fastening, or the like.

Figure 67:
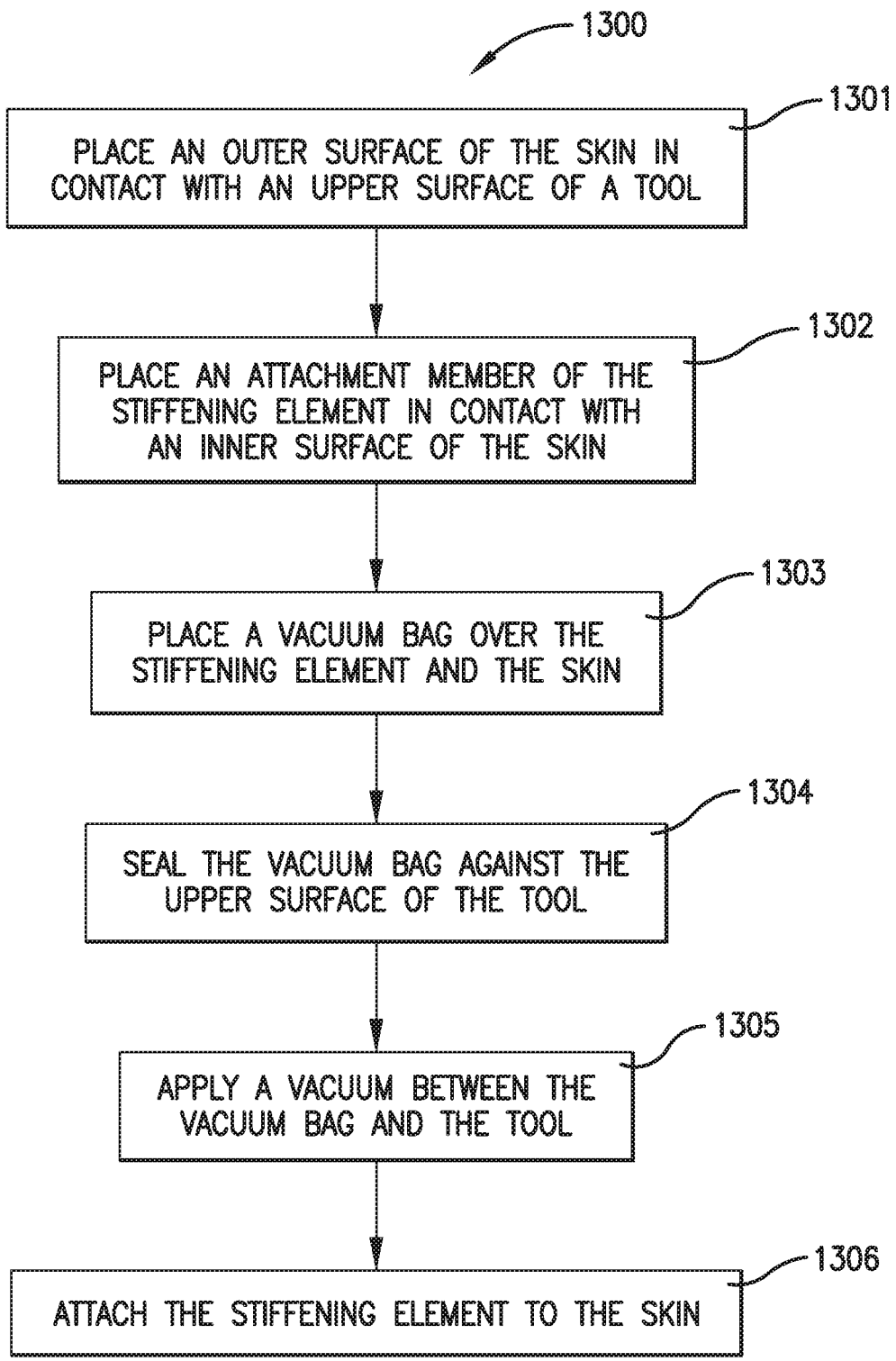
FIG. 67 is a listing of at least a portion of the steps of a second method of attaching a stiffening element to a skin.

A listing of at least a portion of the steps of another method 1300 of attaching a stiffening element 10, 30 to a skin 12 of an aircraft component is shown in FIG. 67. The steps may be performed in the order shown in FIG. 67, or they may be performed in a different order. Furthermore, some steps may be performed concurrently as opposed to sequentially. In addition, some steps may be optional or may not be performed.

Referring to step 1301, a skin 12 is placed against, or in contact with, an upper surface of a tool 400, as shown in FIG. 68. The upper surface of the tool 400 is shaped like the outer mold line of an aircraft fuselage or other component that includes the skin 12. The skin 12 is placed such that its outer surface contacts the upper surface of the tool 400.

Referring to step 1302, the stiffening element 10, 30 is placed over the skin 12, as shown in FIG. 68. The stiffening element 10, 30 is placed so that the attachment member 18A, 18B, 32 is in contact with the inner surface of the skin 12.

Referring to step 1303, a vacuum bag 402 is placed over the stiffening element 10, 30 and the skin 12, as shown in FIG. 68. The vacuum bag 402 is sized to cover the stiffening element 10, 30 and the skin 12 to contact the upper surface of the tool 400.

Referring to step 1304, the vacuum bag 402 is sealed against the upper surface of the tool 400, as shown in FIG. 69. Adhesives or other affixers may be used to form the seal.

Referring to step 1305, a vacuum is applied between the vacuum bag 402 and the tool 400, as shown in FIG. 69. The vacuum pulls the stiffening element 10, 30 against the skin 12 and the skin against the tool 400, as shown in FIG. 70. The force from the vacuum bag 402 causes one or more beads 20, 38 to flatten or enhance according to the shape of the tool 400. For example, if the tool 400 has a concave shape, then the force will flatten one or more beads 20, 38, as shown in FIG. 70, wherein beads 20 of the stiffening element 10 are flattened. If the tool 400 has a convex shape, then the force will enhance one or more beads 20, 38.

Referring to step 1306, the attachment member 18A, 18B, 32 of the stiffening element 10, 30 is attached to the skin 12. The attachment may occur by welding, tacking, bonding, fastening, or the like.

Additional Considerations

Throughout this specification, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the current invention can include a variety of combinations and/or integrations of the embodiments described herein.

Although the present application sets forth a detailed description of numerous different embodiments, it should be understood that the legal scope of the description is defined by the words of the claims set forth at the end of this patent and equivalents. The detailed description is to be construed as exemplary only and does not describe every possible embodiment since describing every possible embodiment would be impractical. Numerous alternative embodiments may be implemented, using either current technology or technology developed after the filing date of this patent, which would still fall within the scope of the claims.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus.

The patent claims at the end of this patent application are not intended to be construed under 35 U.S.C. § 112(f) unless traditional means-plus-function language is expressly recited, such as "means for" or "step for" language being explicitly recited in the claim(s).

Although the technology has been described with reference to the embodiments illustrated in the attached drawing figures, it is noted that equivalents may be employed and substitutions made herein without departing from the scope of the technology as recited in the claims.

Having thus described various embodiments of the technology, what is claimed as new and desired to be protected by Letters Patent includes the following:

1. A stiffening element to be attached to a skin of aircraft components for providing structural reinforcement, the stiffening element comprising:
  a tension and compression member positioned spaced apart from the skin and configured to bear tension or compression forces that stiffen the skin and prevent the skin from buckling or bending;
  a shear member connected to the tension and compression member and configured to bear shear forces between the skin and the tension and compression member;
  an attachment member connected to the shear member and configured to connect to the skin; and
  a plurality of beads, each bead creating an out-of-plane feature that is positioned in at least one of the shear member and the attachment member, at least one of the plurality of beads configured to be reshaped to adjust a longitudinal curvature of the stiffening element.

2. The stiffening element of claim 1, wherein
  the shear member includes a first shear member connected to a first edge of the attachment member and a second shear member connected to a second edge of the attachment member, and
  the tension and compression member includes a first tension and compression member connected to the first shear member and a second tension and compression member connected to the second shear member.

3. The stiffening element of claim 2, wherein each bead starts near an edge of the first shear member adjacent to the first tension and compression member, extends in a transverse direction across the first shear member, extends into and across the entire width of the attachment member, extends in a transverse direction across the second shear member, and ends near an edge of the second shear member adjacent to the second tension and compression member.

4. The stiffening element of claim 1, wherein
  the shear member includes a first shear member connected to a first edge of the tension and compression member and a second shear member connected to a second edge of the tension and compression member, and
  the attachment member includes a first attachment member connected to the first shear member and a second attachment member connected to the second shear member.

5. The stiffening element of claim 4, wherein the plurality of beads includes a plurality of beads formed in each of the first and second attachment members.

6. The stiffening element of claim 1, wherein each bead has an arch or roughly parabolic cross-sectional shape.

7. The stiffening element of claim 1, wherein each bead is configured to be reshaped in a first manner to adjust the longitudinal curvature of the stiffening element in a first direction and reshaped in a second manner to adjust the longitudinal curvature of the stiffening element in a second direction, opposite to the first direction.

* * * * *